(12) United States Patent
Brebenel

(10) Patent No.: US 10,842,000 B2
(45) Date of Patent: *Nov. 17, 2020

(54) LED LIGHTING SYSTEM AND DEVICE

(71) Applicant: Nicolae Brebenel, Glen Head, NY (US)

(72) Inventor: Nicolae Brebenel, Glen Head, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/450,072

(22) Filed: Jun. 24, 2019

(65) Prior Publication Data
US 2019/0313505 A1 Oct. 10, 2019

Related U.S. Application Data

(63) Continuation of application No. 15/817,389, filed on Nov. 20, 2017, now Pat. No. 10,334,689, which is a continuation of application No. 15/230,481, filed on Aug. 7, 2016, now Pat. No. 9,826,593.

(60) Provisional application No. 62/323,352, filed on Apr. 15, 2016.

(51) Int. Cl.
H05B 45/50 (2020.01)
H05B 45/00 (2020.01)
H05B 47/11 (2020.01)
F21K 9/278 (2016.01)
H05B 45/37 (2020.01)
H05B 47/175 (2020.01)
F21K 9/275 (2016.01)
F21V 15/015 (2006.01)
F21V 3/02 (2006.01)
F21V 23/00 (2015.01)
F21Y 115/10 (2016.01)
F21Y 103/10 (2016.01)
F21V 19/00 (2006.01)
F21Y 105/10 (2016.01)

(52) U.S. Cl.
CPC ............ H05B 45/50 (2020.01); F21K 9/278 (2016.08); H05B 45/00 (2020.01); H05B 45/37 (2020.01); H05B 47/11 (2020.01); H05B 47/175 (2020.01); F21K 9/275 (2016.08); F21V 3/02 (2013.01); F21V 15/015 (2013.01); F21V 19/0055 (2013.01); F21V 23/005 (2013.01); F21Y 2103/10 (2016.08); F21Y 2105/10 (2016.08); F21Y 2115/10 (2016.08); Y02B 20/46 (2013.01)

(58) Field of Classification Search
None
See application file for complete search history.

(56) References Cited

U.S. PATENT DOCUMENTS

| | | |
|---|---|---|
| 9,826,593 B2 | 11/2017 | Brebenel |
| 10,334,689 B2 * | 6/2019 | Brebenel ............ H05B 47/175 |
| 2007/0200725 A1 | 8/2007 | Fredericks et al. |
| 2012/0217882 A1 * | 8/2012 | Wong ............ G06Q 10/063114 315/185 R |
| 2013/0049614 A1 | 2/2013 | Kang et al. |

* cited by examiner

Primary Examiner — Dedei K Hammond
(74) Attorney, Agent, or Firm — Arent Fox LLP

(57) ABSTRACT

A device, system, process, and method of manufacturing provides use of at least two LED lighting sources to provide auxiliary component modules. Embodiments can be used in a variety of industries, including city street lamps, indoor lighting systems, lighting systems in automobiles, train lighting systems, tunnel lighting systems, building lighting systems, networked lighting systems, and other systems that could benefit from flexibility and ease in changing circuit components for time-based, usage-based, or fault-based detected situations.

21 Claims, 34 Drawing Sheets

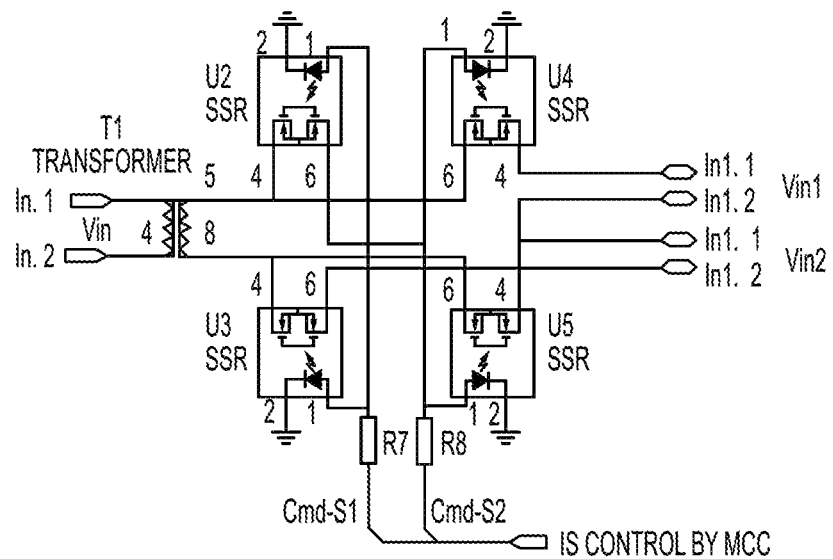
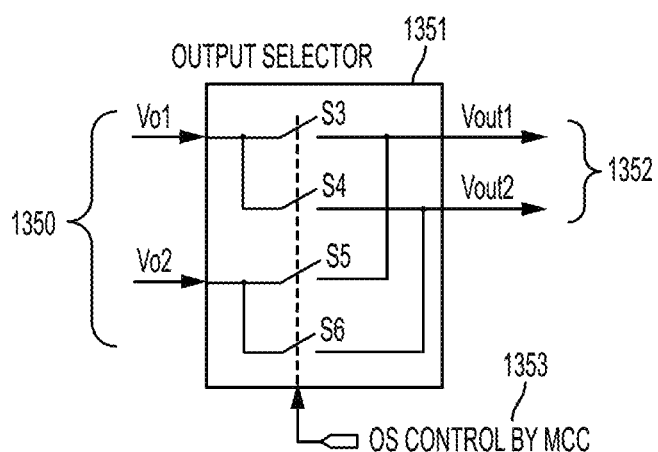
Fig. 5F

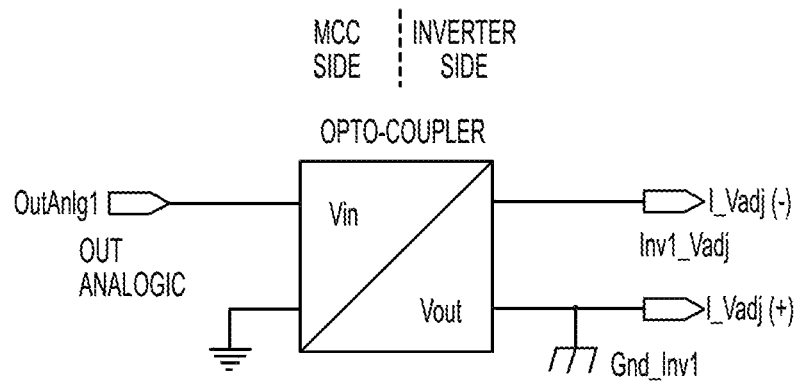
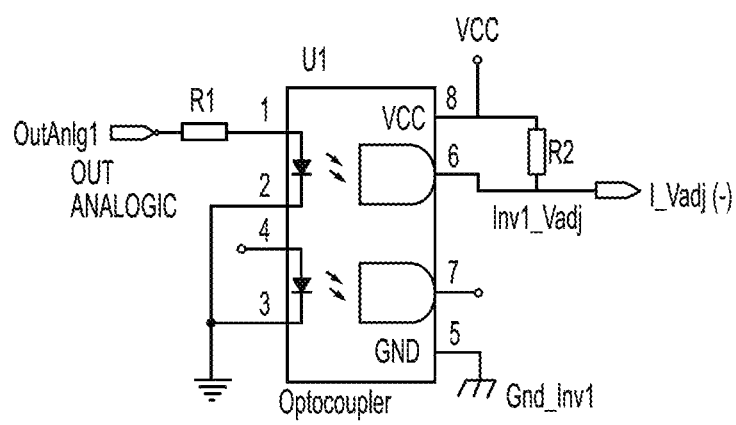
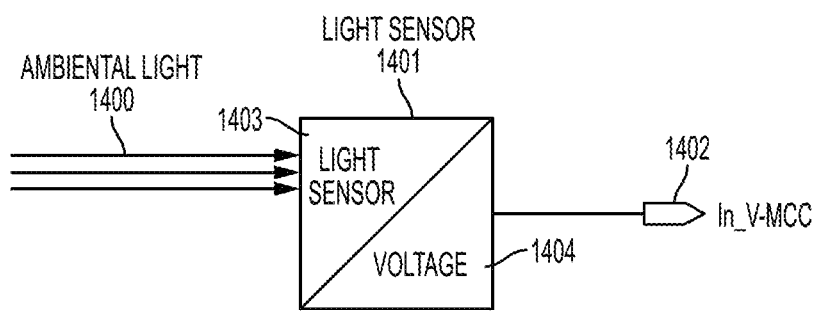
Fig. 7B

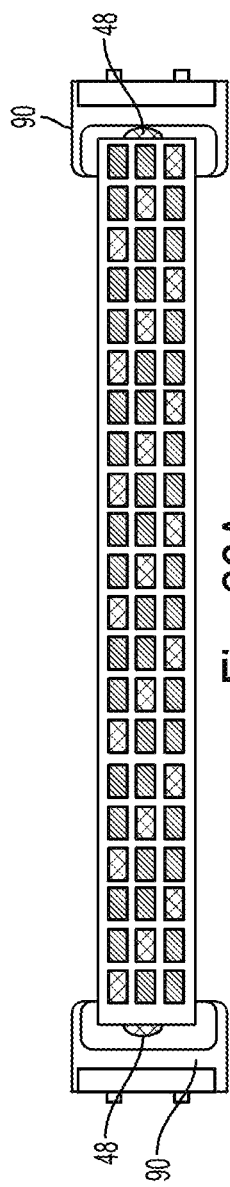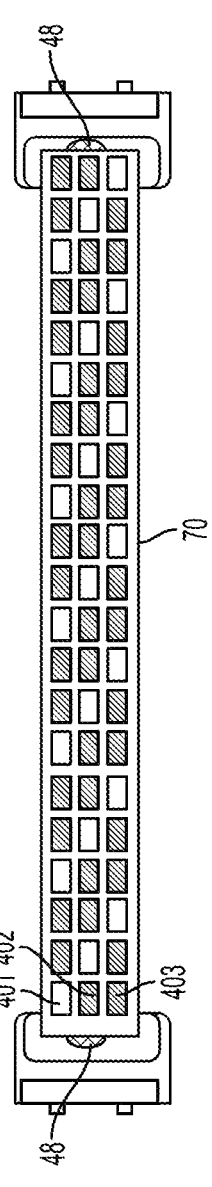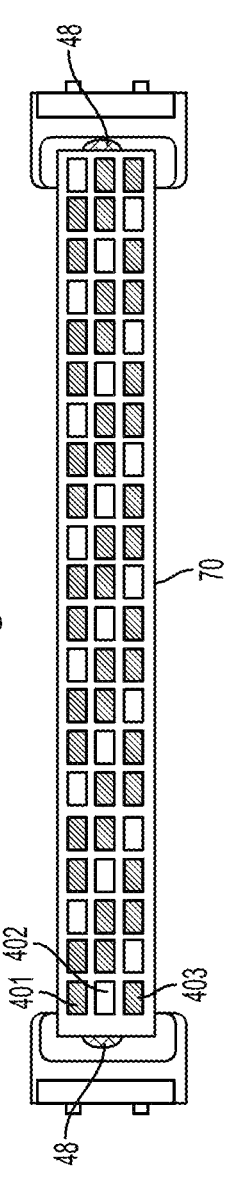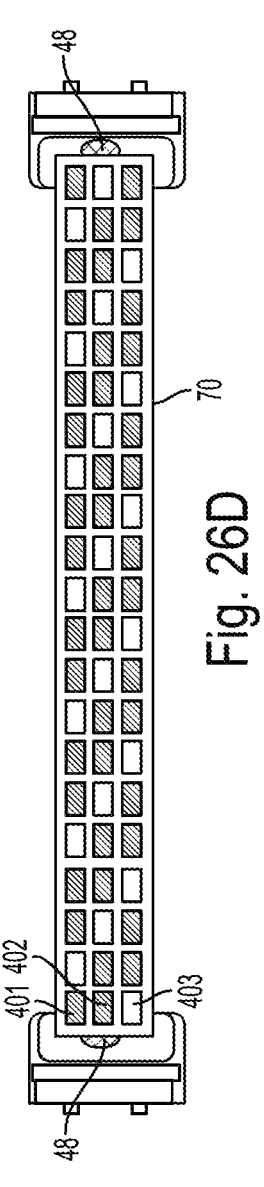

LED LIGHTING SYSTEM AND DEVICE

CROSS-REFERENCE TO RELATED APPLICATIONS

This application is a continuation application of U.S. patent application Ser. No. 15/817,389, filed Nov. 20, 2017, which is a continuation application of U.S. patent application Ser. No. 15/230,481, filed Aug. 7, 2016 and issued as U.S. Pat. No. 9,826,593, which claims priority to U.S. Patent Provisional Application No. 62/323,352, filed Apr. 15, 2016, the contents of each of which are incorporated herein by reference in their entirety.

FIELD OF THE INVENTION

The present invention relates to a system, method, method for manufacturing, and apparatus, among other things, a lighting system; and more particularly, a lighting system including at least one light emitting diode (LED) device.

RELATED INFORMATION

Light emitting diodes (LEDs) were originally used in limited circumstances, e.g., for aviation control panels and computer mainframes, due to their limited color spectrum and intensity. Since then, the use of LED lighting has become so diversified that the developments in lighting technology and semi-conductor construction have led to LED lighting that is brighter, i.e., more intense, and covers every color in the visible light spectrum as well as infrared and ultra-violet. In practice, LEDs are now used to illuminate not only offices and residences, but also streets and highways. LED's low energy consumption, long lamp life, and small size make them an attractive option for use as the main source of illumination for everyday purposes.

While LEDs have improved over the years, there are still issues with their shelf-life and the need to change/replace a LED lighting source when it burns out. The change and replacement of a LED lighting source can become a costly project, especially when it involves street and highway lamps, bay lamps, lamps in a building, or large halls. Accordingly, there exists a need for a system which cures this issue and provide a more robust lighting system, allowing the continued use of an energy-saving LED lighting source.

SUMMARY

Embodiments of the present invention provide for a lighting system, method, and device, having: at least one power source; at least one driver power module, the at least one driver power module including an input selector, at least one driver, an output selector, and a microcontroller, wherein the input selector is connected to an input of the at least one driver and the output of the at least one driver is connected to the output selector; at least two light emitting diode light sources, the at least two light emitting diode light sources being connected in parallel to each other; wherein the power source is connected to an input of the input selector of the at least one driver power module, wherein an output of the output selector of the at least one driver power module is connected to an input of each of the at least two light emitting diode light sources, wherein each of the at least two light emitting diode light sources are connected to at least one lighting sensor, wherein the microcontroller communicates with the at least one lighting sensor.

Embodiments of the present invention provide for a lighting system, method, and device, having: at least one power source; at least one driver power module, the at least one driver power module including an input selector, at least one driver, and an output selector, wherein the input selector is connected in series to an input of the at least one driver and the output of the at least one driver is connected in series to the output selector; at least one light emitting diode light source, the at least one light emitting diode light source; wherein the power source is connected in series to an input of the input selector of the at least one driver power module, wherein an output of the output selector of the at least one driver power module is connected in series to an input of the at least one light emitting diode light source, wherein the at least one light emitting diode light source is connected to at least one lighting sensor. A microcontroller or processor or connection to a remote processor or microcontroller is provided in the lighting system. The microcontroller or processor is connected with at least one of the different elements of the system, such as the power module, the input selector, the driver, the output selector, the light emitting diode light source, and the light sensor. Each of the different elements of the system such as the power module, the input selector, the driver, the output selector, the light emitting diode light source, and the light sensor, can each be presented as a multiple. For example, one or more power modules can be implemented—the respective power modules being connected to each other in parallel, and the output of the power modules being connected in series to the input of the following circuit element. A microcontroller can be connected (via hard connection, wireless connection, or other means) to the power modules' output. For example, one or more driver power modules can be implemented—the respective driver power modules being connected to each other in parallel, and the output of the driver power modules being connected in series to the input of the following circuit element. A microcontroller can be connected (via hard connection, wireless connection, or other means) to the driver power modules' output. For example, one or more input selectors can be implemented—the respective input selectors being connected to each other in parallel, but the output of the input selectors being connected in series to the input of the following circuit element. A microcontroller can be connected (via hard connection, wireless connection, or other means) to the input selectors' output. For example, one or more drivers can be implemented—the respective drivers being connected to each other in parallel, but the output of the drivers being connected in series to the input of the following circuit element. A microcontroller can be connected (via hard connection, wireless connection, or other means) to the drivers' output. For example, one or more output selectors can be implemented—the respective output selectors being connected to each other in parallel, but the output of the output selectors being connected in series to the input of the following circuit element. A microcontroller can be connected (via hard connection, wireless connection, or other means) to the output selectors' output. For example, one or more light sources can be implemented—the respective light sources being connected to each other in parallel, but the output of the light sources being connected in series to the input of the following circuit element. A microcontroller can be connected (via hard connection, wireless connection, or other means) to the light sources' output. For example, one or more light emitting diode light sources can be implemented—the respective light emitting diode light sources being connected to each other in parallel, but the output of the light emitting diode light sources being connected in series to the input of the following circuit element. A microcontroller can be connected (via hard connection, wireless connection, or other means) to the light emitting diode light sources' output. For example, one or more light sensors can be implemented—the respective light sensors being connected to each other in parallel, but the output of the light sensors being connected in series to the input of the following circuit element. A microcontroller can be connected (via hard connection, wireless connection, or other means) to the light sensors' output. For example, one or more microcontrollers can be implemented—the respective microcontrollers being connected to each other in parallel, but the output of the microcontroller being connected in series to the input of a circuit element. The connection can be a hard connection or connected via a wireless connection, allowing for remote control. Each of the aforementioned examples can be used together or separately in an embodiment to provide lighting systems of the present invention flexibility and reliability.

In an embodiment, the microcontroller receives feedback from an element to determine whether the aforementioned element is functioning properly. If the element is not functioning properly, then the microcontroller sends a signal to switch from that element to a similar element connected in parallel. For example, a microcontroller is connected to the output of the drivers. If the microcontroller receives an inappropriate signal (e.g., no signal or a wrong signal) from the driver 1, then the microcontroller contacts the input selector to switch from using the driver 1 to driver 2.

In an embodiment, the microcontroller maintains an internal clock on elements of the circuit. When the microcontroller identifies that a time-based expiration or usage-based expiration of an element is reached, the microcontroller indicates to the circuit system to switch from using that element to using a similar element connected in parallel. For example, if driver 1 has been used for 1 year, then the microcontroller—having a clock showing the driver 1 has reached its time-based expiration—sends a signal to the input selector to switch from driver 1 to driver 2. For example, if driver 1 has been used 1,000 times, then the microcontroller having a counter showing the driver 1 has reached its usage-based expiration—sends a signal to the input selector to switch from driver 1 to driver 2.

In an embodiment, a sensor is connected to the output of one or more circuit elements to determine whether the circuit element is providing a proper output. Such an additional circuit element add cost to the implementation of the system. However, the sensor can provide more defined details regarding the status of a circuit element.

In an embodiment, the microcontroller receives a feedback measurement as to an input voltage provided by the power source, and if the microcontroller determines that the feedback measurement of the input voltage is equal or greater than a predetermined value, then the microcontroller communicates with the input selector to establish an initial pathway via one of the plurality of the drivers; and if the microcontroller determines that the feedback measurement of the input voltage is less than the predetermined value, then the microcontroller effects an action. In an embodiment, the action is at least one of: the microcontroller sends an error indicator to a system controller; the microcontroller signals a switch to switch from using the power module to using a second power module; the microcontroller effects a non-action.

In an embodiment, the microcontroller receives a feedback measurement as to an input voltage provided by the power source, and if the microcontroller determines that the feedback measurement of the input voltage is equal or greater than a predetermined value, then the microcontroller communicates with the input selector to establish an initial pathway via one of the plurality of the drivers; and if the microcontroller determines that the feedback measurement of the input voltage is less than the predetermined value, then the microcontroller effects an action. In an embodiment, the action is at least one of: the microcontroller sends an error indicator to a system controller; the microcontroller signals a power module selector switch to switch from using the power module to using a second power module; and the microcontroller effects a non-action.

In an embodiment, the initial pathway is established as the current travels from the power supply to the input selector, from the input selector to the initial driver, and from the initial driver to the output selector; the microcontroller measuring the output voltage and if it meets a predetermined value, the microcontroller commands the output selector to connect the initial driver with one of the light emitting diode light sources, effecting an established complete power pathway between the power source and the light emitting diode light source. In an embodiment, the microcontroller receives a measurement of an output voltage at an output of the respective driver, wherein if the value of the output voltage meets a predetermined value, then the microprocessor commands the output selector to select a light emitting diode light source.

In an embodiment, the measured output voltage feedback measurement value of the output voltage is not appropriate, the microcontroller commands the input selector to select a next available driver from the plurality of the drivers, and establish a new pathway to the light emitting diode lighting source initially selected; if the initially selected light emitting diode lighting source becomes nonfunctional, the microcontroller commands the output selector to select a next available light emitting diode light source.

In an embodiment, the microcontroller communicates with a remote controlling processor which directs the microcontroller to communicate with the system and effect action. In an embodiment, where it is determined that the output voltage is less than a predetermined value, the micro controller commands the input selector to disengage the initial driver and switch to the next available spare driver of the plurality of drivers. In an embodiment, the microcontroller communicates with: outside remote control via Wi-Fi, Bluetooth, Ethernet, GSM, radio RI, Internet, industrial buses, Modbus, Can Open; local display; local keypad; and local port of service; wherein the microcontroller is operated as at least one of: automatically, independently, following the programmed logic written in the firmware, and automatically while following remote orders to switch at least one of driver power modules, drivers, and lighting sources.

In an embodiment, the microcontroller sends a signal to switch from one of: using the light emitting diode light source to use a different light emitting diode light source, using the driver to use a different driver, using the power module to use a different power module, and using the light sensor to use a different light sensor. In an embodiment, the microcontroller sends the signal to switch based on at least one of: a predetermined time-based usage; a predetermined usage; a warranty time date; and a faulty feedback response. In an embodiment, the light emitting diode light source is situated on a flat surface. In an embodiment, the signal to switch is effected using at least one of: a rocking motion, a translational motion, a movement, and a rotation motion, to situate at least one of: the light emitting diode light source for non-use, the different light emitting diode light source for use, the driver for non-use, the different driver for use, the power module for non-use, the different power module for use, the light sensor for non-use, and the different light sensor for use.

In an embodiment, the system is used for at least one of: an indoor lighting system, an outdoor lighting system, light emitting diode light bulbs, light emitting diode office lighting system, light emitting diode light tubes, light emitting diode high bay lighting systems, light emitting diode low bay lighting system, light emitting diode ceiling lighting system, light emitting diode street lighting system, light emitting diode security lighting system, light emitting diode flood lighting system, light emitting diode canopy lighting system, light emitting diode tunnel lighting system, light emitting diode traffic lighting system, and other light emitting diode lighting systems. In an embodiment, the driver power module can be situated inside or outside of a housing, wherein the housing includes the at least one light emitting diode. In an embodiment, the system operates at least one of: automatically, independently, and manually.

In an embodiment, an alternate lighting method includes: connecting in series at least one power source to at least one driver power module; connecting in series the at least one driver power module to at least two light emitting diode light sources, wherein the at least two light emitting diode light sources are connected in parallel to each other; connecting a microcontroller to an output of the at least two light emitting diode light sources, so that if a measured output of the at least two light emitting diodes is less than a predetermined value, then the microcontroller sends a signal to an output selector of the at least one driver power module to switch from using a first of the at least two light emitting diodes to using a second of the at least two light emitting diodes, wherein the at least one driver power module includes an input selector, at least one driver, and the output selector, wherein the input selector is connected in series to an input of the at least one driver and the output of the at least one driver is connected in series to the output selector; wherein the power source is connected to an input of the input selector of the at least one driver power module, wherein an output of the output selector of the at least one driver power module is connected to an input of each of the at least two light emitting diode light sources.

In an embodiment, the method includes connecting the at least two light emitting diode light sources at their respective output to at least one lighting sensor; communicating with the at least one lighting sensor by the microcontroller to determine whether the measured output is less than the predetermined value. In an embodiment, the method includes that the microcontroller receives a feedback measurement as to an input voltage provided by the power source, and if the microcontroller determines that the feedback measurement of the input voltage is equal or greater than a predetermined value, then the microcontroller communicates with the input selector to establish an initial pathway via one of the plurality of the drivers; and if the microcontroller determines that the feedback measurement of the input voltage is less than the predetermined value, then the microcontroller effects action. In an embodiment, the action is at least one of: the microcontroller sends an error indicator to a system controller; the microcontroller signals a switch to switch from using the power module to using a second power module; the microcontroller effects a non-action.

In an embodiment, the initial pathway is established as the current travels from the power supply PS to the input selector IS, from the input selector IS to the said initial driver DRV, and from the initial driver DRV to the output selector OS; the microcontroller MCC measures the Vout and if it is adequate, the micro controller MCC will command the output selector OS to connect the initial driver DRV with one of the LED lightening sources LLSs. This way an initial LLS is selected, and a complete power pathway (PPW) between the power source PS and the LED lightening source LLS is established. In an embodiment, the microcontroller receives a feedback measurement of an output voltage at an output of the respective driver, wherein if the value of the voltage out is appropriate then the microprocessor MCC will communicate with the output selector OS will instruct the output selector OS to select a LED lighting source LLS, out of the plurality of the LED lighting sources LLS, thus establishing a pathway to the initial LED lighting source LLS. In an embodiment, if the value of the voltage out is not appropriate, the micro controller MCC will communicate with Input selector IS the and next available driver DRV is selected from the plurality of the drivers DRV and establish a new pathway to the LED lighting source LLS initially selected; if the initially selected LED lighting source LLS becomes nonfunctional, the micro controller MCC communicates with the output selector OS and a the next available LED lighting source LLS is selected. In an embodiment, the microcontroller MCC communicates with outside remote control, local display, local keypad, and local port for service, via Wi-Fi, Bluetooth, Ethernet, Internet and GSM, radio RI, this way a remote control can direct the micro controller MCC to communicate with the modules of the IPM and instruct either the switch to a different driver DRV or a switch to a new LED lighting system source LLS. In an embodiment, where the Voltage out is not adequate, and the microcontroller MCC commands the input selector IS to disengage the initial driver DRV and switch to the next available spare DRV, by connecting to the next available DRV; the microcontroller MCC measuring the Vout, to ensure adequate voltage, and commanding the OS to connect to the initial LLS if the Vout is adequate.

In an embodiment, the microcontroller MCC communicates with: 1) outside remote control via Wi-Fi, Bluetooth, Ethernet, and GSM and Internet or industrial buses such as Modbus, Can Open, etc., 2) local display, 3) local keypad, and 4) local port of service; the said micro controller MCC can be operated automatically or independently, following the programmed logic written in the firmware; when operated automatically, it follows the remote orders (to switch IPMs, DRV, LLS, etc.). In an embodiment, the microcontroller MCC causes the LLS in use to be replaced by the next available spare LLS, and spare drivers periodically, at a chosen period of time, thus, causing the LLSs and DRV to alternate in use to ensure good functionality of the spare LLSs and to lengthen the amount of time, for which light of good quality is available. This way the quality of the light can be decreased less than 50% or more compared with existing products.

In an embodiment, the microcontroller causes the driver DRV in use to be replaced by the next available spare driver DRV, periodically less at a chosen period of time, thus causing the drivers to alternate in use, to ensure functionality of the spare driver DRV over an extended period of time.

In an embodiment, an LED lighting system can have plurality of spare parts, modules. Each module is composed of one driver DRV and one LED lighting source LLS. With the help of micro controller MCC and the lighting sensor LS, the defective module can be replaced easily with the spare module available inside of IPM In an embodiment, a LED Lighting Device or system can be composed of a spare plurality of independent lighting fixtures or modules. Each fixture is similar with each other and all of them are connected to a respective microcontroller MCC, and to at least one lighting sensor LS. When the lighting fixture, module, other, is no longer functional/adequate, with the help of microcontroller MCC, a user will be able to change it to other spare lighting fixture, module, available in LED lighting system.

In an embodiment, an LED lighting system can effect warranties of components or of modules at the request of a customer or manufacturer or user. In an embodiment, a quality of the light LED lighting system is superior over existing LED products. In an embodiment, LED light sources LLS can be placed on any flat geometric surface or any geometric shapes existing or on any surface of any combination of geometric shapes possible. (examples: the LED light source LLS can be place on plane circle surface or other geometrical forms plane surfaces depend of applications, the LED light sources LLS can be place on the sides of the parallelepiped, the LED light sources LLS can be place on the surface of the sphere, the LED light sources LLS can be place on the sides of the truncated pyramid, the LED light sources LLS can be place on the surface of the truncated cone and all other existing geometric shapes and combinations of them).

In an embodiment, with the automatic signals or manual signals using a rocking motion or translational motion, or rotation motion or any combination of rotation and translation or other movements possible, one can bring the desired LED light source LLS in the optimum position design. This motion is possible to realize with specific design electric engines or other existing engines.

In an embodiment, the present invention can be applied to all indoor lighting applications including: LED bulbs light, LED office light LED tubes light LED High Bay and LED Low Bay Light, LED Ceiling Light, and can be applied to outdoor lighting applications including: LED streets light, LED security light, LED flood light, LED canopy light, LED tunnel light, LED traffic lights and all the other applications using LED light technology. In an embodiment, an LED lighting system can serve as the basic cell to develop a more advanced intelligent complex lighting management system for very smart applications in all areas of the lighting industries.

In an embodiment, an inverter power module or driver power module can be situated inside or outside of the LED lighting device body. In an embodiment, an LED lighting system can operate in at least one of two modes: automatically and independently, following the programmed logic inscribed in the firmware; following the remote orders (to switch drivers DRV, LED lightening sources LLS and more parts if necessary, etc.)

BRIEF DESCRIPTION OF THE DRAWINGS

Some aspects of the disclosure can be better understood with reference to following drawings. The components in the drawings are not necessarily drawn to scale, the emphasis instead being placed upon illustrating some principles of the disclosure. In the drawings, like reference numerals designate corresponding parts throughout several views, but can be differing embodiments of the present invention.

FIG. 5F shows an example LED lighting system according to an embodiment of the present invention.

FIG. 7B shows an example LED lighting system according to an embodiment of the present invention.

FIG. 26A shows an example assembled view of an LED lighting tube where the tube is not working, according to an embodiment of the present invention.

FIG. 26B shows an example assembled view of an LED lighting tube where the first module is working, according to an embodiment of the present invention.

FIG. 26C shows an example assembled view of an LED lighting tube where the second module is working, according to an embodiment of the present invention.

FIG. 26D shows an example assembled view of an LED lighting tube where the third module is working, according to an embodiment of the present invention.

DETAILED DESCRIPTION

An embodiment of the present invention provides a LED lighting system (LLD).

Figure 29:
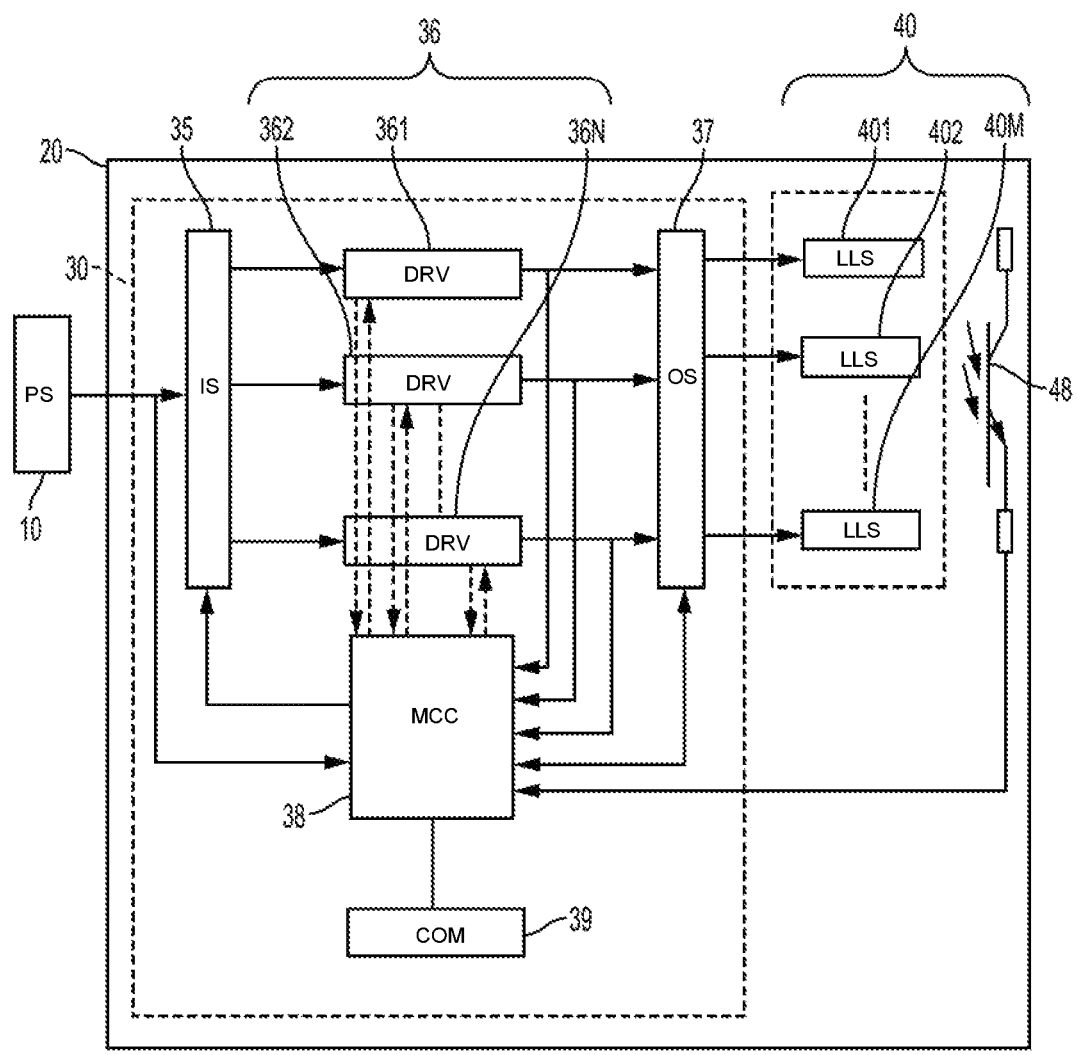
FIG. 29 shows an example LED lighting system according to an embodiment of the present invention.

In an embodiment, an LED lighting system includes the following components: a driver (DRV) or a plurality of drivers (DRV from 2 to N), and at least one LED lighting source (LLS) from 1 to N (see, e.g., FIG. 29). In an embodiment, the LED lighting system compose of plurality of modules (each module is compose of one driver and one LED lighting source) see FIG. 20 or can be a plurality of IPM from 2 to N, and a plurality of LED lighting source from 1 to N see FIG. 30 or can be compose of plurality of similar LED lighting fixture see FIG. 31, and a MCC, IS, OS and LS and can be connected to an electrical power source ("PS"). The LED lighting system embodiment presented in FIG. 31 is a more complex model.

The LED lighting system offers the ability to custom tailor its longevity and the quality of the LED lighting system by equipping the LED lighting system with one or more spare LED lighting sources and two or more spare drivers, in which the said device can automatically replace the initial LED lighting source and/or the initial driver, respectively, when the said initial LED lighting source or driver become non-functional or inadequate for use. The spare parts of our invention LED lighting system can be use in two ways. First is to use the initial parts respective driver and the LED lighting source when will becomes non-functional or defective will be replace with spare parts available driver or LED lighting source what compose the LED lighting system.

A second way can be to alternate the spare parts available during a well-defined period of time. The LED lighting system allows individual LED lighting source and driver to be used alternatively, and be alternative use at the choice of costumers time frame, to ensure that the individual LED lighting source and driver are maintained in a functional state and they do not lose their ability to function as they become stale with lack of use. Hence, period of time choose, by default, the LED lighting system causes the LED lighting source in use or the driver in use to be replaced and alternate by a spare LED lighting source or a spare driver, respectively. This will improve the overall quality of the light and the duration for which the light will be provided.

Automatic means of effectuating the replacement can be either by firmware or by remote control with a human operator. Hence, this LED lighting system represents a dynamic apparatus that allows for self-repair and replacement of the LLS and/or driver and/or IPM and/or Module Source, respectively, obviating the need of manual replacement of a light source, such as a light bulb.

For instance, the longevity of the LED lighting system can be custom-tailored to produce an illuminating device that can last 10 years, when the device has only one LED lighting source and it contains two drivers. Of the two drivers, one driver is initially selected for use, while the other one becomes a spare driver, which is not utilized until the initial driver becomes non-functional or defective. When the initial driver becomes non-functional or defective, the LED lighting system automatically self-repairs by replacing the initial driver with the spare driver from plurality spare of drivers. As each driver has a shelf-life of approximately 5 years, the LED lighting system including at least two drivers can have longevity of approximately 10 years.

In embodiments of the present invention, a driver (DRV) can be an inverter. A driver can also be another type of electrical component(s) that satisfy the input/output requirements of that component.

In situations where longevity of 20 years is desired, the LED lighting system would be equipped with two LED lighting source and four drivers. Only one LED lighting source and one driver are functional at one time within the scope of the electric circuit of a functional LED lighting system. The said device establishes an initial electric circuit by selecting an initial LED lighting source, out of the two available LED lighting sources, and an initial driver, out of the four available drivers. The LED lighting source not selected becomes a spare LED lighting source, while the remainder three drivers, after the selection of the initial driver, become spare driver. The spare LED lighting source and spare driver are not utilized while the initial counterparts are in use. Under this scenario, two driver will be used during the lifespan of one LED lighting source. A such, during the approximate time frame of five years, the device will self-repair to replace the driver with one of the spare driver, while during the approximate life span of ten years, the said device will self-repair to replace the initial LED lighting source with the spare LED lighting source(s), and it will replace one by one the remainder of the spare driver, approximately every five years.

By analogy, the longevity of the LED lighting system, which is the subject of the instant invention, can be enhanced to produce a source of illumination that does not require the manual change of a light bulb for 30 years, 40 years, 50 years, and even more, depending on necessity for the respective longevity.

Longevity for any amount of time can be actually custom-tailored, however, in the scope of brevity and clarity, the examples used take into account that the LED lighting source can last for approximatively 10 years, while the driver can last for approximatively 5 years. As such, for every extra decade, beyond the 20 years of longevity in the example presented above, the LED lighting system will equipped with 1 (one) additional spare LED lighting source, and 2 (two) additional drivers. This way, by extrapolation, a LED lighting system with a desired longevity approximate of 30 years will consist of 3 (three) LED lighting source and 6 (driver; a desired longevity approximate of 40 years will imply the use of 4 (four) LED lighting source and 8 (eight) drivers; a desired longevity approximate of 50 years will imply the use of 5 (five) LED lighting sources and 10 (ten) drivers; and so on, adding one LED lighting source and two drivers for each additional decade of desired longevity.

Additionally, the number of spare LED lighting sources and driver can vary for each of the examples above. As such, a LED lighting system with a shelf-life of 10 years can be equipped with more than one LED lighting source, so that it has one, two, or more spare LED lighting sources, and more than two drivers, so that it has two, three, or more spare drivers.

The ability of the LED lighting system or apparatus to self-repair stems from the activity of the controller, or microcontroller MCC, and the role it plays in ensuring that the said device is functional.

The present LED lighting system comprises mainly of the following: a plurality of LED lighting sources, with their respective heat sink, a plurality of drivers, and the input selector, output selector, and light sensor and MCC. The LED lighting sources, with their respective heat sink, are connected to the IPM, which in turn is connected to a power source to establish an electric circuit. More precisely, the power source, the driver, and the LED lighting source are linked together in a chain configuration as follows: power source, input selector, driver, output selector, LED lighting source and the light sensor. In an embodiment, the microcontroller is connected to input selector, output selector and light sensor.

When this electric circuit is functional, the LED lighting system provides a source of illumination, which can be efficient and reliable for more than 10 years, depending on the number of drivers and LED lighting sources implemented in the device.

For the scope of the instant invention, the IPM consists of different parts as follows: 1) an input selector IS, 2) a plurality of drivers DRV, 3) an output selector OS, 4) a micro controller MCC, and 5) communication interfaces COM. The power source PS is connected to the IPM via the input selector IS, while the LED lighting source is connected to the IPM via OS. The lighting sensor LS is connected to the LED lighting source and is connected to MCC.

The DRV are within the IPM, the DRV are connected in parallel to each other, and at one end they are connected to the IS, while at the other end, they are connected to the OS.

In an embodiment of a LED lighting system, the MCC effectuates a number of assessments of the voltage, at key intervals and locations along the said electric circuit, to determine where the voltage is adequate for the type of the load LED lighting source utilized, and whether there are any breaks in the current within the said electric circuit. Depending where along the electric circuit the break is diagnosed, the MCC can communicate with the different modules of the IPM and can instruct them to execute a specific function, such as either to replace the power source, or the DRV, or the LED lighting source.

In an embodiment of the invention, the MCC communicates with the other modules of the IPM directly. Hence, to obtain status information as to the quality of the current coming from power source, the adequacy of the current coming out of the IS, DRV, and the adequacy of the OS of the LED lighting source, the MCC communicates with the IS, the DRV, the OS and a LS mounted on the LED lighting source. From the connection of the power source to the IS, to the MCC measures the Input Voltage (Vin). Additionally, after an DRV is connected to a power source through IS, the MCC measures the Output Voltage (Vout) OS to determine whether the adequate voltage transformation took place and the appropriate/correct voltage level is transmitted to the LED lighting source. When the measurements of Vin and Vout are acceptable, the MCC commands the OS and permits the voltage to pass through to the LED lighting source by selecting one of the available LED lighting source.

The measurement of Vin permits the MCC to determine whether there is adequate voltage level coming from the power source, while the measurement of Vout permits the MCC to determine whether the adequate voltage transformation took place and the appropriate/correct voltage level is transmitted to the LED lighting source. When the measurements of Vin and Vout are acceptable, the MCC commands the OS and permits the voltage to pass through to the LED lighting source by selecting one of the available LED lighting source.

For instance, if a break in the circuit is detected between the power source and the IS, the MCC can directly instruct the IS to connect to a different power source or to fix the problem; if the break in the circuit is detected between the driver DRV and the OS, as long as no break between the power source and the IS is diagnosed, the microcontroller MCC instructs the input selector IS to connect to a different DRV from plurality of the drivers DRV; and, if the LED lighting source LED lighting source fails to illuminate, the microcontroller MCC will instruct the output selector OS to connect to a different LED lighting source from plurality of the LED lighting source.

For instance, if the microcontroller MCC receives feedback from the LED lighting source and LS that the light level emitted is not adequate, it will deem the LED lighting source defective and will command the OS to disconnect from the said LED lighting source, it will evaluate the Vout level of the DRV in current use, and if the Vout is adequate, it will command the OS to connect the DRV to the next available spare LED lighting source.

The microcontroller MCC communicates with the IS, the DRV, the OS, and the LS. From the connection of the power source and the IS, the MCC measures the input voltage (Vin), which is the voltage coming from the power source into the IS. This measurement permits the microcontroller MCC to determine whether it is necessary to switch to a new power source or to fix the problem to existing one, or to allow the IS to connect to the driver DRV.

The measurement of Vin permits the MCC to determine whether there is adequate current coming from the power source, while the measurement of Vout permits the MCC to determine whether the adequate current transformation took place and the appropriate/adequate voltage is transmitted to the LED lighting source. When the measurements of Vin and Vout are acceptable, the MCC instructs the OS to connect to the LED lighting source, by selecting one of the available out of the said plurality of LED lighting source. This way an initial electric circuit pathway is established.

In an embodiment, the microcontroller MCC communicates with the LED lighting source via a source-sensor combination, such as, but not limited to: LED-photodiode, LED-LASCR, a LED and phototransistor. The microcontroller MCC receives feedback from the LS whether there is adequate light emitted from the initially selected LED lighting source.

In an embodiment, when the MCC receives feedback from the LS that the light emitted is not adequate or the LED lighting source is non-functional, the MCC communicates with the OS and it instructs the said OS to disconnect the said LED lighting source, evaluate the Vout level, and instruct the OS to switch to the next available LED lighting source out of the plurality of the LED lighting source.

Concerning the selection of a different DRV, when the voltage measurement of Vout indicates that there is no current coming out of the DRV or the measurement of the Vout is inadequate, the MCC receives the feedback that the DRV is defective, and instructs the IS to disengage the defective DRV and switch to the next available DRV out of the plurality of the DRV that are connected in parallel. When a new DRV is activated, a new pathway is established between the power source, the IS, the new DRV, the OS, and a LED lighting source.

The MCC can reads those voltages using 2 methods:
 a. Galvanic Insulated used Linear optocouplers.
 b. Non-galvanic insulation used a simply divider made by resistors The input voltage Vin is converted into the light by a photodiode. The light is transformed back in a scaled voltage that can be read by the MCC through analog bus M-1.

Using optocoupler ensure the voltage transformation and a very high insulation between inputs and outputs.

In an embodiment of this invention, the IS may can consist of either SSR components (solid state relays) or ER components (electromechanical relay). The advantage of using SSRs is fast communication, no moving parts, which implies a long life and high reliability, and it occupies very little space. The disadvantage is that with SSRs there is less galvanic insulation.

By comparison, the advantage of an ER is the galvanic insulation, yet, it is less reliable than a SSR and it is more bulky, occupying more space. [00065] The Communication Interfaces COM may consist of one or more of the following components, depending on the desired purpose: 1) Local Display, 2) Local Keypad, 3) Local Port for service, 4) WI-FI or Bluetooth Selector port, 5) Ethernet and internet, 6) GSM, 7) Radio Communication RI, and/or all other method or combinations of communications possible.

Figure 1A:
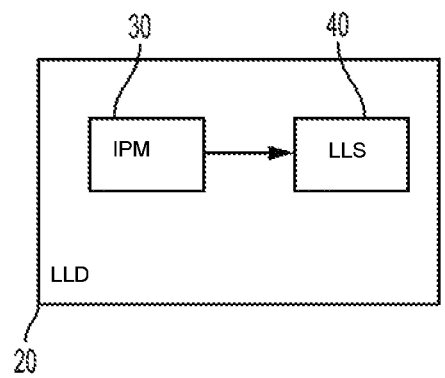
FIG. 1A shows an example LED lighting system according to an embodiment of the present invention.

FIG. 1A shows an example LED lighting system (hereinafter "LLD") 20, which, according to the present invention, is composed of an Inverter Power Module (hereinafter "IPM") 30 and LED lighting sources (thereinafter "LED lighting source") 40.

Figure 1B:
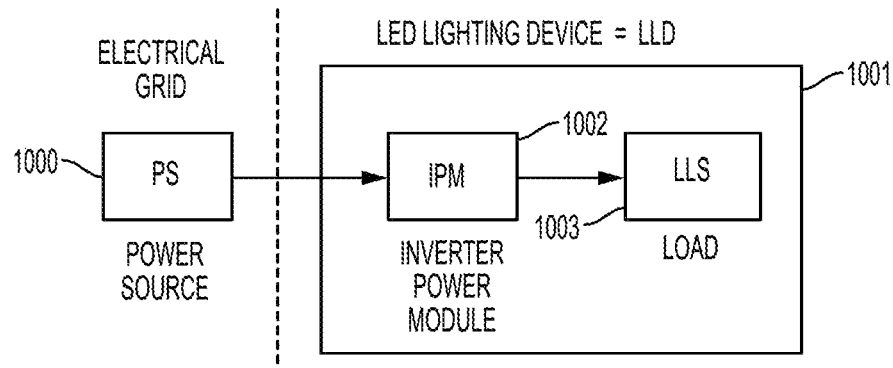
FIG. 1B shows an example LED lighting system according to an embodiment of the present invention.

FIG. 1B shows an example LED lighting system embodiment having a power source 1000 connected to the LED lighting system 1001, which can include an inverter power module 1002, a load 1003, and other circuitry.

Figure 2A:
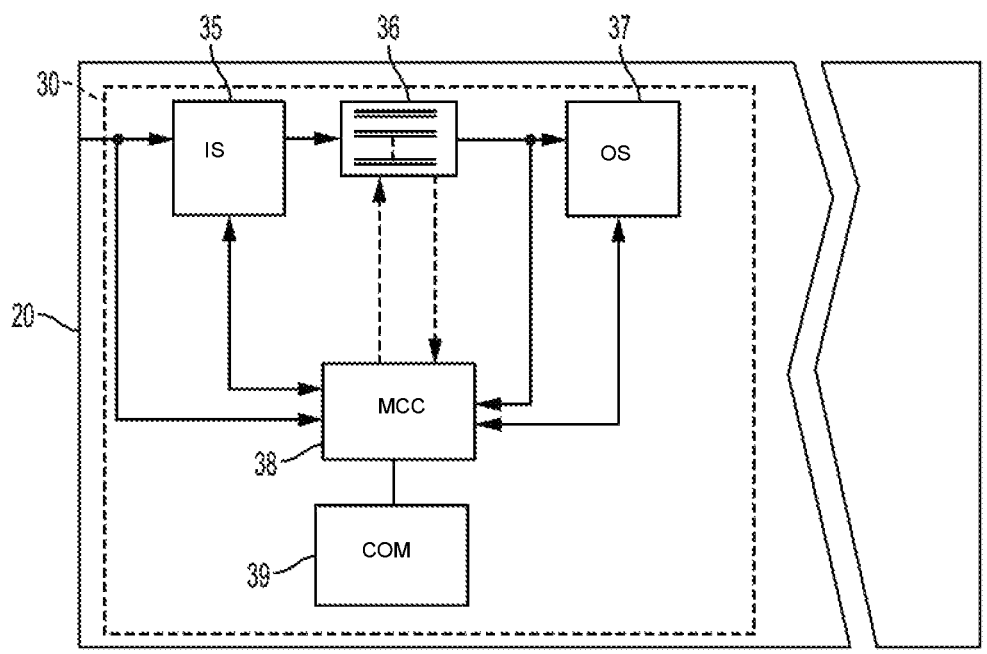
FIG. 2A shows an example inverter power module of an LED lighting system according to an embodiment of the present invention.

FIG. 2A shows an example Inverter Power Module (hereinafter "IPM") 30, of the instant LED Lighting System 20, in accordance with the present invention. The Inverter Power Module IPM 30 comprises 1) plurality of drivers from 2 to N (hereinafter "DRV") 36, 2) an Input Selector (hereinafter "IS") 35 connected to one end of the drivers DRV and 3) one Output Selector (hereinafter "OS") 37 connected to the other end of the drivers DRVs, 4) a Micro Controller (hereinafter "MCC") 38 which is connected with Input Selector IS 35 and with Output Selector OS 37 and also connected with 5) Communication Interfaces (hereinafter "COM") 39.

Figure 2B:
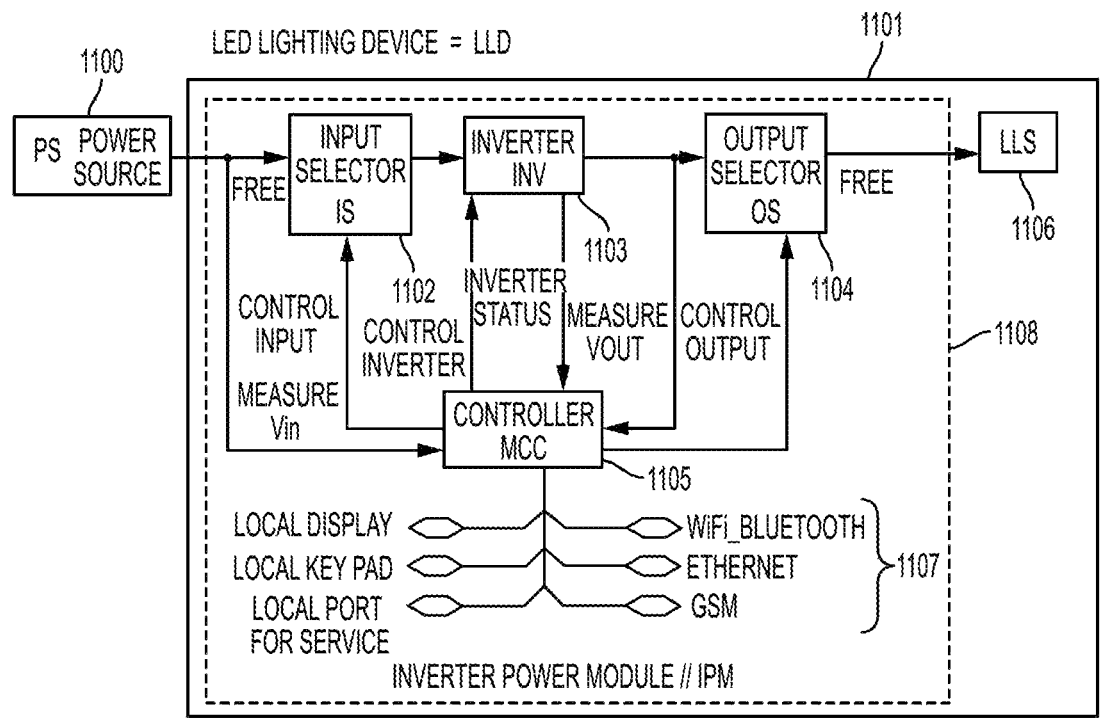
FIG. 2B shows an example inverter power module of an LED lighting system according to an embodiment of the present invention.

FIG. 2B shows an example LED lighting system embodiment having a power source 1100 connected to a LED lighting system, which can include an input selector 1102 connected to an inverter 1103 connected to an output selector 1104, which outputs to an LED lighting source 1106. A controller 1105 communicates with each of the input selector 1102, inverter 1103, and output selector 1104. The controller 1105 also connects to additional features 1107 such as a display, keypad, local port for service, WiFi Bluetooth, Ethernet, GSM connection or other telecommunications or internet connectivities.

Figure 3A:
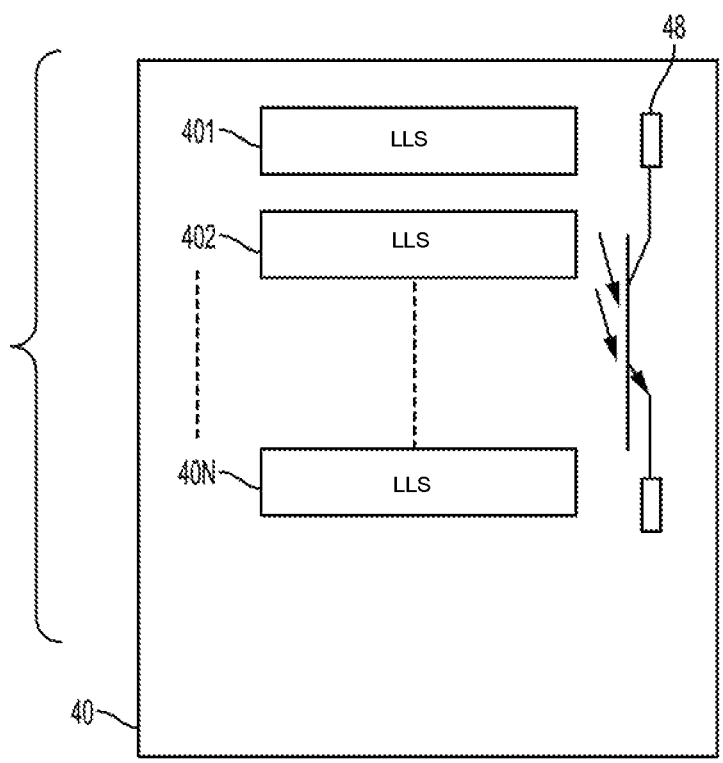
FIG. 3A shows an example LED lighting system having a lighting sensor according to an embodiment of the present invention.

FIG. 3A shows an example LED Lighting Source (hereinafter "LED lighting source") 40, of the instant LED Lighting System 20, in accordance with the present invention. The LED Lighting Source ("LLS") comprises 1) plurality of lighting source from 1 to N (401, 402, . . . , 40N), 2) and one Lighting Sensor ("LS") switch is assemble on LED lighting source 48.

Figure 3B:
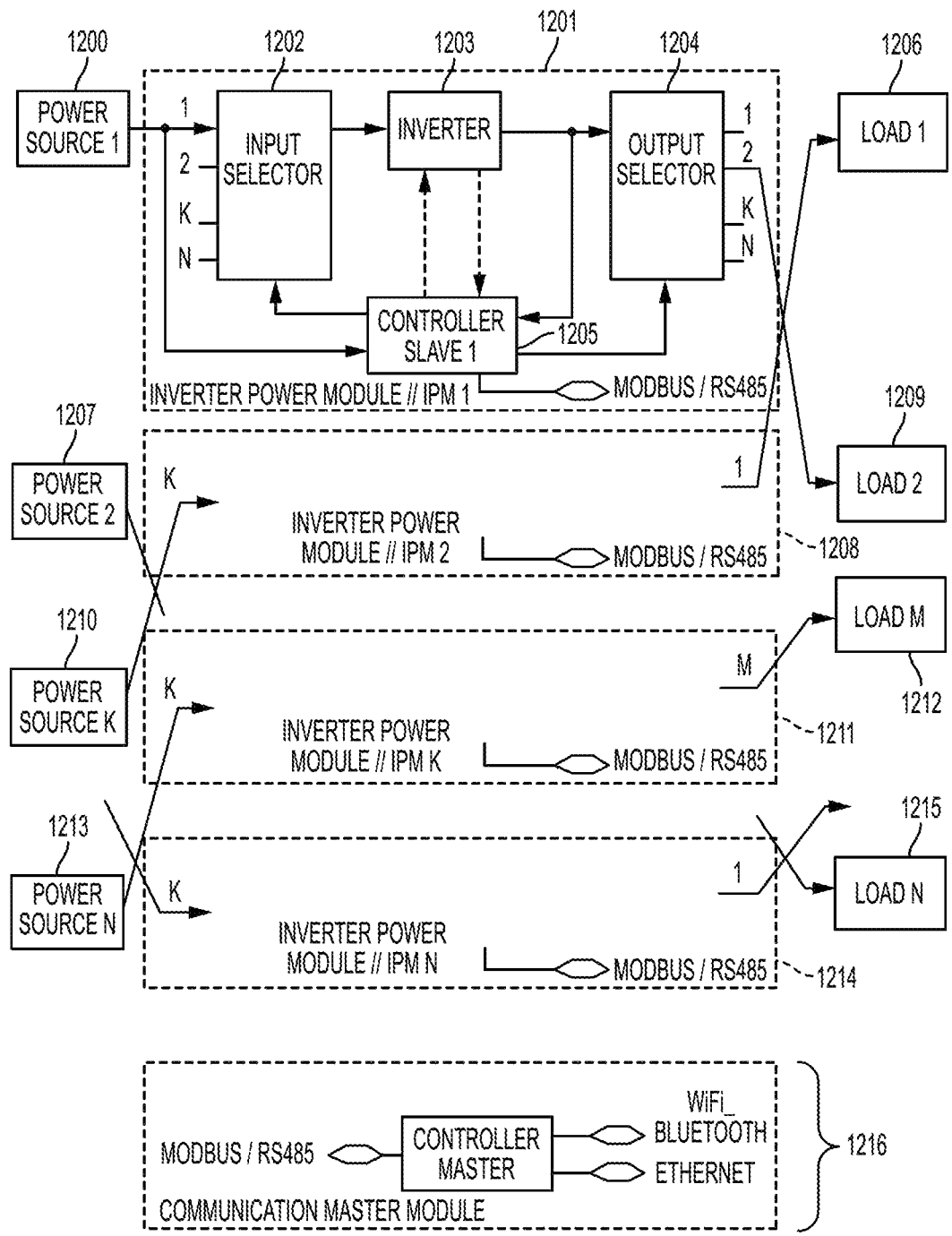
FIG. 3B shows an example LED lighting system having a lighting sensor according to an embodiment of the present invention.

FIG. 3B shows an LED lighting system embodiment having a multiple of power sources 1200, 1207, 1210, 1213 which are each connected to a respective inverter power module 1201, 1208, 1211, 1214. Each of the inverter power modules can include, for example, an input selector 1202, inverter 1203, output selector 1204, and controller 1205. Each of the respective controllers can connect to various other modules or connections, including WiFi, Bluetooth®, Ethernet, et al. 1216.

Figure 4:
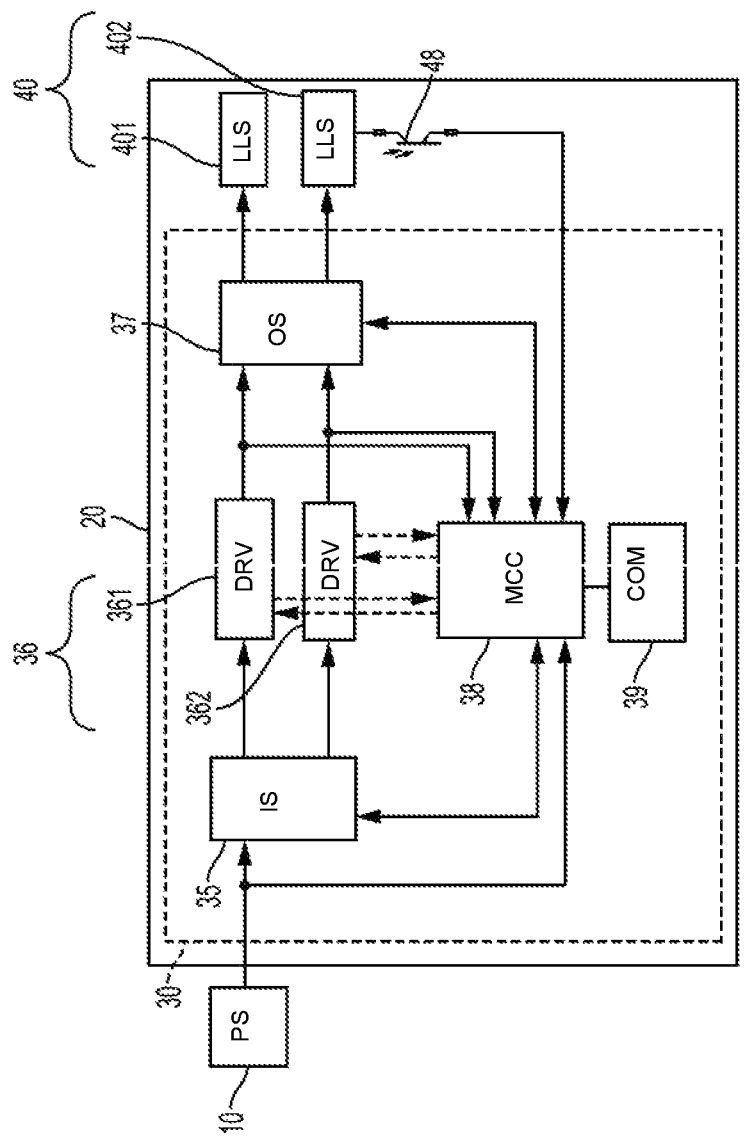
FIG. 4 shows an example LED lighting system according to an embodiment of the present invention.

FIG. 4 shows an embodiment of an light emitting diode (LED) lighting system 20 in the example topology 1, 2, 2, which means one power source 10, two drivers 362, 361, and two LED light sources 401, 402. The power source 10 sends power to the circuit system 20, first reaching input selector 35. The input selector 35 can either send the current through to the first driver 361 or the second driver 362, or to both in parallel. If the input selector 35 sends the current through the first driver 361, and that driver is faulty, then the input selector 35 sends the current through the second driver 362. A sensor can be included at the input selector 35 or just past each of the drivers 36 or at the microcontroller 38, in order to keep track of whether a driver(s) 36 is faulty and does not work properly. The microcontroller 38 is also connected to each of the segments in the circuit, in order to keep track of the current. For example, the microcontroller can be connected as shown in FIG. 4 to the output of the power source 10, the output of the drivers 36, as an output to each of the input selector 35 and output selector 37, and to the light sensor 48 which is connected to the LED light sources 401, 402. In FIG. 4, the light sensor 48 is shown as connected to only the second LED light source 402. However, in an embodiment, the same light sensor 48 or another light sensor can also be connected to the LED light source 401. Accordingly, throughout each of the different phases of the system, the microcontroller checks the connections. The microcontroller 38 can be a processor or even a special purpose or general computer. The microcontroller 38 can be connected to a variety of additional sources, including an internet/WiFi/Bluetooth® or other networked connection to a separate computer terminal, a server, or even a networked system 39. The microcontroller 38 can be connected to keyboard/key pad/display screen to allow direct access to the microcontroller by a user or administrator.

Figure 5A:
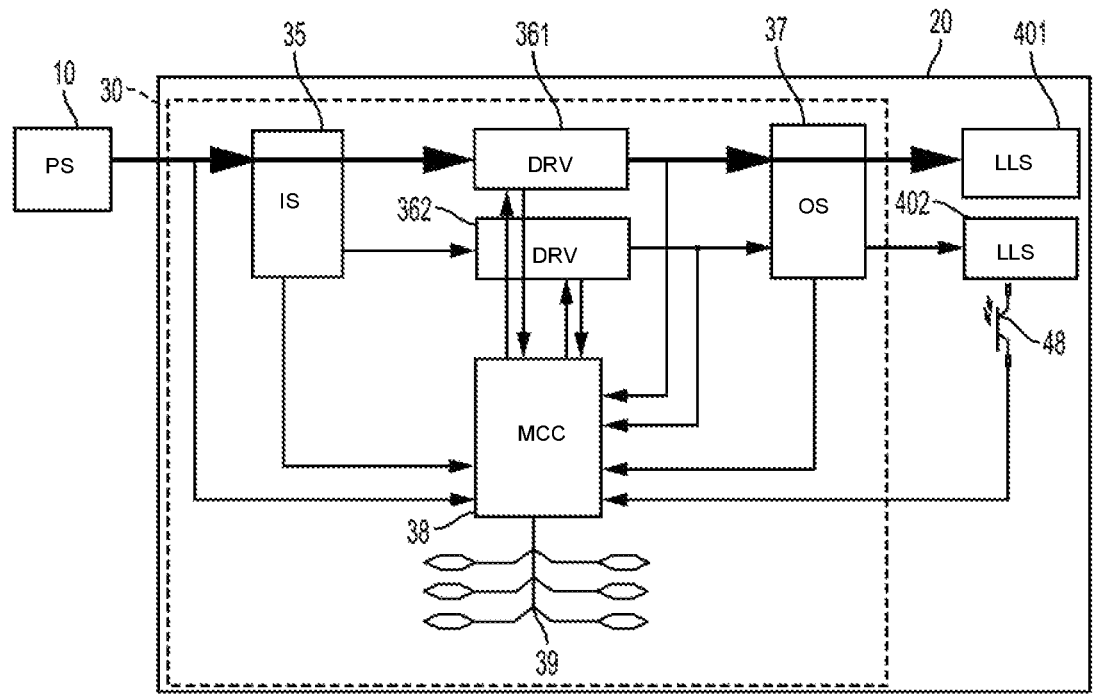
FIG. 5A shows an example LED lighting system having Topology 1, 2, 2 according to an embodiment of the present invention.
Figure 5B:
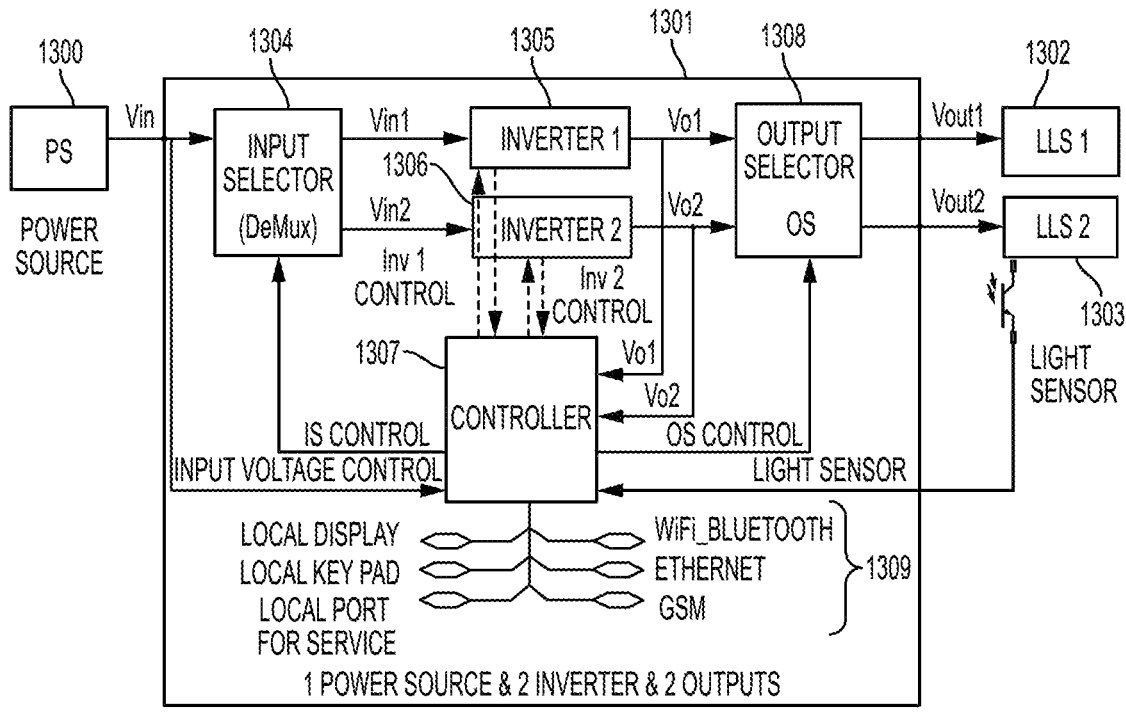
FIG. 5B shows an example LED lighting system having Topology 1, 2, 2 according to an embodiment of the present invention.

FIGS. 5A and 5B show example embodiments of an LED lighting system 20 in the topology 1, 2, 2 (1×Inputs power sources power source 10×2 DRV (361 and 362)×2 LLS (401 and 402)

For the scope of the topology 1×2×2, the IPM consists of different parts as follows: 1) an IS 35 2) two DRV 361 and 362, 3) an OS 37 4) a MCC 38, and 5) COM 39.

For the scope of the topology 1×2×2, the LLS consist of different parts as follows: two secondary lighting sources 401 and 402.

The two DRV (361 and 362) are connected in parallel between them. The IPM 30 can be connected to power source 10 in one end and in the other end can be connected with one of the plurality of LED lighting source (401 or 402) and the IPM 30 communicates with the MCC 38. Only one of driver 36 respective (361 or 362) is functional at one time, and only one of LED lighting source 40 respective (401 or 402) is functional at one time. When either the driver 361 or LED lighting source 401, or both, become non-functional or defective, the next spare driver, driver 362 will replace the initially selected DRV 361, respective the next spare LED lighting source, LED lighting source 402 will replace the initially selected LED lighting source 401, or both of them. The microcontroller or control processor 38 measures the Vin and Vout, and communicates with the input selector 35, respective output selector 37, and the light sensor 48. The microcontroller 38 determines if is functional, in terms of driver(s) (361,362) and/or LED lighting source(s) (401,402). When a faulty element driver (361,362) or LED lighting source (401,402)) is detected, the MCC 38 command the next spare driver to connect to the power source 10 via its input selector 35, respective the microcontroller 38 command the next spare LED lighting source to connect to the driver (361 or 362) via its output selector 37.

Under this scenario, a power source 10 can be connected to one of the plurality of driver 36 (361 or 362) via the input selector 35, while the one of the plurality of LED lighting sources 40 (401 or 402) is connected to one of plurality of the drivers 36 (361,362) via the output selector 37. The light sensor 48 what is assemble of the LED lighting source 40, respective LED lighting system and is connected to microcontroller 38.

In an embodiment, the power source 10 is connected to driver 361 via the input selector 35, while the LED lighting source 401 is connected to driver 361 via the output selector 37. The light sensor LS 48 what is assemble of the LED lighting source 40, respective LED lighting system and is connected to microcontroller 38.

In an embodiment, the microcontroller 38 can obtain status information as to the quality of the current coming from power source 10, the adequacy of the current coming out of the input selector 35, and the driver 361, and the adequacy of the output selector 37 to the LED lighting source 401. The microcontroller 38 communicates with the input selector 35, the drivers 361, the output selector 37 and a light sensor 48 and the LED lighting source 401. From the connection of the power source 10 to the input selector 35, to the microcontroller 38 measures the Input Voltage (Vin). Additionally, after the driver 361 is connected to a power source 10 through input selector 35, the microcontroller 38 measures the Output Voltage (Vout) output selector 37 to determine whether the adequate voltage transformation took place and the appropriate/correct voltage level is transmitted to the LED lighting source 401.

In an embodiment, when the measurements of Vin and Vout are acceptable, the microcontroller 38 commands to the output selector 37 and permits the voltage to pass through to the LED lighting source 401. The measurement of Vin permits the MCC 38 to determine whether there is adequate voltage level coming from the PS 10, while the measurement of Vout permits the MCC 38 to determine whether the adequate voltage transformation took place and the appropriate/correct voltage level is transmitted to the LED lighting source 401. When the measurements of Vin and Vout are acceptable, the MCC 38 commands the output selector 37 and permits the voltage to pass through to the LED lighting source 401.

Power Source PS 10>Input Selector IS 35>Driver DRV 361>Output Selector OS 37>LED Lighting Source 401

In an embodiment, if the break in the circuit is detected between the driver 361 and the output selector 37, as long as no break between the power source 10 and the input selector 35 is diagnosed, the microcontroller 38 send a message and will instruct the input selector 35 to connect to a different spare drivers DRV,DRV 362 from plurality of the DRV available (362) and, if the LED lighting source 401 fails to illuminate, light sensor LS 48 will send a message the microcontroller MCC 38 and this send a message and will instruct the OS 37 to connect to a different spare LED lighting source, LED lighting source 402 from plurality LED lighting sources (402) and pathways are form PPW:
PS 10>IS 35>DRV 361>OS 37>LED lighting source 402
this configuration these are possible next permutations:
PS 10>IS 35>DRV 361>OS 37>LED lighting source 401
PS 10>IS 35>DRV 362>OS 37>LED lighting source 401
PS 10>IS 35>DRV 361>OS 37>LED lighting source 402
PS 10>IS 35>DRV 362>OS 37>LED lighting source 402

Figure 5C:
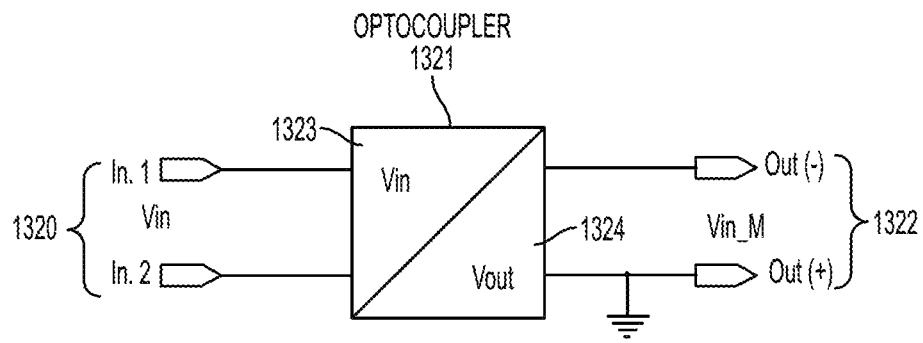
FIG. 5C shows an example LED lighting system according to an embodiment of the present invention.

FIG. 5C shows an example input voltage measurement block according to an embodiment of the present invention. In FIG. 5C, the inputs 1320 enter an optocoupler 1321 having a voltage in 1323 and a voltage out 1324, which outputs a measurement of the voltage 1322. In this example, Vin is the voltage delivered by the PS. Vin1 is the input voltage of inverter 1 (or driver DRV 1). Vin2 is the input voltage of inverter 2 (or driver DRV 2). Vout1 is the output voltage delivered by inverter 1; Vout2 is the output voltage delivered by inverter 2. For example, in an embodiment of the present invention, a microcontroller can read the voltage using at least one of the following methods: Galvanic insulated (i.e., using liner optocoupler(s)) and non-Galvanic insulation (i.e., a divider made using, e.g., resistor(s)). FIG. 5C shows a logical block for the Galvanic insulated input voltage measurement. For example, the input voltage Vin is converted into the light by a photodiode. The light is transformed back into a scaled voltage Vin_M that can be read by the microcontroller MCC through, e.g., an analogical bus M-1.

Figure 5D:
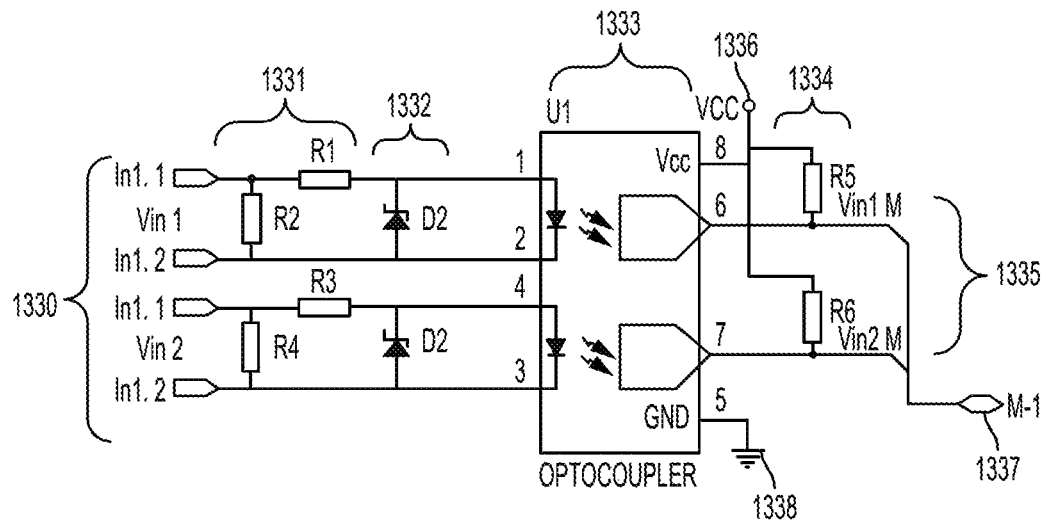
FIG. 5D shows an example LED lighting system according to an embodiment of the present invention.

FIG. 5D shows an example integrated chip design having voltage inputs 1330 which travel through the circuit resistor(s) 1332, pass diode 1332, through an optocoupler 1333, which is grounded 1338, thought a resistor 1334 to an output voltage measurement 1335. An analogical bus M-1 is shown connected to the output voltages 1335. In an embodiment, the resistors R1, R2, R3, R4 1331 and R5, R6 can be set to values depending upon the range of the Vin range. In an embodiment, the optocoupler effectively ensures the voltage transformation and a very high insulation between inputs and outputs.

Figure 5E:
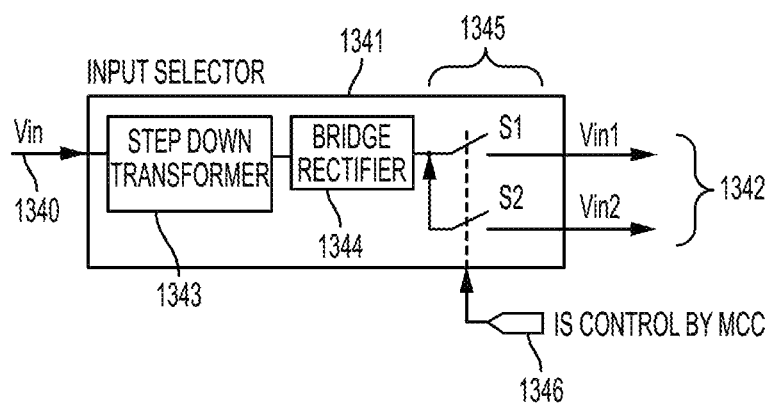
FIG. 5E shows an example LED lighting system according to an embodiment of the present invention.

FIG. 5E shows an example input selector system. For example, Vin 1340 enters an input selector 1341. The input selector 1341 includes a stepdown transformer 1343, a bridge rectifier 1344, and a switch(es) 1345. The Vin1 and Vin2 1342 is outputted. In an embodiment, the microcontroller MCC 1346 can be connected or associated with, in order to control, the input selector 1341. In an embodiment, the input selector IS can be made using, e.g., solid state relays, and/or electromechanical relays. In FIG. 5E, for example, the system is shown using solid state relays.

FIG. 5F shows an example output selector system. For example, the Vo1 and Vo2 1350 voltages enter an output selector 1351 having switches, in order to put out a Vout1 and Vout2 output voltages 1352. In an embodiment, the microcontroller MCC 1353 can be connected or associated with, in order to control, the output selector 1351.

Figure 5G:
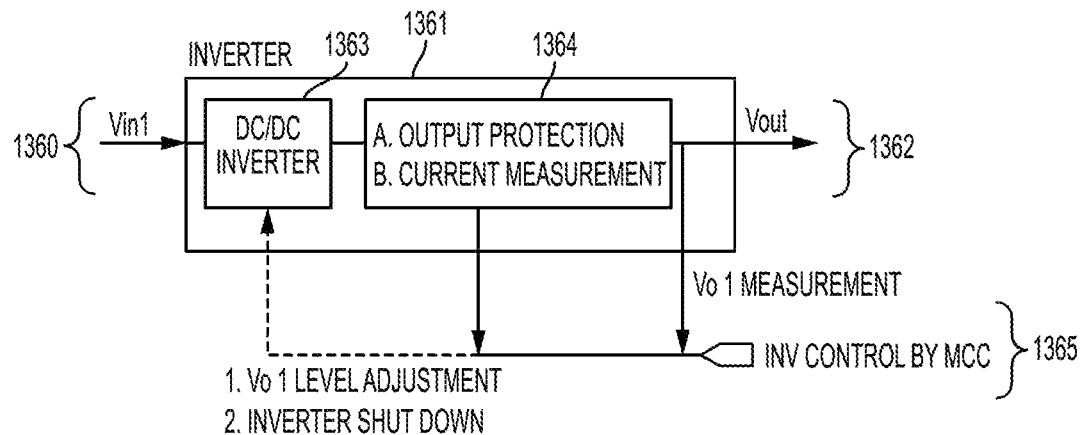
FIG. 5G shows an example LED lighting system according to an embodiment of the present invention.

FIG. 5G shows an example inverter system. For example, the Vin1 voltage 1360 enters an inverter 1361. The inverter 1361 can include a DC/DC (direct current/direct current) inverter 1363, and at least one module 1364 that can effect at least an output protection and a measurement of current. The Vo1 1362 is outputted from the inverter 1361. In an embodiment, the microcontroller MCC 1365 can be connected or associated with, in order to control, the voltage level adjustment and/or inverter shut down of the DC/DC inverter 1363. In an embodiment, the microcontroller MCC 1365 can receive information from and/or give instruction to the at least one module 1364 and the Vo1 output measurement.

Figure 5H:
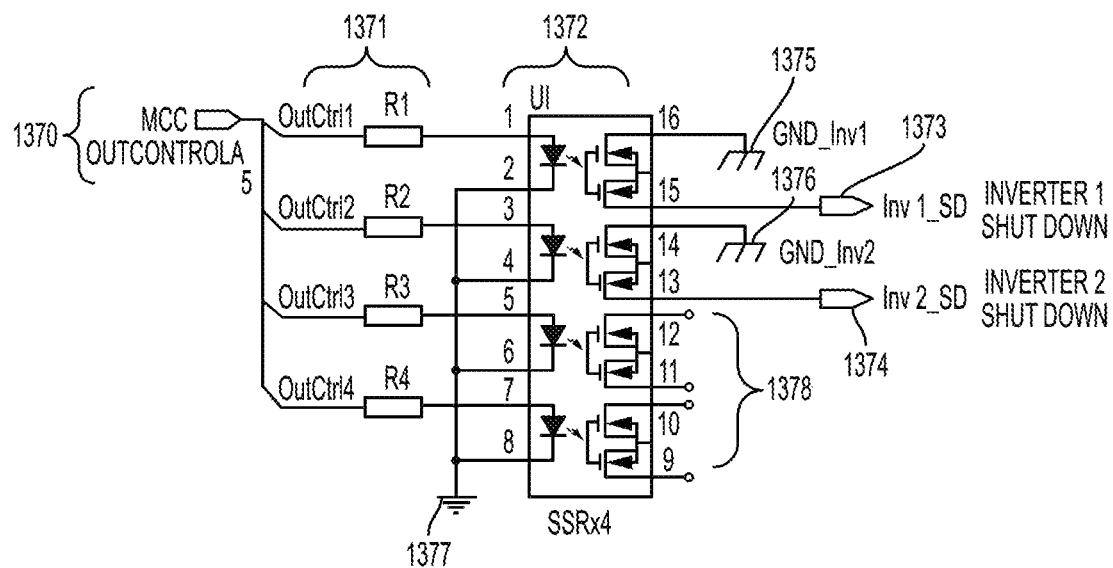
FIG. 5H shows an example LED lighting system according to an embodiment of the present invention.

FIG. 5H shows an example logic output signal interfaces. For example, for the logic control of the inverter as an "inverter shutdown" can be used to low power solid state relays with the benefit, e.g., that multiple control interfaces are embedded in only one chip integrate. For example, the microcontroller MCC OutControls 1370 inputs through a resistor (s0 1371 to solid state relays 1372, and output to inverter shutdown 1373, 1374. The system is grounded at various staged 1377, 1375, 1376. Other outputs can occur at 1378.

Figure 6:
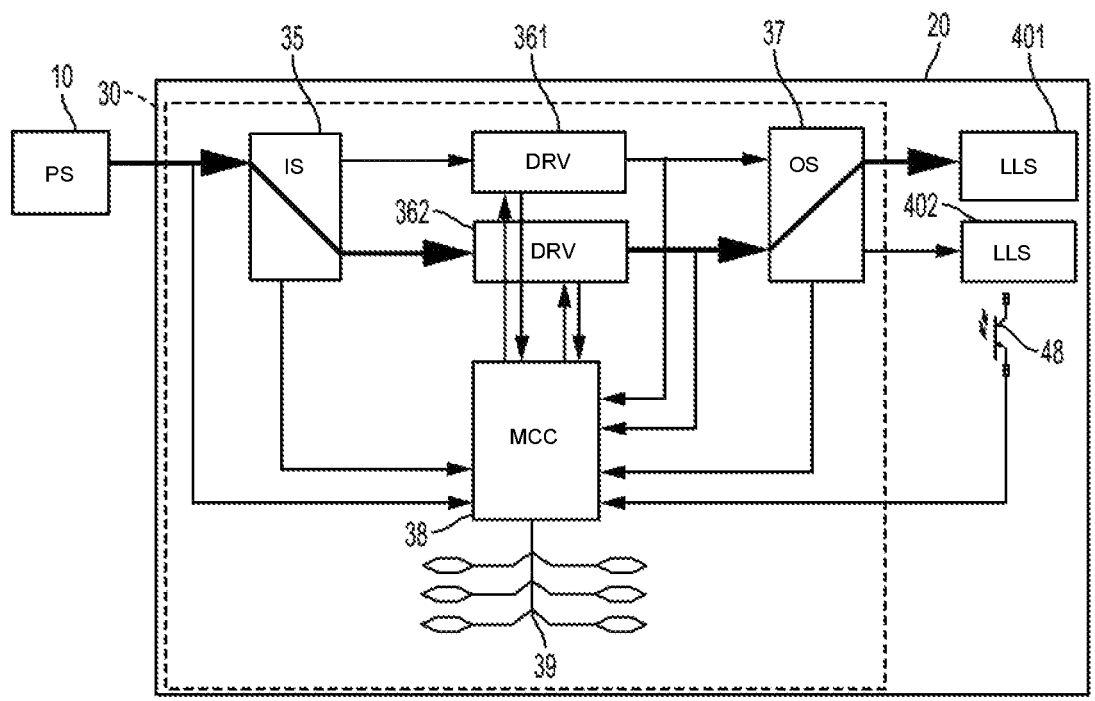
FIG. 6 shows an example LED lighting system having Topology 1, 2, 2 according to an embodiment of the present invention.

FIG. 6 shows an example LED lighting system 20 in the topology 1, 2, 2 (1 PS 10×2 DRV 36 (361 and 362)×2 LED lighting source 40 (401 and 402) when commutation policy—Ending configuration LED lighting source 401 connected to power source 10 through driver 361. In an embodiment of the invention, the microcontroller 38 obtain status information as to the quality of the current coming from power source 10, the adequacy of the current coming out of the input selector 35, and the driver 361, and the adequacy of the output selector 37 to the LED lighting source 401. The microcontroller 38 communicates with the input selector 35, the drivers 361, the output selector 37 and a light sensor 48 and the LED lighting source 401. From the connection of the power source 10 to the input selector 35, to the microcontroller 38 measures the Input Voltage (Vin). Additionally, after the driver 361 is connected to a power source 10 through selector 35, the microcontroller 38 measures the Output Voltage (Vout) output selector 37 to determine whether the adequate voltage transformation took place and the appropriate/correct voltage level is transmitted to the LED lighting source 401. In this situation, the measurements of Vin and Vout are acceptable, the microcontroller 38 commands to the output selector 37 and permits the voltage to pass through to the LED lighting source 401, e.g., in FIG. 6. The measurement of Vin permits the microcontroller 38 to determine whether there is adequate voltage level coming from the power source 10, while the measurement of Vout permits the microcontroller 38 to determine whether the adequate voltage transformation took place and the appropriate/correct voltage level is transmitted to the LED lighting source 401. When the measurements of Vin and Vout are acceptable, the microcontroller 38 commands the output selector 37 and permits the voltage to pass through to the LED lighting source 401, creating a pathway PPW 1: PS 10>IS 35>DRV 361>OS 37>LED lighting source 401

Figure 7A:
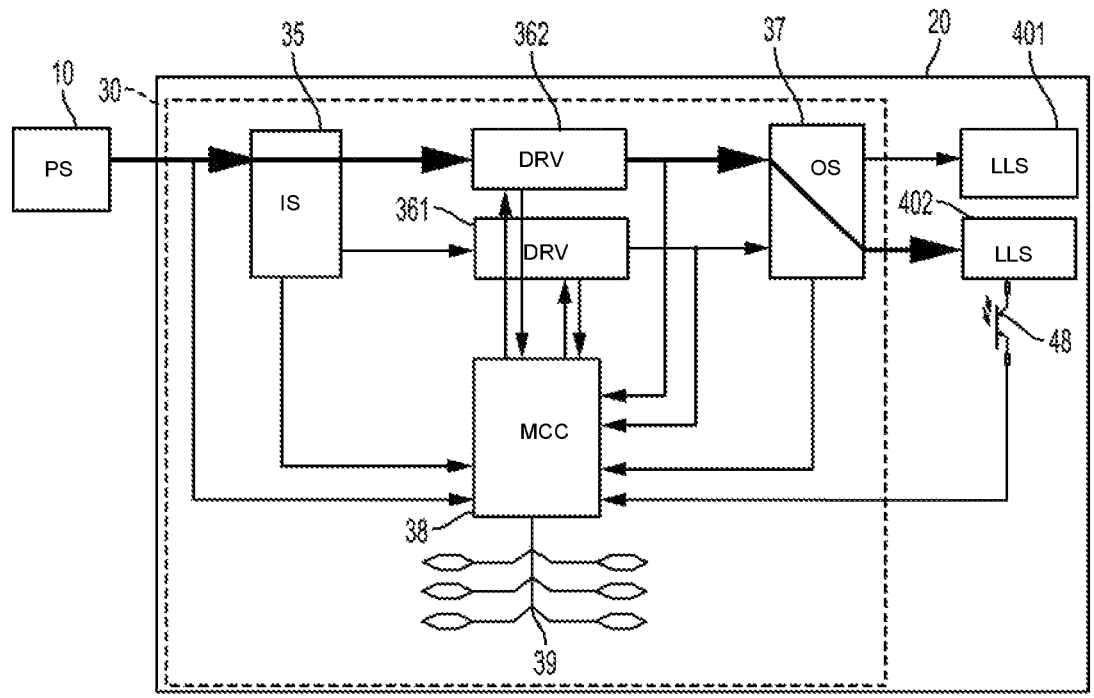
FIG. 7A shows an example LED lighting system having Topology 1, 2, 2 according to an embodiment of the present invention.

FIG. 7A shows an example embodiment of the LED lighting system 20 having a topology 1, 2, 2 (1 power source 10×2 drivers 36 (361 and 362)×2 LED lighting sources 40 (401 and 402), commutation policy ending configuration LED lighting source 401 connected to power source 10 through driver 362).

In this embodiment of the LED lighting system 20, a break in the circuit appears, and is detected between the driver 361 and the output selector 37, as long as no break between the power source 10 and the input selector 35 is diagnosed, the microcontroller 38 sent a message instructed the input selector 35 to connect to a different spare driver, driver 362 from plurality of the drivers available (362).

In FIG. 7A, the driver 361 become non-functional or defective and the next spare driver 362 replaced the initially selected driver 361. This ensures LED lighting system 20 is operational, creating a new pathway PPW 2:
PS 10>IS 35>DRV 362>OS 37>LED lighting source 401

FIG. 7B shows an example light sensor system. For example, ambient light 1400 enters the light sensor system 1401, having a light sensor 1403 and a transformer to transform the light into voltage 1404, and output to the microcontroller 1402. For example, this system can include a photo-transistor that converts the light into a voltage. The microcontroller can effect an analog-to-digital conversion (ADC).

Figure 7C:
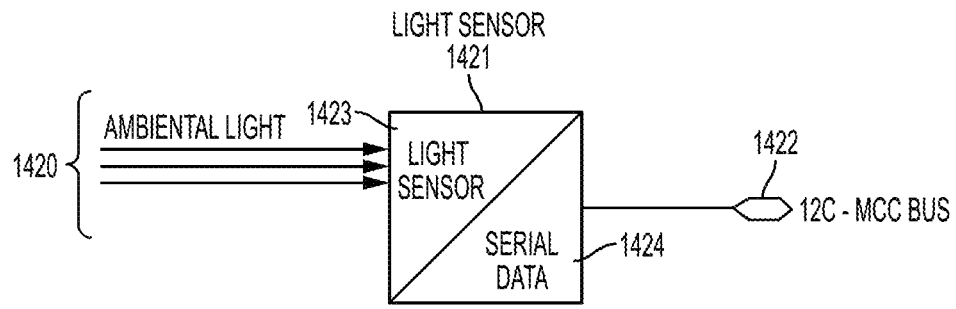
FIG. 7C shows an example LED lighting system according to an embodiment of the present invention.

FIG. 7C shows an example light sensor system. For example, ambient light 1420 enters the light sensor system 1421, having a light sensor 1423 and serial data 1424, and output to the microcontroller via a bus 1422. For example, the light sensor system 1421 includes a detection element, e.g., a photo-transistor, and an ADC module that performs the analog to digital conversion. For example an OPT3001 light sensor is used. The microcontroller can use a serial digital bus that reads the digital value from the OPT3001. The OPT3001 is a chip comprised of two parts: one optical to collect the ambient light and one to convert the light level into a digital value.

Figure 7D:
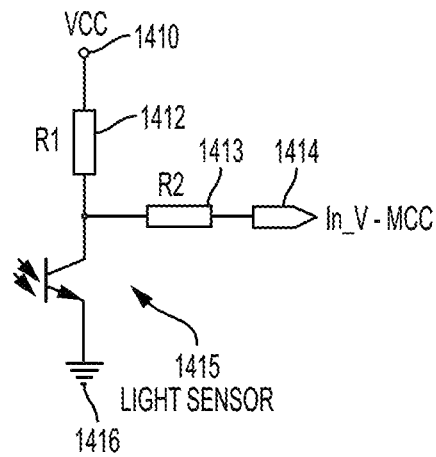
FIG. 7D shows an example LED lighting system according to an embodiment of the present invention.

FIG. 7D shows an example light sensor system. For example, the voltage input 1410 passes through resistor 1412 to light sensor 1415. The voltage In_V 1414 passes through the resistor 1413 to the microcontroller. The system is grounded 1416. For example, the light level is converted into a voltage signal that is "read" by the microcontroller using a voltage analog input, and converted internally into a digital value using software processes in the microcontroller.

Figure 7E:
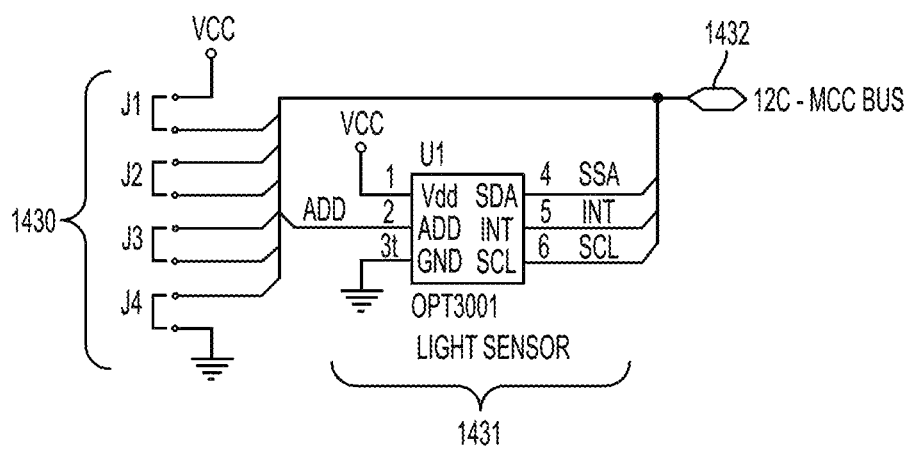
FIG. 7E shows an example LED lighting system according to an embodiment of the present invention.

FIG. 7E shows an example light sensor system. For example, the voltage 1430 travels through the light sensor 1431 to the bus connected to the microcontroller 1432. In this example, the OPT3001 chip is shown. Other components can be used instead of the OPT3001 chip, which is being used for example purposes here to explain an embodiment of the present invention.

Figure 8:
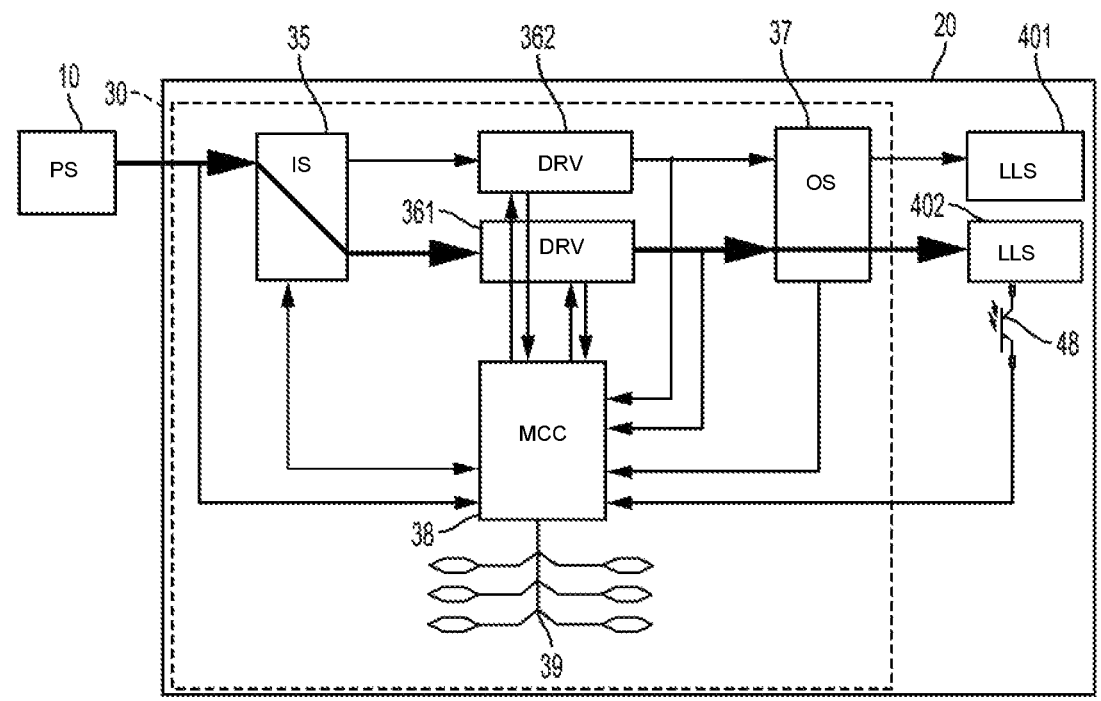
FIG. 8 shows an example LED lighting system having Topology 1, 2, 2 according to an embodiment of the present invention.

FIG. 8 shows an example embodiment of the LED lighting system 20 in the topology 1, 2, 2 (one power source 10×two drivers 36 (361 and 362)×two LED lighting sources 40 (401 and 402) commutation policy ending configuration LED lighting source 402 connected to power source 10 through driver 361).

FIG. 8 shows when the LED lighting source 401 becomes defective or inoperative. For example, when the LS 48 sends information to the MCC 38 that the LED lighting source 401 is not adequate, and the measurement of Vin permits the MCC 38 to determine whether there is adequate voltage level coming from the PS 10, while the measurement of Vout permits the MCC 38 to determine whether the adequate voltage transformation took place and the appropriate/correct voltage level, the MCC 38 commands the OS 37 to disconnect from its LLS 401, and to establish contact with the next available LED lighting source, LED lighting source 402. When only the LED lighting source 401 becomes nonfunctional, the DRV 361 connects to the LED lighting source 402.

In FIG. 8, the LED lighting source 401 becomes non-functional or defective; the next spare LED lighting source 402 replaces the initially selected LED lighting source 401. This ensures LED lighting system 20 is operational, creating a new PPW 3:
PS 10>IS 35>DRV 361>OS 37>LED lighting source 402

Figure 9:
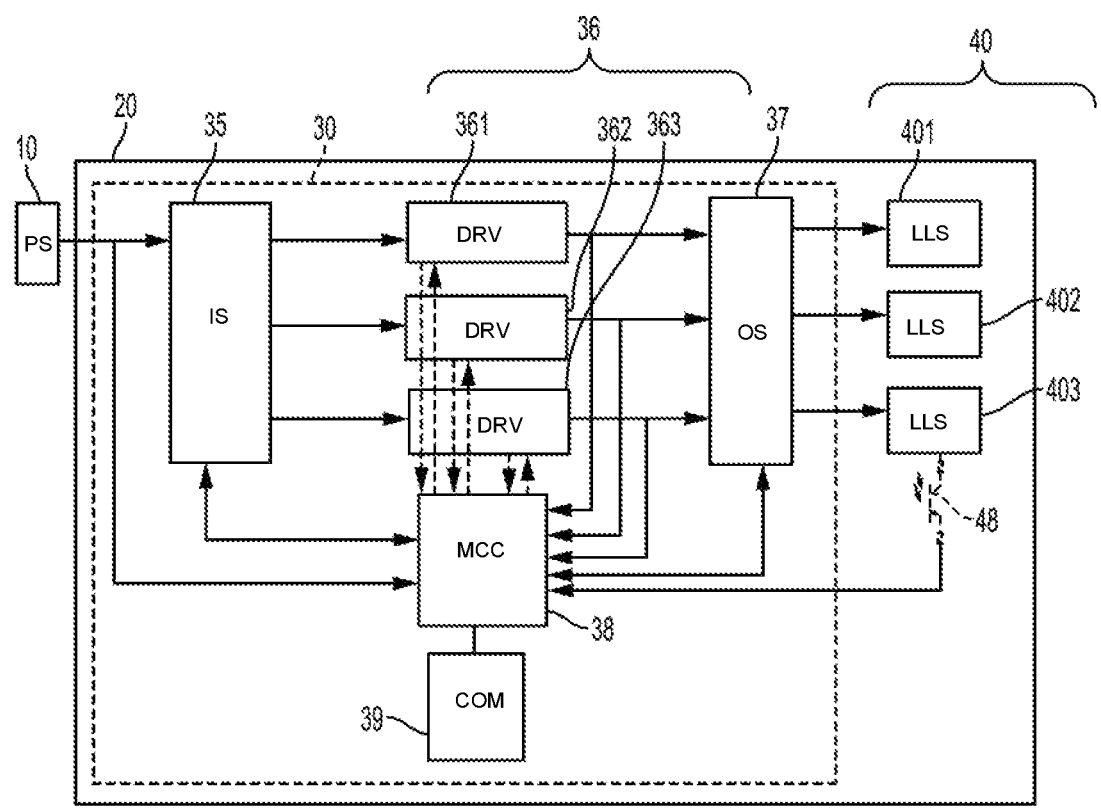
FIG. 9 shows an example LED lighting system having Topology 1, 3, 3 according to an embodiment of the present invention.

FIG. 9 shows an LED lighting system 20 in the topology 1, 2, 2 (1 PS 10×2 DRV 36 (361 and 362)×2 LED lighting source 40 (401 and 402) commutation policy ending configuration LED lighting source 402 connected to PS 10 through DRV 362.

FIG. 9 shows an example LED lighting system 20, where a break in the circuit appears and is detected between the DRV 361 and the OS 37. As long as no break between the PS 10 and the IS 35 is diagnosed, the MCC 38 sends a message instructing the IS 35 to connect to a different spare DRV, DRV 362 from plurality of the DRV available (362) and the LED lighting source 401 fails to illuminate, LS 48 sends a message to the MCC 38, and the MCC sends a message instructing the OS 37 to connect to a different spare LED lighting source, LED lighting source 402 from plurality LED lighting sources (402) creating a new pathway PPW 4.

In FIG. 9, the DRV 361 becomes non-functional or defective, the next spare DRV 362 replaces the initially selected DRV 361; and LED lighting source 401 becomes non-functional or defective, the next spare LED lighting source 402 replaces the initially selected LED lighting source 401 to ensure LED lighting system 20 good operation and creating a new PPW 4:
PS 10>IS 35>DRV 362>OS 37>LED lighting source 402

Figure 10:
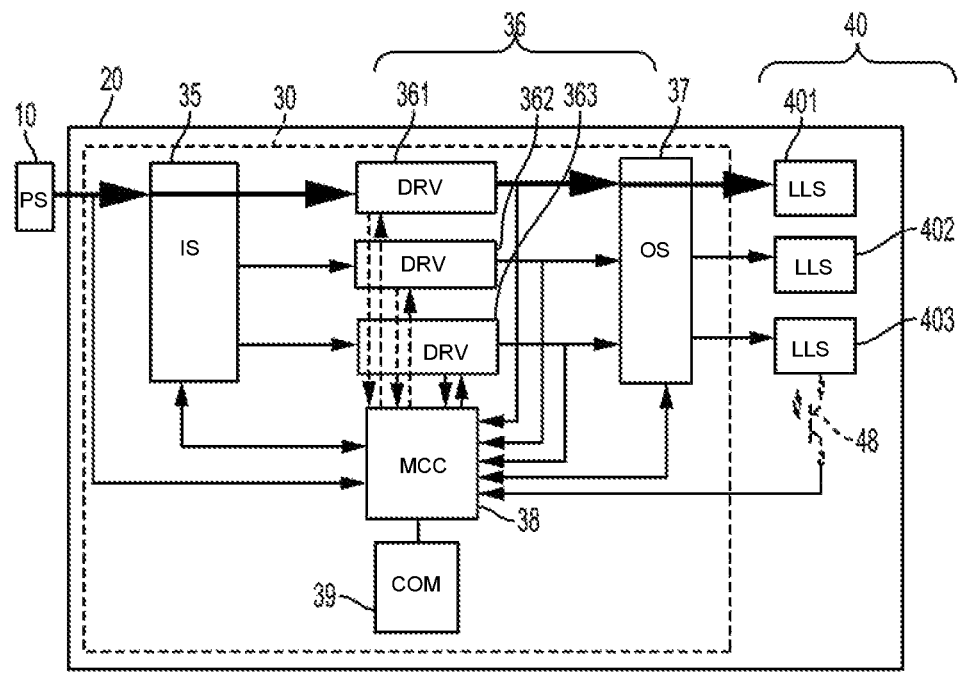
FIG. 10 shows an example LED lighting system having Topology 1, 3, 3 according to an embodiment of the present invention.

FIG. 10 shows an example LED lighting system 20 in the topology 1, 3, 3 (1 PS 10×3 DRV 36 (361 and 362 and 363)×3 LED lighting source 40 (401 and 402 and 403). In this configuration, these are possible next permutations:
PS 10>IS 35>DRV 361>OS 37>LED lighting source 401
PS 10>IS 35>DRV 361>OS 37>LED lighting source 402
PS 10>IS 35>DRV 361>OS 37>LED lighting source 403
PS 10>IS 35>DRV 362>OS 37>LED lighting source 401
PS 10>IS 35>DRV 362>OS 37>LED lighting source 402
PS 10>IS 35>DRV 362>OS 37>LED lighting source 403
PS 10>IS 35>DRV 363>OS 37>LED lighting source 401
PS 10>IS 35>DRV 363>OS 37>LED lighting source 402
PS 10>IS 35>DRV 363>OS 37>LED lighting source 403

The three DRV (361 and 362 and 363) are connected in parallel between them. THE IPM 30 can be connected to PS 10 in one end and in the other end can be connected with one of the plurality of LLS (401 or 402 or 403) and the IPM 30 communicates with the MCC 38. Only one of DRV 36 respective (361 or 362 or 363) is functional at one time, and only one of LLS 40 respective (401 or 402 or 403) is functional at one time. When either the DRV 361 or LED lighting source 401, or both, become non-functional or defective, the next spare DRV, DRV 362 or DRV 363 will replace the initially selected DRV 361, respective the next spare LED lighting source, LED lighting source 402 or LED lighting source 403 will replace the initially selected LLS 401, or both of them. The MCC 38 measures the Vin and Vout, and communicates with the IS 35, respective OS 37, and the LS 48. The MCC 38 determines if functional, in terms of DRV (361,362,363) and/or LED lighting source (401,402,403). When a faulty element DRV (361,362,363) or LED lighting source (401,402,403)) is detected, the MCC 38 commands the next spare DRV to connect to the PS 10 via a respective IS 35, the MCC 38 commands the next spare LED lighting source to connect to the DRV (361 or 362 or 363) via its respective OS 37.

FIG. 10 shows an example LED lighting system 20 in the topology 1, 3, 3 (1 PS 10×3 DRVs 36 (361 and 362 and 363)×3 LED lighting source 40 (401 and 402 and 403) when commutation policy—Ending configuration LED lighting source 401 connected to PS 10 through DRV 361.

In an embodiment, the MCC 38 obtains status information as to the quality of the current coming from PS 10, the adequacy of the current coming out of the IS 35, and the DRV 361, and the adequacy of the OS 37 to the LED lighting source 401. The MCC 38 communicates with the IS 35, the DRVs 361, the OS 37 and a LS 48 and the LED lighting source 401. From the connection of the PS 10 to the IS 35, to the MCC 38 measures the Input Voltage (Vin). Additionally, after the DRV 361 is connected to a PS 10 through IS 35, the MCC 38 measures the Output Voltage (Vout) OS 37 to determine whether the adequate voltage transformation took place and the appropriate/correct voltage level is transmitted to the LED lighting source 401. In this situation the measurements of Vin and Vout are acceptable, the MCC 38 commands to the OS 37 and permits the voltage to pass through to the LED lighting source 401, FIG. 10. The measurement of Vin permits the MCC 38 to determine whether there is adequate voltage level coming from the PS 10, while the measurement of Vout permits the MCC 38 to determine whether the adequate voltage transformation took place and the appropriate/correct voltage level is transmitted to the LED lighting source 401. When the measurements of Vin and Vout are acceptable, the MCC 38 commands the OS 37 and permits the voltage to pass through to the LED lighting source 401, creating a pathway PPW 1: PS 10>IS 35>DRV 361>OS 37>LED lighting source 401 FIG. 10

Figure 11:
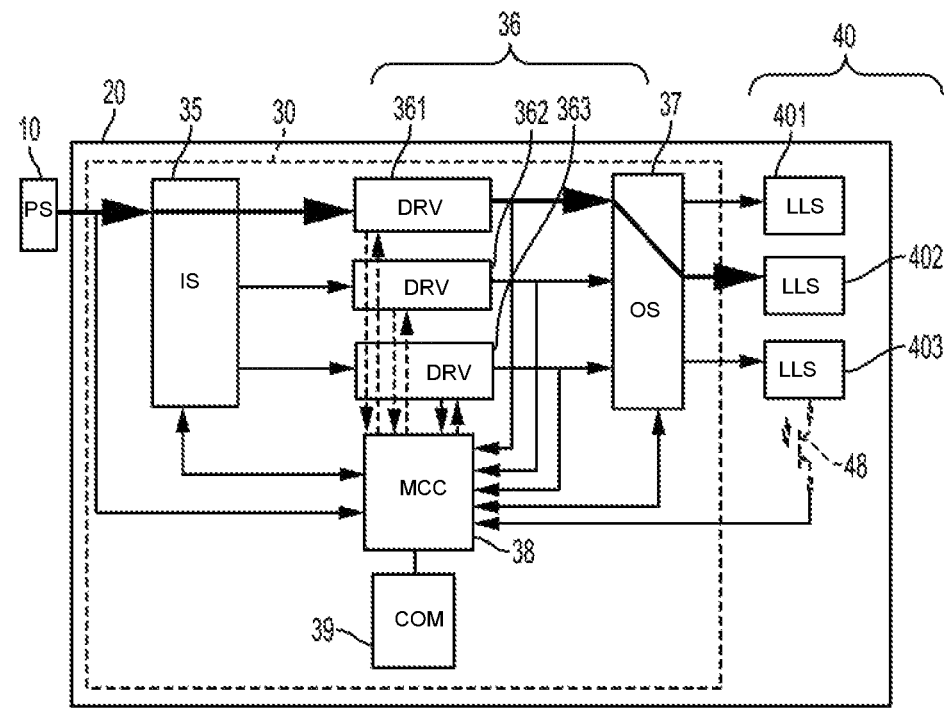
FIG. 11 shows an example LED lighting system having Topology 1, 3, 3 according to an embodiment of the present invention.

FIG. 11 shows an example LED lighting system 20 in the topology 1, 3, 3 (1 PS 10×3 DRV 36 (361 and 362 and 363)×3 LED lighting source 40 (401 and 402 and 403) commutation policy ending configuration LED lighting source 402 connected to PS 10 through DRV 361.

FIG. 11 shows when the LED lighting source 401 becomes defective or inoperative. Thus, when the LS 48 sends information to the MCC 38 that the LED lighting source 401 is not adequate, the measurement of Vin permits the MCC 38 to determine whether there is adequate voltage level coming from the PS 10, while the measurement of Vout permits the MCC 38 to determine whether the adequate voltage transformation took place and the appropriate/correct voltage level the MCC 38 commands the OS 37 to disconnect from its LED lighting source 401, and to establish contact with the next available LED lighting source, LLS 402. When only the LED lighting source 401 become nonfunctional, the DRV 361 connected to the LLS 402.

In FIG. 11, the example LED lighting source 401 becomes non-functional or defective. The next spare LLS 402 replaces the initially selected LLS 401. This ensures LED lighting system 20 is operational, creating a new PPW 2:
PS 10>IS 35>DRV 361>OS 37>LED lighting source 402

Figure 12:
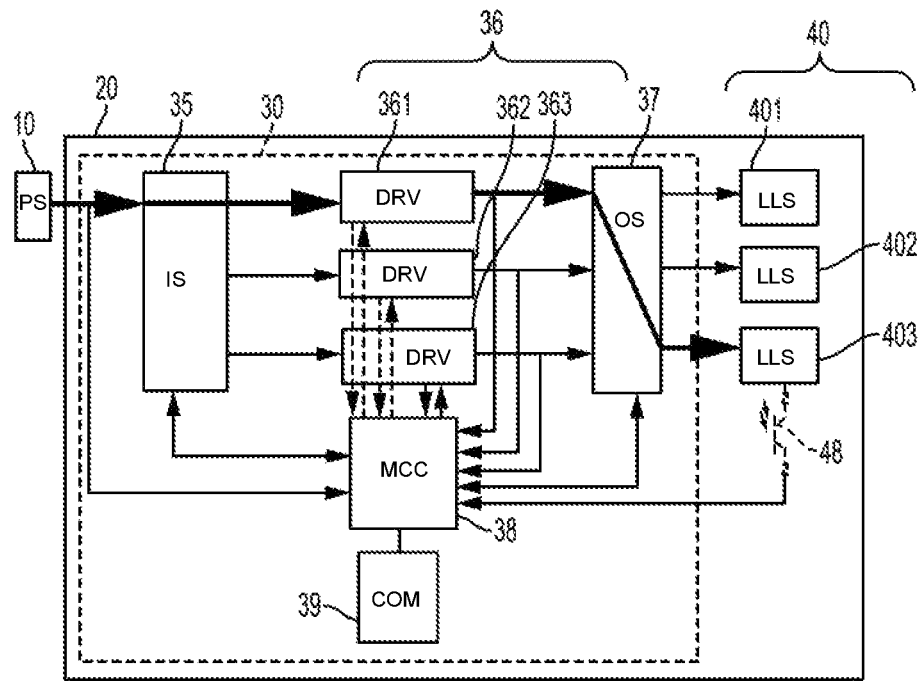
FIG. 12 shows an example LED lighting system having Topology 1, 3, 3 according to an embodiment of the present invention.

FIG. 12 shows an example LED lighting system 20 in the topology 1, 3, 3 (1 PS 10×3 DRV 36 (361 and 362 and 363)×3 LED lighting sources 40 (401 and 402 and 403) commutation policy ending configuration LLS 403 connected to PS 10 through DRV 361.

FIG. 12 shows when the LED lighting source 401 is replaced with LED lighting source 402, but LED lighting source 402 also becomes defective or inoperative. Thus, when the LS 48 sends information to the MCC 38 that the LLS 402 is not adequate, and the measurement of Vin permits the MCC 38 to determine whether there is adequate voltage level coming from the PS 10, while the measurement of Vout permits the MCC 38 to determine whether the adequate voltage transformation took place DRV 361 and the appropriate/correct voltage level the MCC 38 commands the OS 37 to disconnect from its LLS 402, and to establish contact with the next available LLS, LLS 403. When the LLS 402 become nonfunctional, the DRV 361 connected to the LLS 403.

In FIG. 12, the LLS 402 becomes non-functional or defective; the next spare LED lighting source 403 replaces the last use selected LLS 402. This ensures LED lighting system 20 is operational, creating a new PPW 3:
PS 10>IS 35>DRV 361>OS 37>LED lighting source 403

Figure 13:
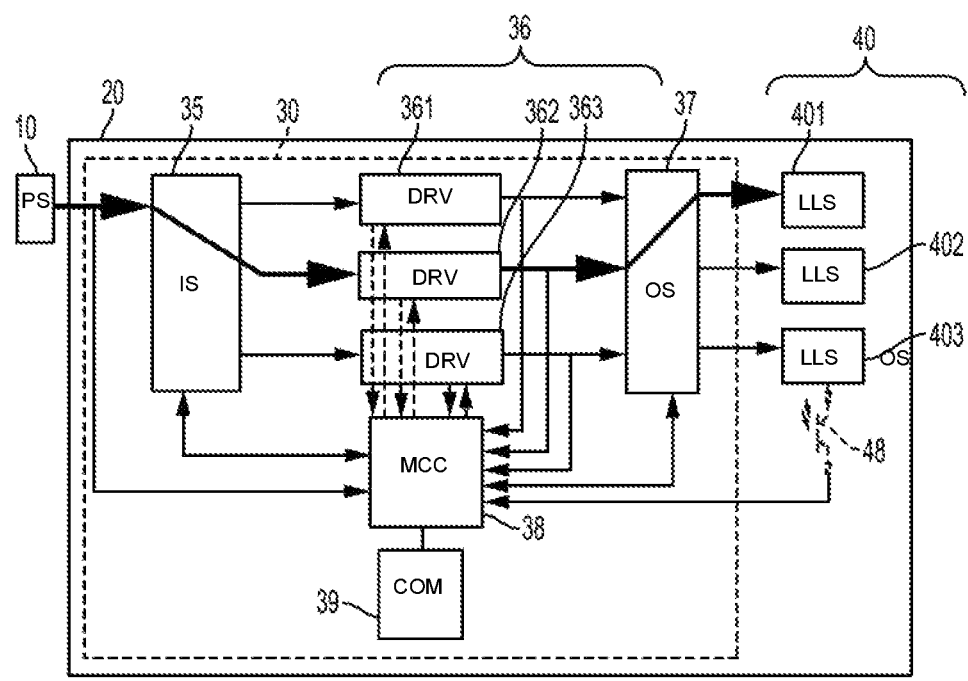
FIG. 13 shows an example LED lighting system having Topology 1, 3, 3 according to an embodiment of the present invention.

FIG. 13 shows an example LED lighting system 20 in the topology 1, 3, 3 (1 PS 10×3 DRV 36 (361 and 362 and 363)×3 LED lighting source 40 (401 and 402 and 403) commutation policy ending configuration LED lighting source 401 connected to PS 10 through DRV 362.

In FIG. 13, a break in the circuit appears and is detected between the DRV 361 and the OS 37, As long as no break between the power source PS 10 and the input selector IS 35 is diagnosed, the MCC 38 sends a message instructing the IS 35 to connect to a different spare DRV, DRV 362 from plurality of the DRV available (362).

In FIG. 13, the DRV 361 becomes non-functional or defective and the next spare DRV 362 replaces the initially selected DRV 361. This ensures LED lighting system 20 is operational, creating a new pathway PPW 4:
PS 10>IS 35>DRV 362>OS 37>LED lighting source 401

Figure 14:
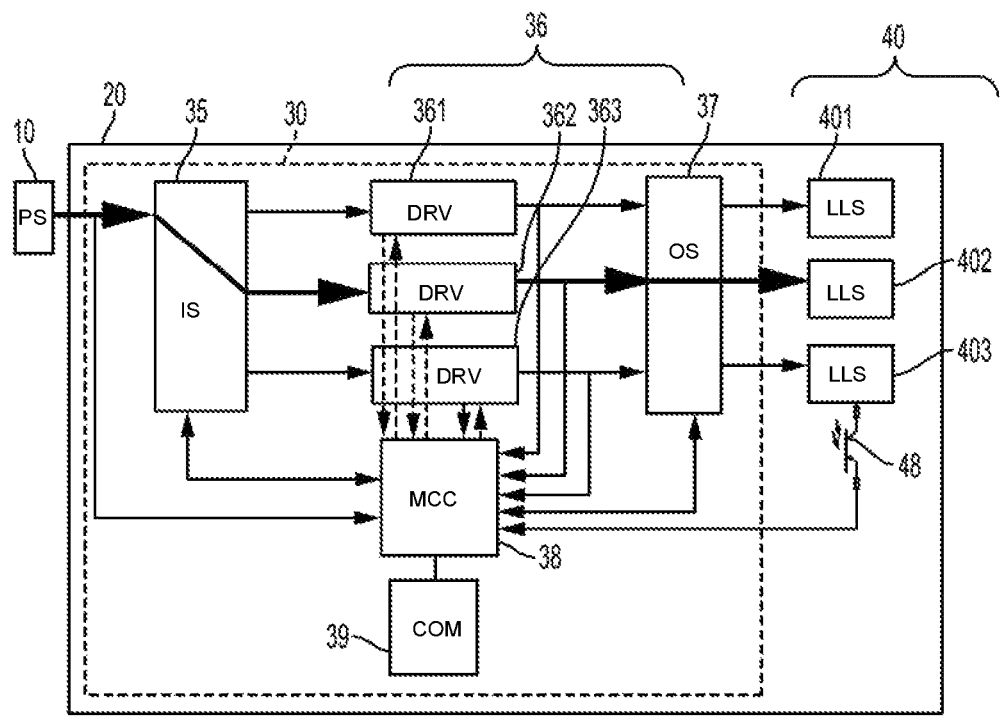
FIG. 14 shows an example LED lighting system having Topology 1, 3, 3 according to an embodiment of the present invention.

FIG. 14 shows an example LED lighting system 20 in the topology 1, 3, 3 (1 PS 10×3 DRV 36 (361 and 362 and 363)×2 LED lighting source 40 (401 and 402 and 403) commutation policy ending configuration LED lighting source 402 connected to PS 10 through DRV 362.

FIG. 14 shows an LED lighting system 20 it appeared a break in the circuit and is detected between the DRV 361 and the OS 37, as long as no break between the power source PS 10 and the input selector IS 35 is diagnosed, the MCC 38 sent a message instructed the IS 35 to connect to a different spare DRV,DRV 362 from plurality of the DRV available (362,363) and the LLS 401 fails to illuminate, LS 48 sent a message the MCC 38 and this send a message and will instruct the OS 37 to connect to a different spare LED lighting source, LED lighting source 402 from plurality LLSs (401,402,403) creating a new pathway PPW 5:

In FIG. 14, the DRV 361 becomes non-functional or defective, the next spare DRV 362 was replaced the initially selected DRV 361, and LLS 401 becomes non-functional or defective, the next spare LLS 402 was replaced the initially selected LED lighting source 401 to ensure LED lighting system 20 good operation and creating a new PPW 5:
PS 10>IS 35>DRV 362>OS 37>LED lighting source 402

Figure 15:
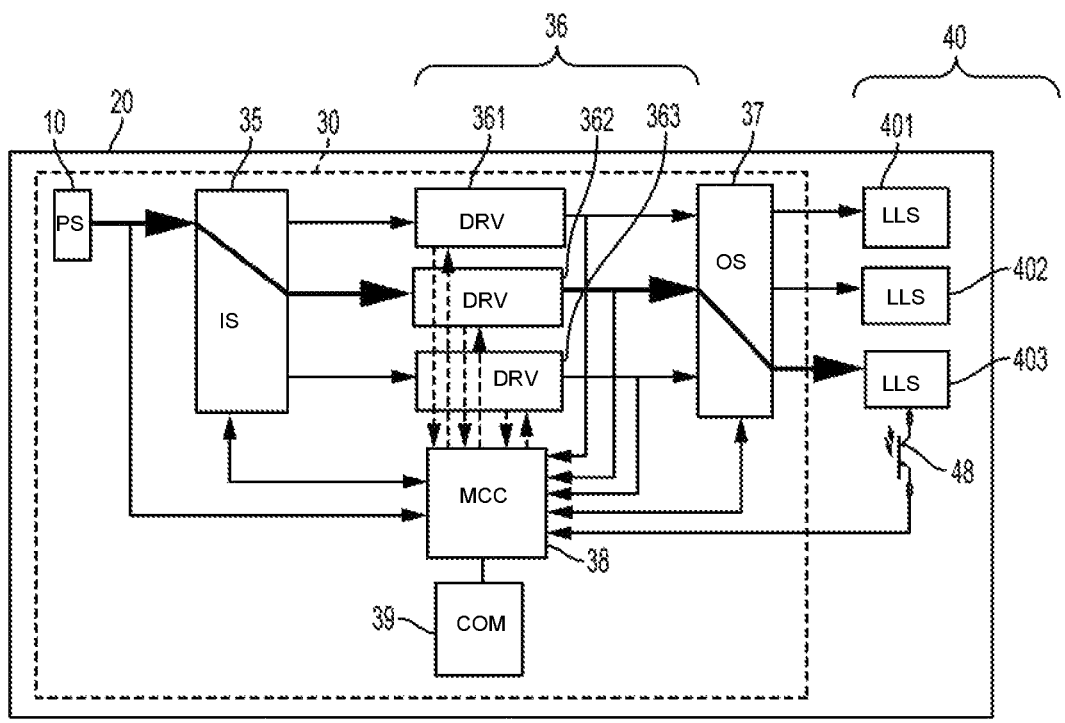
FIG. 15 shows an example LED lighting system having Topology 1, 3, 3 according to an embodiment of the present invention.

FIG. 15 shows an example LED lighting system 20 in the topology 1, 3, 3 (1 PS 10×3 DRV 36 (361 and 362 and 363)×2 LLS 40 (401 and 402 and 403) commutation policy ending configuration LLS 403 connected to PS 10 through DRV 362.

In FIG. 15, the LED lighting system 20 it appeared a break in the circuit and is detected between the DRV 361 and the OS 37, as long as no break between the PS 10 and the IS 35 is diagnosed, the MCC 38 sent a message instructed the IS 35 to connect to a different spare DRV,DRV 362 from plurality of the DRV available (361,362,363) and the LLS 401 fails to illuminate and also the LED lighting source 402 fails to illuminate, light sensor LS 48 sent a message to MCC 38 and this send a message and will instruct the OS 37 to connect to a different spare LED lighting source, LED lighting source 403 from plurality LED lighting sources (401,402,403) creating a new pathway PPW 6:

In FIG. 15, the DRV 361 becomes non-functional or defective, the next spare DRV 362 was replaced the initially selected DRV 361, and LED lighting source 401 and LED lighting source 402 become non-functional or defective, the next spare LED lighting source 403 was replaced the initially selected LED lighting source 401 and LED lighting source 402 to ensure LED lighting system 20 good operation and creating a new PPW 6:
PS 10>IS 35>DRV 362>OS 37>LED lighting source 403

Figure 16:
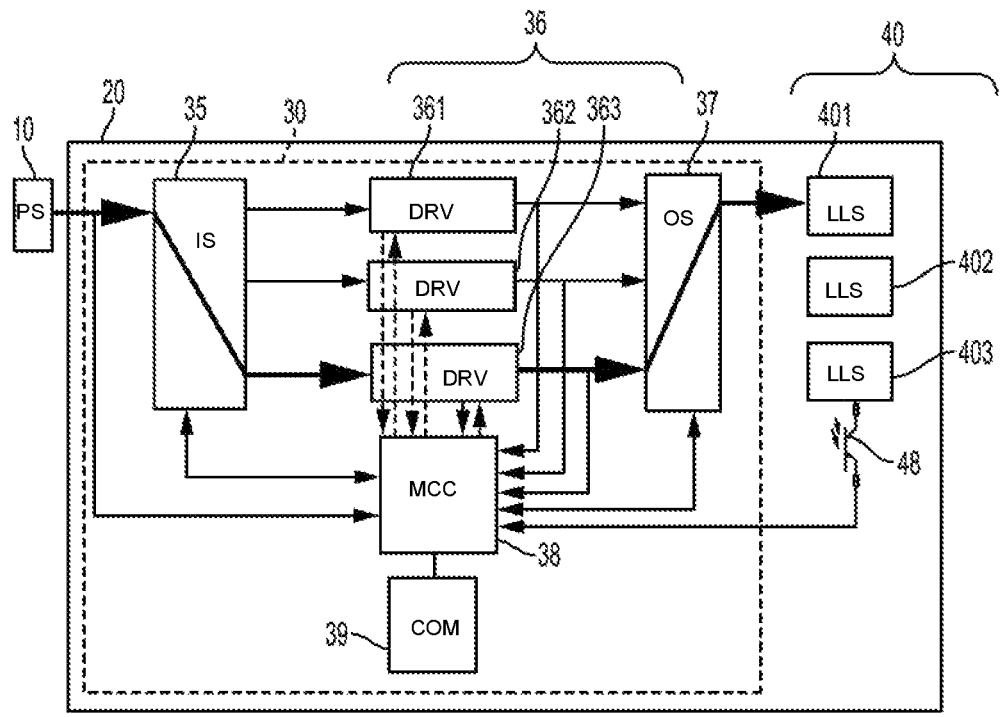
FIG. 16 shows an example LED lighting system having Topology 1, 3, 3 according to an embodiment of the present invention.

FIG. 16 shows an example LED lighting system 20 in the topology 1, 3, 3 (1 PS 10×3 DRV 36 (361 and 362 and 363)×2 LED lighting source 40 (401 and 402 and 403) commutation policy ending configuration LED lighting source 401 connected to PS 10 through DRV 363.

In FIG. 16, in the LED lighting system 20, a break in the circuit appears and is detected between the DRV 361 and the OS 37. There also appears to be a break in the circuit between the DRV 362 and the OS 37. As long as no break between the power source PS 10 and the input selector IS 35 is diagnosed, the MCC 38 sends a message instructed the IS 35 to connect to a different spare DRV,DRV 363 from plurality of the DRV available (361,362, 363) and, the MCC 38 send a message and will instruct the OS 37 to connect to a LLS 401 from plurality LLSs (401,402,403) creating a new pathway PPW 7:

In FIG. 16, the DRV 361,362 where detected to be non-functional or defective, the next spare DRV 363 was replaced the initially selected DRV 361,362 respective, to ensure LED lighting system 20 good operation and creating a new PPW 7:
PS 10>IS 35>DRV 362>OS 37>LLS 401

Figure 17:
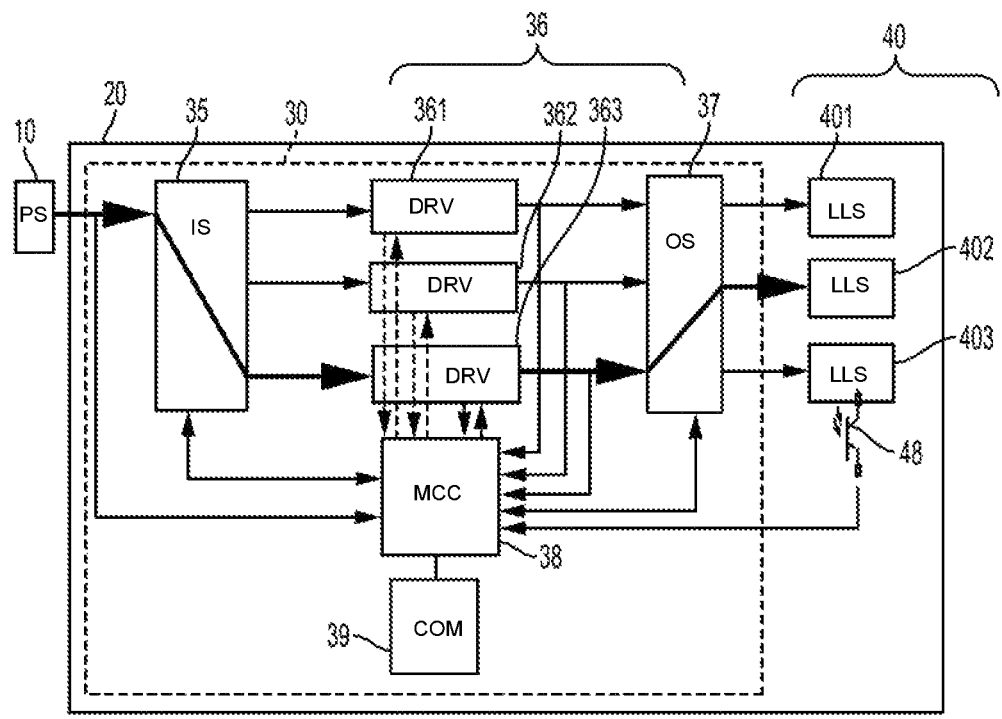
FIG. 17 shows an example LED lighting system having Topology 1, 3, 3 according to an embodiment of the present invention.

FIG. 17 shows an example LED lighting system 20 in the topology 1, 3, 3 (1 PS 10×3 DRV 36 (361 and 362 and 363)×2 LLS 40 (401 and 402 and 403) commutation policy ending configuration LLS 402 connected to PS 10 through DRV 363.

In FIG. 17, in the LED lighting system 20, a break in the circuit appears and is detected between the driver DRV 361 and the OS 37, and another break in the circuit appears and a break is also detected in the circuit between the driver DRV 362 and the OS 37. As long as no break between the power source PS 10 and the input selector IS 35 is diagnosed, the MCC 38 sends a message instructing the IS 35 to connect to a different spare DRV,DRV 363 from plurality of the DRV available (361,362,363) and the LLS 401 fails to illuminate, LS 48 sent a message the MCC 38 and this send a message and will instruct the OS 37 to connect to a different spare LLS, LLS 402 from plurality LLS (401,402,403) creating a new pathway PPW 8:

In FIG. 17, the DRV 361 and DRV 362 become non-functional or defective, the next spare DRV 363 replaces the initially selected DRV 361, DRV 362 and LLS 401 become non-functional or defective, the next spare LLS 402 replaces the initially selected LLS 401 to ensure LED lighting system 20 good operation and creating a new PPW 8:
PS 10>IS 35>DRV 363>OS 37>LLS 402

Figure 18:
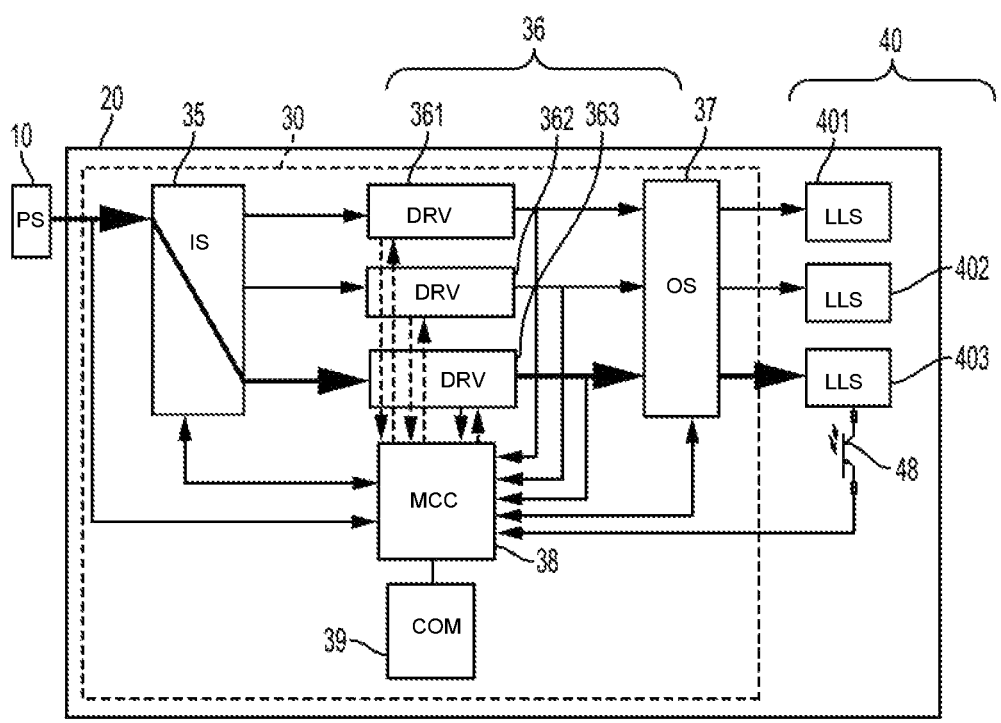
FIG. 18 shows an example LED lighting system having Topology 1, 3, 3 according to an embodiment of the present invention.

FIG. 18 shows an example LED lighting system 20 in the topology 1, 3, 3 (1 PS 10×3 DRV 36 (361 and 362 and 363)×2 LLS 40 (401 and 402 and 403) commutation policy ending configuration LLS 403 connected to PS 10 through DRV 363.

In FIG. 18, in the LED lighting system 20, a break in the circuit appears and is detected between the driver DRV 361 and the OS 37, and another break in the circuit appears and is detected between the driver DRV 362 and the OS 37. As long as no break between the power source PS 10 and the input selector IS 35 is diagnosed, the MCC 38 sends a message instructing the IS 35 to connect to a different spare DRV,DRV 363 from plurality of the DRV available (361, 362,363). If the LLS 401 fails to illuminate, and also LLS 402 fails to illuminate, and the LS 48 sends a message to the MCC 38, the MCC sends a message to instruct the OS 37 to connect to a different spare LLS, LLS 403 from plurality LLSs (401,402,403) creating a new pathway PPW 9:

In FIG. 18, the DRV 361 and DRV 362 become non-functional or defective, so the next spare DRV 363 replaces the initially selected DRV 361, and DRV 362, and if LLS 401, and LLS 402 become non-functional or defective, the next spare LLS 403 replaces the initially selected LLS 401, LLS 402 to ensure LED lighting system 20 good operation and creating a new PPW 9:
PS 10>IS 35>DRV 363>OS 37>LLS 403

In embodiments, the topology can be more advanced up to 1, N, N (1 PS 10×N DRV 36 (361,362,363, . . . , 36N)×N Outputs lighting sources LLS 40 (401,402,403, . . . ,36N).

Figure 19:
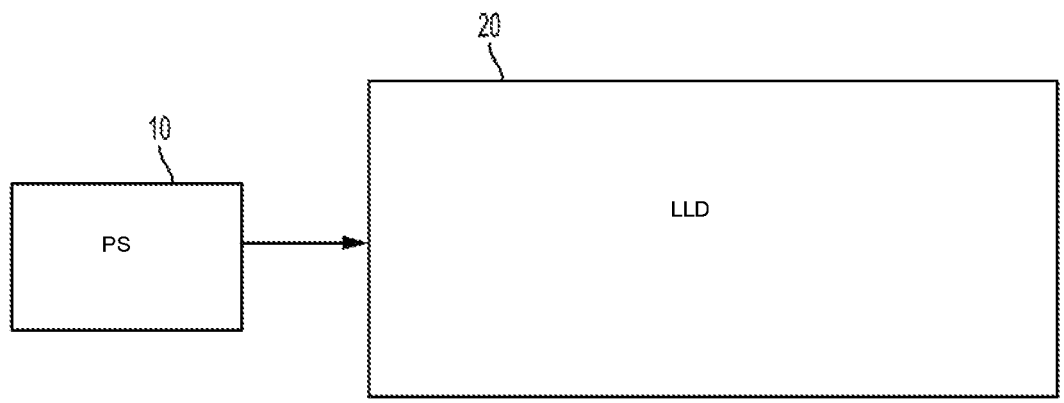
FIG. 19 shows an example LED lighting system according to an embodiment of the present invention.

FIG. 19 shows an example LED lighting system 20, in this embodiment, the LED tube is connected to PS 10.

Figure 20:
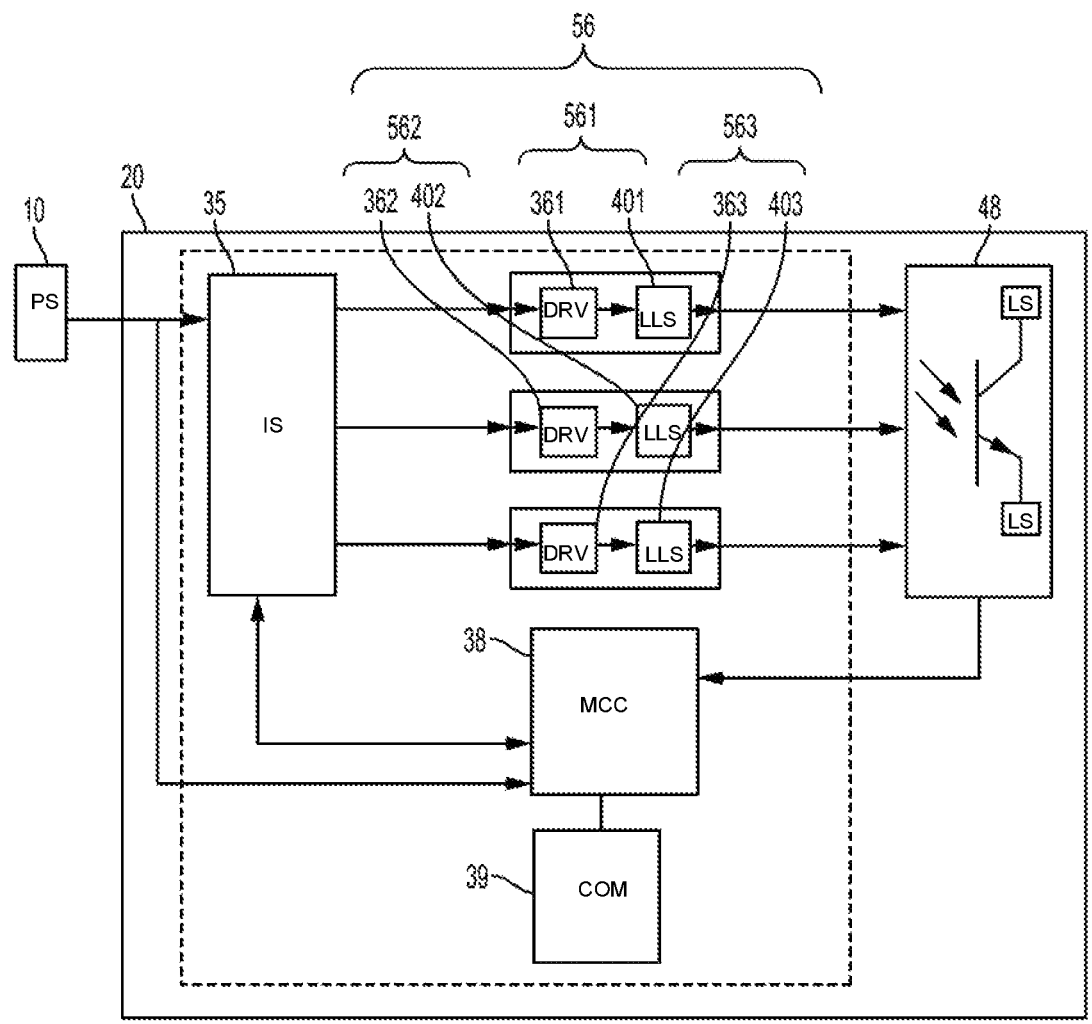
FIG. 20 shows an example LED lighting system having spares as modules according to an embodiment of the present invention.

FIG. 20 shows an example LED lighting system 20, in this embodiment an LED lighting tube is provided. In this embodiment, the LED tube is composed of the following elements: a plurality of DRV 36, (361, 362 and 363), and a plurality of LLS 40, respective (401, 402, 403), and a MMC 38, IS 35, COM 39 and LS 48 and is connected to PS 10. Here, the DRV 361 is connected directly only to LLS 401, and form module 561, the DRV 362 is connected directly only to LLS 402, form module 562, respective DRV 363 is connected directly to LLS 403, and form module 563. The modules 561, 562, 563 are connected in parallel.

Figure 21:
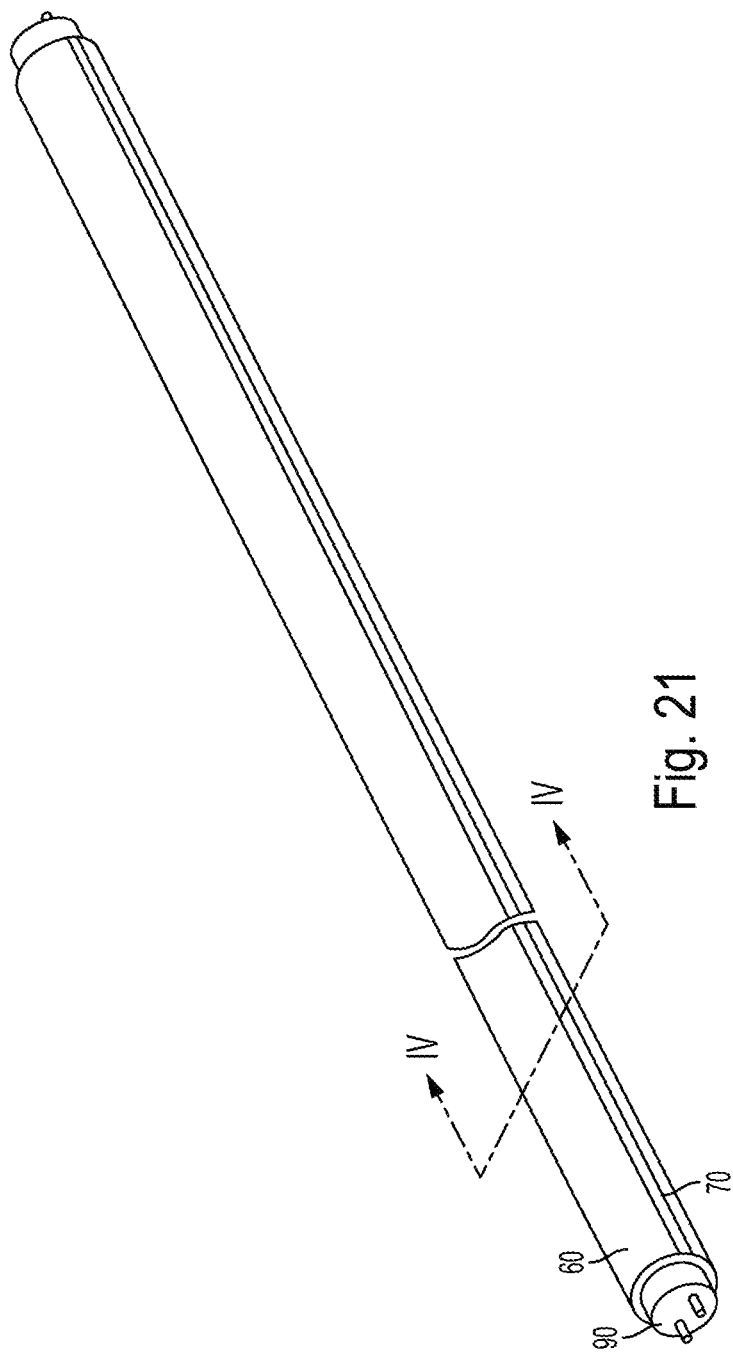
FIG. 21 shows an example assembled view of an LED lighting tube according to an embodiment of the present invention.
Figure 22:
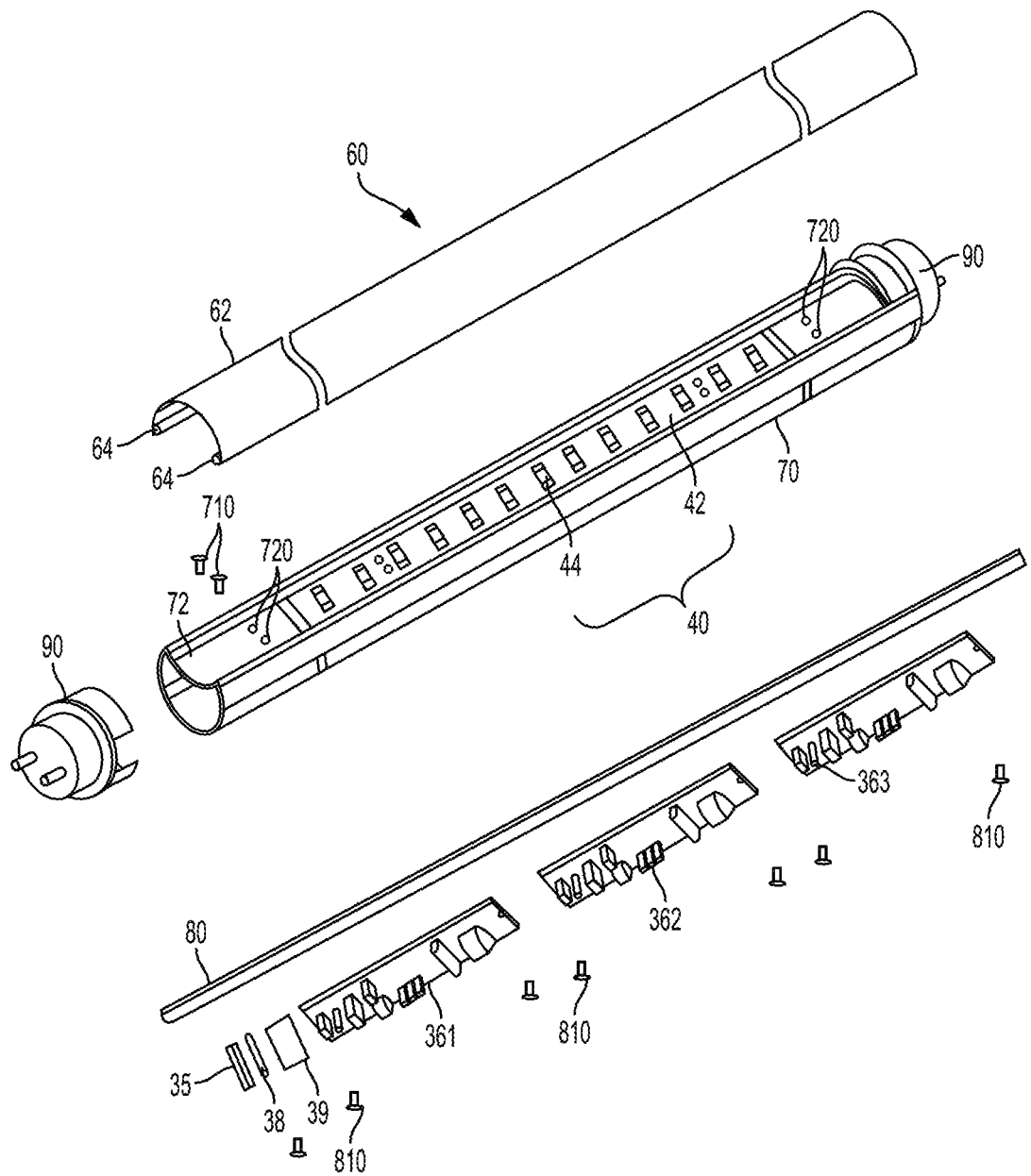
FIG. 22 shows an example exploded view of the LED lighting tube of FIG. 21 according to an embodiment of the present invention.
Figure 23:
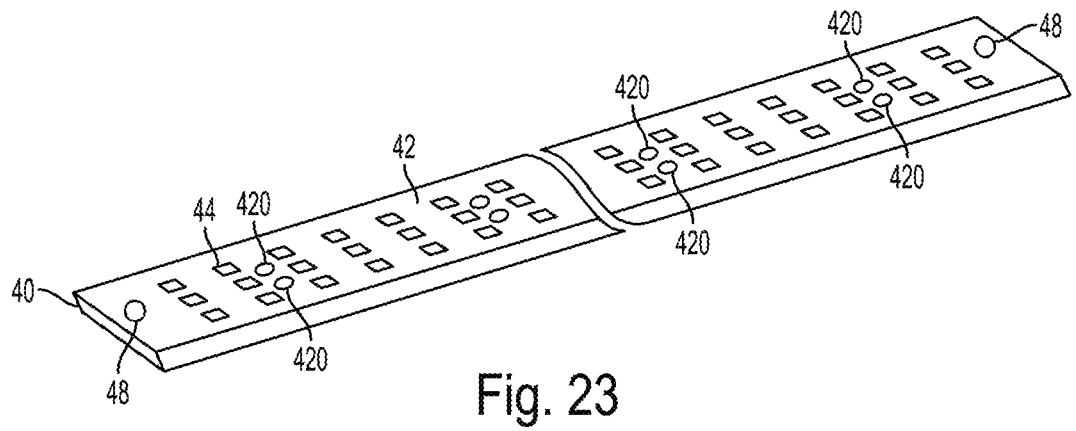
FIG. 23 shows an example partially exploded view of the LED lighting tube of FIG. 21 according to an embodiment of the present invention.
Figure 24:
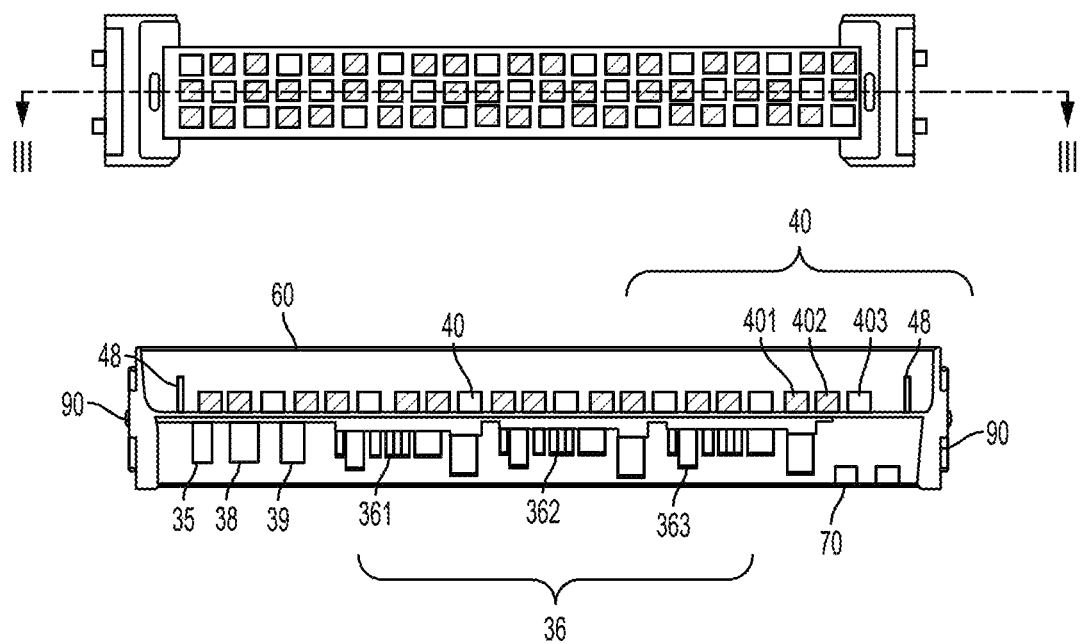
FIG. 24 shows an example cross-sectional view of the LED lighting tube of FIG. 21, taken along line III-III of the LED lighting tube according to an embodiment of the present invention.
Figure 25:
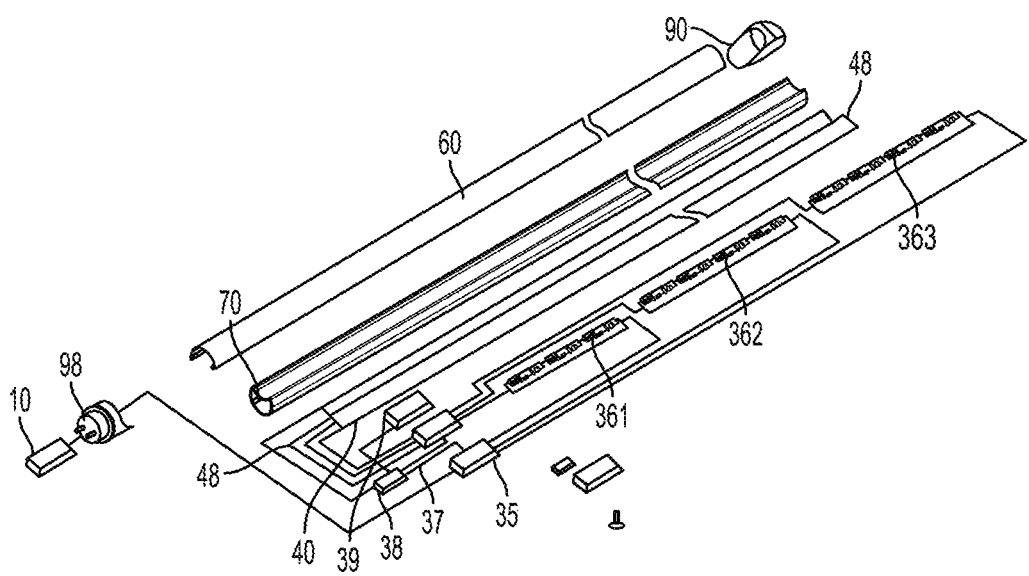
FIG. 25 shows an example exploded view of the LED lighting tube of FIG. 21, and assembled view of an LED lighting tube according to an embodiment of the present invention.
Figure 27:
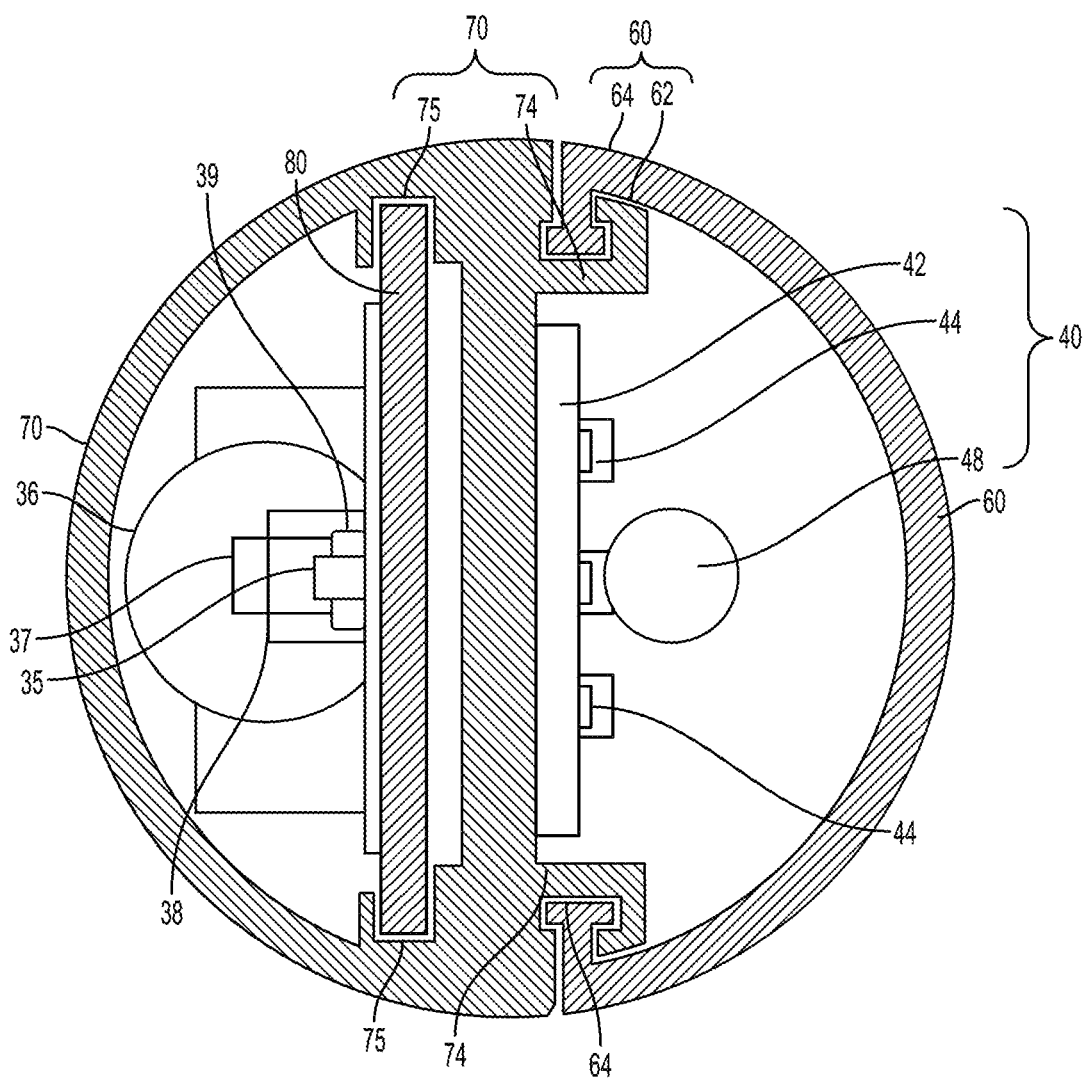
FIG. 27 shows an example cross-sectional view of the LED lighting tube of FIG. 21, taken along line IV-IV, according to an embodiment of the present invention.
Figure 28:
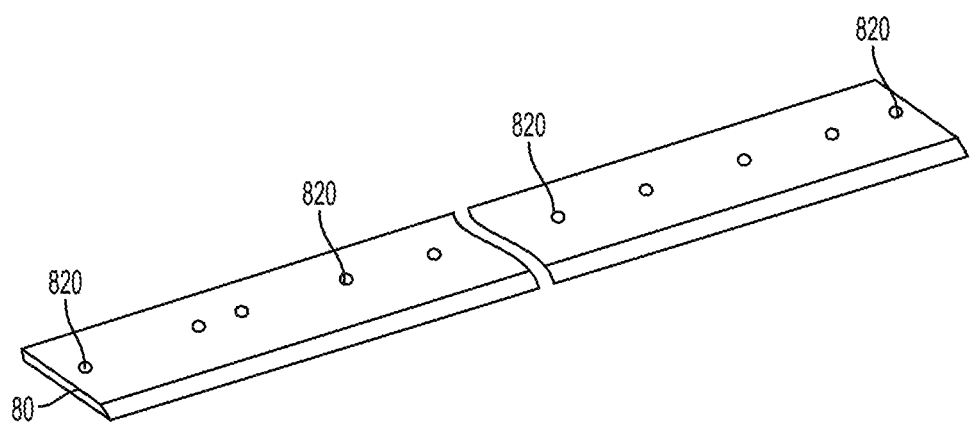
FIG. 28 shows an example plate, according to an embodiment of the present invention.

FIG. 21 shows an example LED lighting system 20 LED tube which at the ends has two caps 90 what keep together all the other elements:

The connecting profile member 70 is integrally form by aluminum.

The connecting member 70 comprises an elongated, thermally conductive plate 72 the conductive plate 72 has a rectangular configuration.

The conductive plate 72 defines a plurality of retaining holes 720 therein along a middle line thereof. A plurality of screws 710 extend through the LLS 40 to threadedly engage into the retaining holes 720, thereby fixing the LLS 40 onto a bottom surface of the conductive plate 72. The conductive plate 72 defines a plurality of heat-dissipating strips 722 on a top surface thereof to enlarge a heat dissipation area thereof.

The connecting member 70 comprises also two T-shaped latching slots 74 and another two U-shaped latching slots 75

The LLS 40 comprises an elongated printed circuit board 42 and a plurality of LEDs 44 mounted on the printed circuit board 42. The LEDs 44 are arranged in three rows along a length direction of the printed circuit board 42. In each row, the LEDs 44 are arranged at equal intervals. A plurality of fixing holes 420 are defined therein along the length direction of the printed circuit board 42 and located between the three rows of LEDs 44. The screws 710 extend through the fixing holes 420 to threadedly engage into the retaining holes 720 of the connecting member 70, thereby fixing the LLS 40 onto a central portion of the bottom surface of the conductive plate 72 of the connecting member 70, e.g., shown in FIG. 15

In FIG. 18A, the distributions of the LED 44 on the printed circuit 42 are shown. FIGS. 18B, 18C, and 18D, show how distributive LEDs 44 is made on the printed circuit 42 to create the lighting sources respective LLS 401, LLS 402 and LLS 403, what correspond of modules 561, 562 and 563 so that no matter what the light source is use the light intensity is the same and surface cover has the same technical characteristics.

FIG. 18B shows a front view when the LED lighting tube is working module 561 respective DRV 361 and the LLS 401. FIG. 18C shows the front view when the LED lighting tube is working module 562 respective DRV 362 and the LLS 402. FIG. 18D shows the front view when the LED lighting tube is working module 563 respective DRV 363 and the LLS 403.

The covers 60 are made of transparent or translucent materials, such as polycarbonate. The covers 60 has an elongated configuration. The cover 60 comprises an arc-shaped covering portion 62 and engaging portions 64 respectively formed at inner sides of two distal edges of the covering portion 62. The covering portion 62 has a plurality of protruding strips (not labeled) on an inner surface thereof for diffusing light emitted from the LLS 40. Each of the engaging portions 64 is T-shaped in cross section with a cross sectional size the same as that of a corresponding latching slot 74 of the connecting member 70, thereby being fittingly received in the corresponding latching slot 74 when the cover 60 and the connecting member 70 are assembled together.

Each of the engaging portions 75 is U-shaped in cross section with a cross sectional size the same as that of a corresponding latching slot 75 of the connecting member 70, thereby being fittingly received in the corresponding latching slot 75 when connecting plate 80 and the connecting member 70 are assembled together FIG. 19.

The assembly of the plurality of the DRV, 361,362, 363, the IS 35, MCC 38, COM 39 are assembly to the plate 80 using the screws 810. The plate 80 has holes 820 is use the screws 810 which extend through the fixing holes of the DRV 36, IS 35, MCC 38 and COM 39 to threadedly engage into the retaining holes 820 of the plate 80, thereby fixing the DRV 361, 362, 363, IS 35, MCC 38 and COM 39 onto a central portion of the surface of the plate 80.

After the plate 80 will slide inside of connecting member 70 true the U shape channel 75, lacking together.

The plate 80 is assembly to connecting part 70 true engaging portions 75 is U-shaped in cross section with a cross sectional size the same as that of a corresponding latching slot 75 of the connecting member 70, thereby being fittingly received in the corresponding latching slot 75 when connecting plate 80 and the connecting member 70 are assembled together, see FIG. 14 and FIG. 19.

In assembly, the LLS 40, respective 401,402,403 and LS 48 is mounted on the center of the bottom surface of the conductive plate 72 of the connecting member 70. The IPM 30, IS 35, the plurality of DRVs 36, 361, 362,363, MCC 38 and COM 39 fixed on the center of the top surface of the conductive plate 80 and electrically connected with the LLS 40 see FIG. 14 and FIG. 17. The engaging portions 64 of the covers 60 slide into the latching slots 74 of the connecting member 70 from an end of the connecting member 70 to an opposite end of the connecting member 70. The engaging portions 64 of the covers 60 are fittingly received in the latching slots 74 so that the covers 60 are fixed on the top connecting member 70, respectively. The two caps 90 is helping to luck together the tube formed by the connecting member 70 and the covering portions 62 of the covers 60 and abut against the inner surfaces of the covering portions 62. Thus, caps connectors 90 the covers 60 and the connecting member 70 are assembled together. The two second ends of the two inserting pins 90 are electrically connected to PS 10 and with the anode and the cathode of the IS 35.

The modules 56, are connected in one end to IS 35 which in turn is connected to a power source PS 10 true the two pins to establish an electric circuit, and to the other end is connected to the LS 48.

More precisely, modules 56 are linked together in a chain configuration as follows: PS 10, two pins 90, IS 35, modules 56, and the LS 48. Also, MCC 38 is connected to IS 35, and LS 48, and to COM 39.

In this embodiment, the LED lighting system 20 LED lighting tube offers the ability to custom tailor its longevity and the quality of the lighting device LED lighting system 20, LED lighting tube by equipping the said LED lighting system 20, LED lighting tube with one initial module 561 and two spare modules 562, 563 in which the device can automatically replace the initial module 561, respectively, when the initial module 561 become non-functional or inadequate for use. The spare parts of our invention LED lighting system 20, LED lighting tube, 562,563 can be use in two ways. First is to use the initial parts respective module 561 when will becomes non-functional or defective will be replace with spare parts available module 562 or 563 what compose the LED lighting system 20, LED lighting tube. And so on, and when 562 when will becomes non-functional or defective will be replace with spare parts available module 563.

This can be automated by firmware or manual by remote control, or wireless remote control.

In an embodiment, another way can be to alternate between the initial module 561 and the spare parts available 562, 563, after or during well-defined period of time. The LED lighting system 20, LED lighting tube allows the modules 56 to be used alternatively, and be alternative use at the choice of costumers time frame, to ensure that the individual module 56 are maintained in a functional state and they do not lose their ability to function as they become stale with lack of use. Hence, period of time choose, by default, the LED lighting system 20, LED lighting tube causes the module in use to be replaced and alternate by one of a spare modules 56, respectively. This can improve the overall quality of the light and the duration for which the light will be provided.

In an embodiment, the automated means of effectuating the replacement can be either by firmware or by remote control R, e.g., FIG. 17, with a human operator. For example, this LED lighting system presents a dynamic apparatus that allows for self-repair and replacement of the LED light Module Source 56, respectively, obviating the need of manual replacement of a normal light source such as a LED lighting tube or fluorescent tube.

For instance, the longevity in this situation of the LED lighting system 20, LED lighting tube was custom tailored to produce an illuminating device that can last 3 times more than all the other LED tubes products existent up to now, and a lot better quality of light, the quality of the light id 50% better than all the other LED tubes products existent up to now.

In this embodiment, the LED lighting system 20, LED lighting tube, the MCC 38 effectuates a number of assessments of the voltage from IS 35 and effectuates a number of assessments of intensity of lights from LS 48, to determine where the voltage is adequate for the type of the load module 56 utilized and whether there are any breaks in the current within the said electric circuit.

In more detail, in an embodiment, if the MCC 38 receives feedback from the lighting sensor LS 48 that the light level emitted is not adequate, it will deem the module 561 defective and will command the IS 35 to disconnect from the said module 561, it will evaluate the Vin level of the module 561 in current use, and if the Vin is adequate, it will command the input selector IS 35 to connect to one of the spare module 562 which is next available, spare module 562. And so on for module 562 and 563.

The MCC 38 communicates with the IS 35, the modules 56, and LS 48. From the connection of the power source PS 10 and the IS 35, the MCC 38 measures the input voltage (Vin), which is the voltage coming from the power source PS 10 into the IS 35. This measurement permits the MCC 38 to determine whether it is necessary to switch to a new power source PS 10, or to allow the IS 35 to connect to the module 56.

Once the module 561 is connected to a power source PS 10 through the IS 35, the MCC 38 measures of the intensity of the light with LS 48. If the quality of the light is adequate the LED lighting system 20, LED lighting tube is working normal parameters. If the quality of the light is not good the MCC 38 is sending a message to IS 35 to change to the next available spare part module 562 to connect to IS 35. And so on for module 562 and 563.

The MCC 38 can communicate with: 1) outside remote control R via Wi-Fi, Bluetooth, Ethernet, and GSM and Internet or industrial buses such as Modbus, Can Open, etc, 2) local display, 3) local keypad, and 4) local port of service; the said MCC 38 can be operated automatically or independently, following the programmed logic written in the firmware; when operated automatically, it follows the remote orders (to switch IPMs, DRVs, LLSs, etc).

FIG. 29 shows an example LED lighting system (hereinafter "LLD") 20, which is composed of a plurality of drivers (hereinafter "IPM") 361, 362 . . . 36N and plurality of LED lighting sources (thereinafter "LLS") 401,402, . . . , 40N, and LS 48 and a micro controller MCC 38, and interface communication COM 39.

FIG. 29 also shows a representation of the IPM. The IPM 30 is composed of one input selector IS, respective 35, a plurality of the DRV, respective 361,362, . . . ,36N are connected in parallel between them, one output selector OS 37, one micro controller MCC 38, and one communication interface COM,39.

FIG. 29 also shows a representation of the LLS. Each LLS is composed of a plurality of lighting sources LLS 40. LLS 40 is compose of lighting sources (401,402, . . . ,40N).

In an embodiment, the IPM 30 can be connected to PS 10 in one end and in the other end can be connected with one of the plurality of lighting sources (401,402, . . . ,40N) via OS 37, and the IPM 30 communicates with MCC 38 and with LS 48. Only one of DRV respective (361, 362, . . . , 36N) is functional at one time, and only one of lighting source respective (401, 402, . . . ,40N) which compose respective LLS 40 is functional at one time. When either the DRV (361, 362, . . . , 36N)) or lighting source (401, 402, . . . ,40N) or both, become non-functional or defective, the next spare DRV, which are in composition of IPM respective 30 will replace the initially selected DRV, respective the next spare lighting source respective (401, 402, . . . ,40N) replace the initially selected lighting source or both of them. The MCC 38 it measures the Vin and Vout, and communicates with the IS 35 respective OS 37 and the LS 48. The MCC 38 determines if is functional, in terms of DRV (361,362, . . . 36N) and/or LLS 40 (401,402, . . . ,40N). When a faulty element DRV (361,362, . . . 36N) or LLS (401,402, . . . ,40N) is detected, the MCC 38 command the next spare DRV to connect to the PS 10 via IS 35, also the MCC 38 can communicate LS 48 and command the next spare LLS to connect to the DRV (361,362, . . . 36N) and/or LLS (401,402, . . . ,40N) via its OS 37.

In this embodiment, a PS 10 can be connected to one of the plurality of DRV respective (361,362, . . . 36N) via the IS 35, while the one of the plurality of LLS respective (401,402, . . . ,40N) is connected to one of plurality of DRV (361,362, . . . 36N) via the OS 37. The LS 48 of the LED lighting system 20 is connected to MCC 38.

Figure 30:
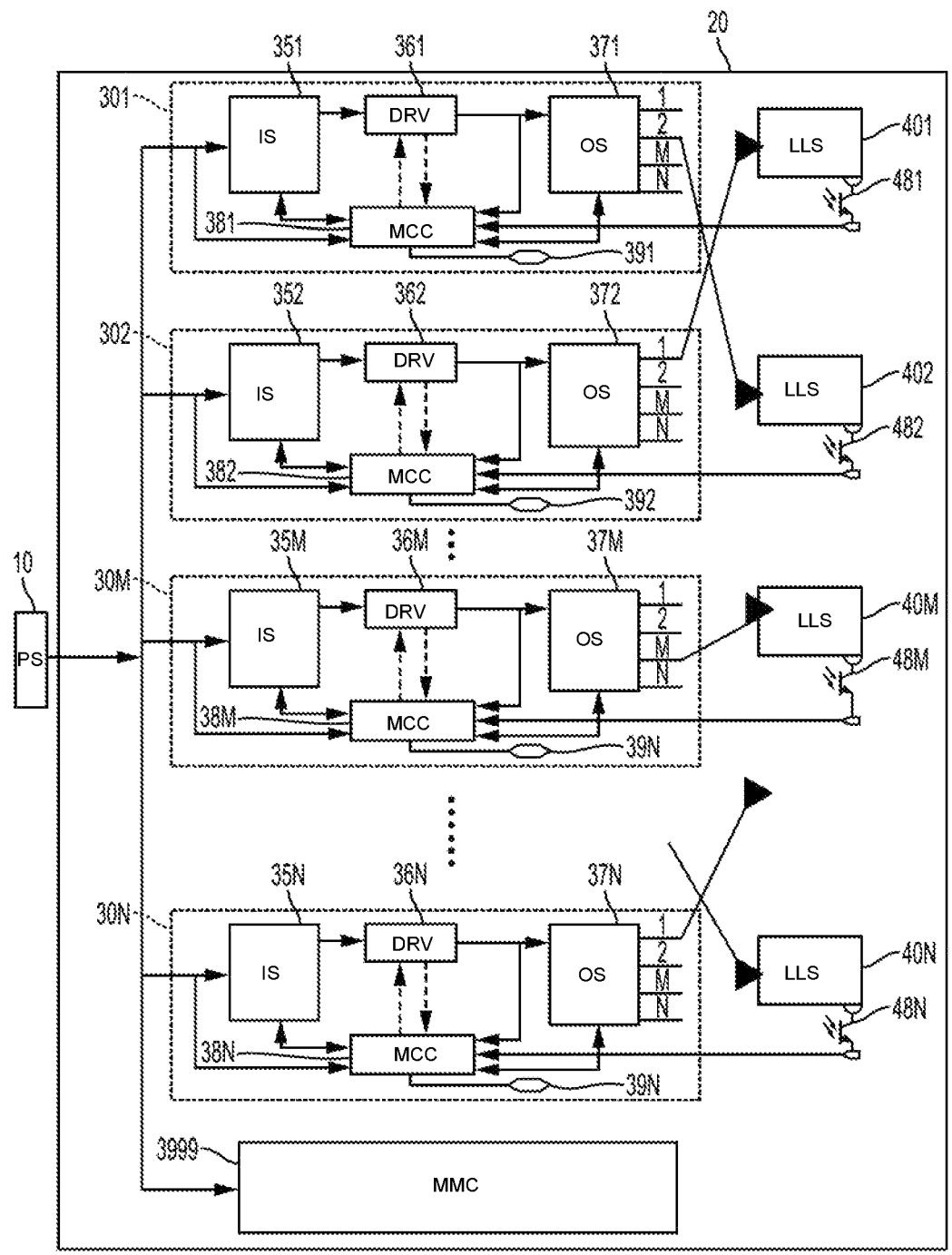
FIG. 30 shows an example LED lighting system according to an embodiment of the present invention.
Figure 31:
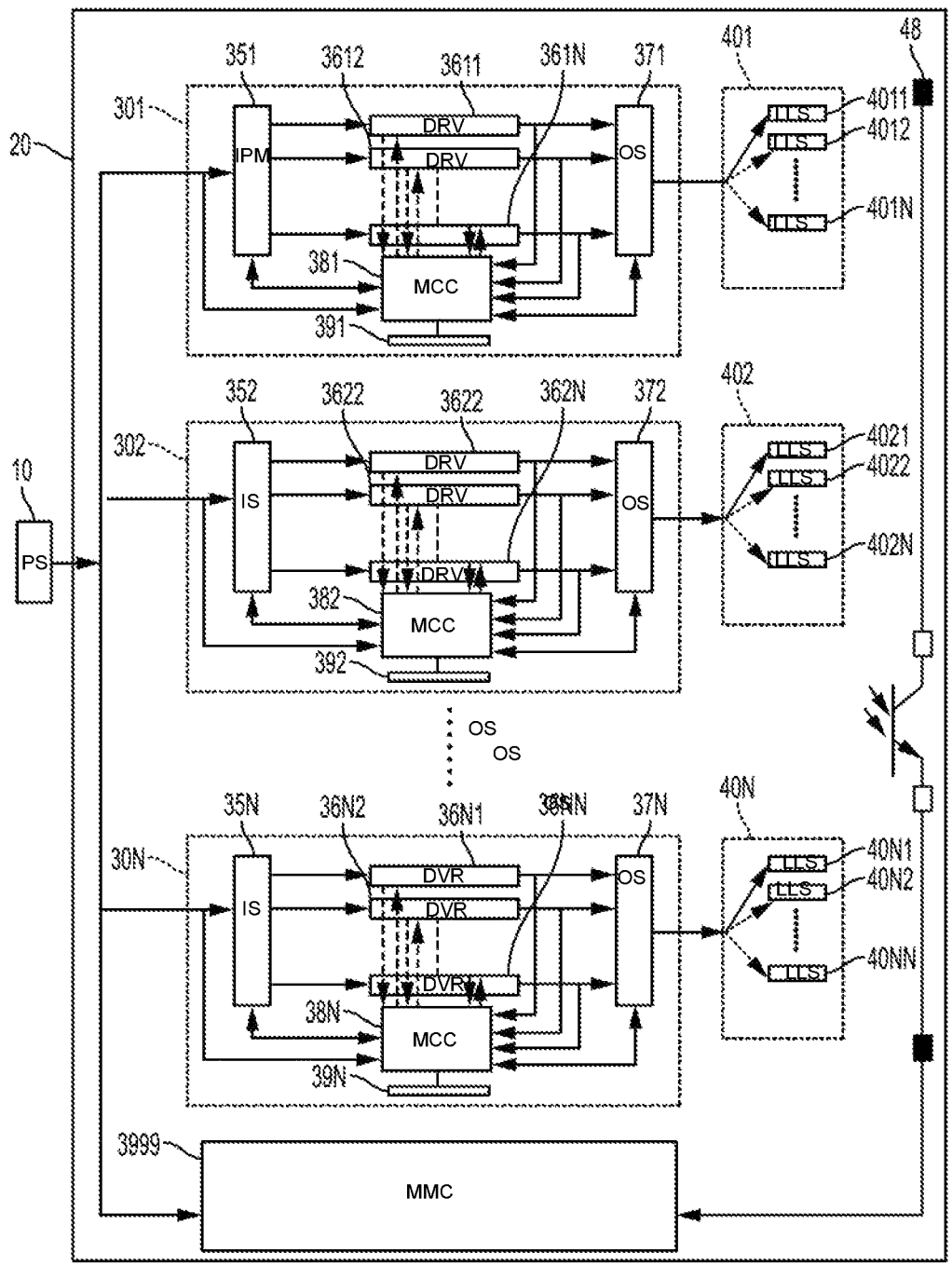
FIG. 31 shows an example LED lighting system according to an embodiment of the present invention.

FIG. 30 shows an example LED lighting system (hereinafter "LLD") 20, which is composed of plurality of Inverter Power Modules (hereinafter "IPM") 301, 302 . . . 30N and plurality of LED lighting sources (thereinafter "LLS") 401, 402, . . . , 40N, and LS 48 and a master micro controller MMC 3999.

FIG. 30 also shows a representation of the IPM. In an embodiment, each IPM, respective (301,302 . . . ,30N), is composed of one IS (351,352, . . . ,35N), one DRV (361, 362, . . . ,36N), one OS (371,372, . . . ,37N), one slave micro controller MCC (381,382, . . . ,38N), and one COM (391, 392, . . . ,39N). The IPM are connected in parallel between them.

FIG. 30 shows an LED lighting system, where the LLS is composed of plurality of lighting sourced respective LLS (401,402, . . . ,40N).

In an embodiment, the IPM (301,302, . . . ,30N) can be connected to PS 10 in one end and in the other end can be connected with one of the plurality of LLS (401, 402, . . . ,40N) and the IPM (301,302, . . . ,30N) communicates with the MMC 3999 thru respective MCC (381, 382, . . . ,38N) with a help of COM respective (391, 392, . . . ,39N and LS 48. Only one of DRV respective (361, 362, . . . , 36N) is functional at one time, and only one of lighting source respective (401, 402, . . . ,40N) is functional at one time. When either the DRV (361, 362, . . . , 36N) or lighting source (401,402, . . . ,40N) or both, become non-functional or defective, the next spare DRV,IPM, which are in composition of LED lighting system respective (301 or 302 or . . . 30N) will replace the initially selected DRV,IPM, respective the next spare LLS respective (401,402, . . . ,40N) replace the initially selected LLS or both of them. The MCC respective (381.382, . . . ,38N) it measures the Vin and Vout, and communicates with the IS respective (351, 352, . . . ,35N) respective OS (371,372, . . . ,37N) and the MMC 3999. The MCC (381,382, . . . ,38N), and MMC 3999 determines if is functional, in terms of DRV (361,362, . . . 36N) and/or LLS (401,402, . . . ,40N). When a faulty element DRV,IPM, (361,362, . . . 36N) or LLS (401, 402, . . . ,40N) is detected, the respective MCC (381.382, . . . ,38N) communicates with MMC 3999 and LS 48 and command the next spare DRV, IPM, to connect to the PS 10 via its respective IS (351,352, . . . ,35N), the respective MCC (381.382, . . . ,38N) communicates with MMC 3999 and LS 48 and commands the next spare LLS to connect to the DRV (361,362, . . . 36N) and/or lighting sources (401, 402, . . . ,40N) via its OS respective (371,372, . . . ,37N).

In this embodiment, a PS 10 can be connected to one of the plurality of DRV,IPM, (361,362, . . . 36N) via the respective IS (351,352, . . . ,35N), while the one of the plurality of lighting sources (401,402, . . . ,40N) is connected to one of plurality of DRV,IPM, (361,362, . . . 36N) via the OS (371,372, . . . ,37N). The LS 48 is connected to MMC 3999.

In an embodiment, communication between the respective MCC (381,382, . . . ,38N) and MMC 3999 is effected using the respective COM (391,392, . . . ,39N).

FIG. 31 shows an example LED lighting system (hereinafter "LLD") 20, which is composed of a plurality of Inverter Power Modules (hereinafter "IPM") 301, 302 . . . 30N and plurality OF LED lighting sources (hereinafter "LLS") 401,402, . . . , 40N, and LS 48 and a master micro controller MMC 3999.

FIG. 31 shows a representation of the IPM. In an embodiment, each IPM (301,302 . . . ,30N) is composed of one IS (351,352, . . . ,35N), a plurality of the DRV (3611, 3612, . . . ,361N, which IPM 301 are connected in parallel between them, 3621,3622, . . . ,362N, which IPM 302 are connected in parallel between them, . . . ,36N1, 36N2, . . . ,36NN, which IPM 30N are connected in parallel between them, one OS (371,372, . . . ,37N), one slave micro controller MCC (381,382, . . . ,38N), and one COM (391, 392, . . . ,39N).

FIG. 31 shows a representation of the LLS. Each LLS is composed of plurality of secondary light sources: respective LLS 401, is composed of secondary light sources (4011, 4012, . . . ,401N), respective LLS 402 is composed of secondary light sources (4021, 4022, . . . ,402N), respective LLS 40N is composed of light sources (40N1, 40N2, . . . , 40NN).

In an embodiment, the IPM (301,302, . . . ,30N) is connected to PS 10 in one end and in the other end can be connected with one of the plurality of secondary light source (4011,4012, . . . ,401N or 4021,4022, . . . ,402N, or 40N1, 40N2, . . . ,40NN) which include respective LLS (401, 402, . . . ,40N), and the IPM (301,302, . . . ,30N) communicates with the MMC 3999 through the respective MCC (381,382, . . . ,38N) with a help of the respective COM (391,392, . . . ,39N), and LS 48. In an embodiment, only one of respective DRV (3611, 3612, . . . , 361N, or 3621, 3622, . . . ,362N, or 36N1,38N2, . . . ,36NN) is functional at one time, and only one of light source respective (4011, 4012, . . . ,401N, or 4021,4022, . . . ,402N, or 40N1, 40N2, . . . ,40NN) which composes respective LLS (401, 402, . . . ,40N) is functional at one time. When either the DRV (3611, 3612, . . . , 361N, or 3621,3622, . . . ,362N, or 36N1,38N2, . . . ,36NN)) or light source (4011,4012, . . . , 401N or 4021,4022, . . . ,402N, or 40N1, 40N2, . . . ,40NN) or both, become non-functional or defective, the next spare DRV, which are in composition of IPM respective (301 or 302 or . . . 30N) will replace the initially selected DRV, respective the next spare light source respective (4011, 4012, . . . ,401N or 4021,4022, . . . ,402N, or 40N1, 40N2, . . . ,40NN) replace the initially selected light source or both of them. The respective MCC (381.382, . . . ,38N) measures the Vin and Vout, and communicates with the respective IS (351,352, . . . ,35N) respective OS (371, 372, . . . ,37N) and the MMC 3999. The MCC (381. 382, . . . ,38N), and MMC 3999 determines if is functional, in terms of DRV (3611,3612, . . . 361N, or 3621, 3622, . . . ,362N, or 36N1,36N2, . . . ,36NN) and/or light sources LLS (4011,4012, . . . ,401N or 4021,4022, . . . ,402N, or 40N1, 40N2, . . . ,40NN)). When a faulty element DRV (3611,3612, . . . 361N, or 3621,3622, . . . ,362N, or 36N1,36N2, . . . ,36NN) or LLS (4011,4012, . . . ,401N or 4021,4022, . . . ,402N, or 40N1, 40N2, . . . ,40NN) is detected, the respective MCC (381.382, . . . ,38N) communicates with MMC 3999 and LS 48 and command the next spare DRV to connect to the PS 10 via its respective IS (351,352, . . . ,35N), the respective MCC (381, 382, . . . , 38N) communicates with MMC 3999 and LS 48 and commands the next spare LLS to connect to the DRV (3611, 3612, . . . 361N, or 3621,3622, . . . ,362N, or 36N1, 36N2, . . . ,36NN) and/or lighting sources (4011, 4012, . . . ,401N or 4021,4022, . . . ,402N, OR 40N1, 40N2, . . . ,40NN) via its respective OS (371,372, . . . ,37N).

In this embodiment, a PS 10 is connected to one of the plurality of DRV respective (3611,3612, . . . 361N, or 3621,3622, . . . ,362N, or 36N1,36N2, . . . ,36NN) via the respective IS (351,352, . . . ,35N), while the one of the plurality of lighting sources (4011,4012, . . . ,401N or 4021,4022, . . . ,402N, or 40N1, 40N2, . . . ,40NN) is connected to one of plurality of DRVs (3611,3612, . . . 361N, or 3621,3622, . . . ,362N, or 36N1,36N2, . . . ,36NN) via the OS (371, 372, . . . ,37N). The LS 48 of the LED lighting system 20 is connected to MMC 3999.

In an embodiment, communication between a respective MCC (381,382, . . . ,38N) and master microcontroller MMC 3999 is effected using a respective COM (391,392, . . . , 39N).

Figure 32:
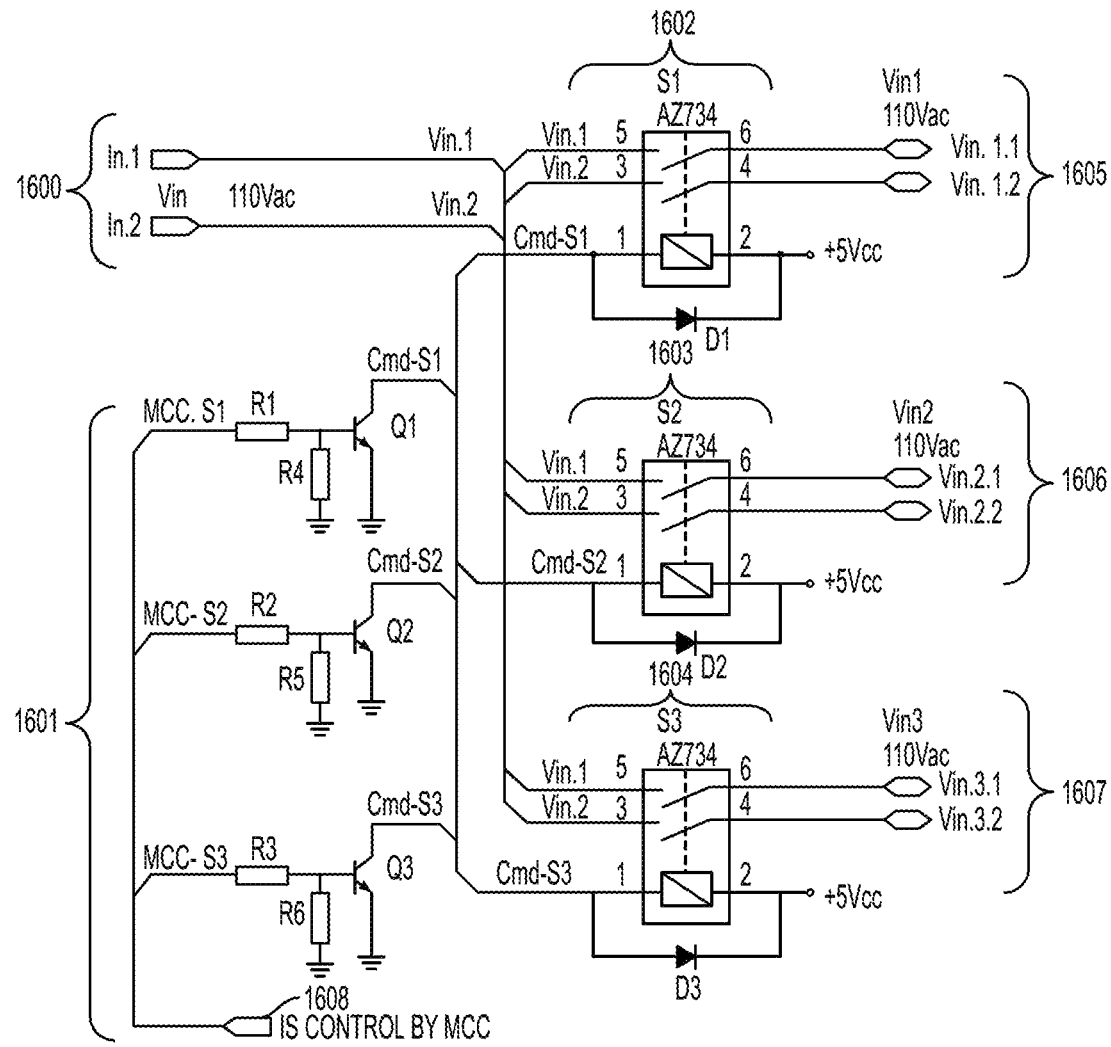
FIG. 32 shows an example input selector block system according to an embodiment of the present invention.

FIG. 32 shows an example microcontroller. For example, the input voltages 1600 enter the system to the respective chips 1602, 1603, 1604, (e.g., S1, S2, S3 power switches) which is outputted as Voltage 1605, 1606, 1607. Control circuits 1601 are connected to the system, allowing for the controlling of the input selector by the MCC 1608, as one example.

Figure 33:
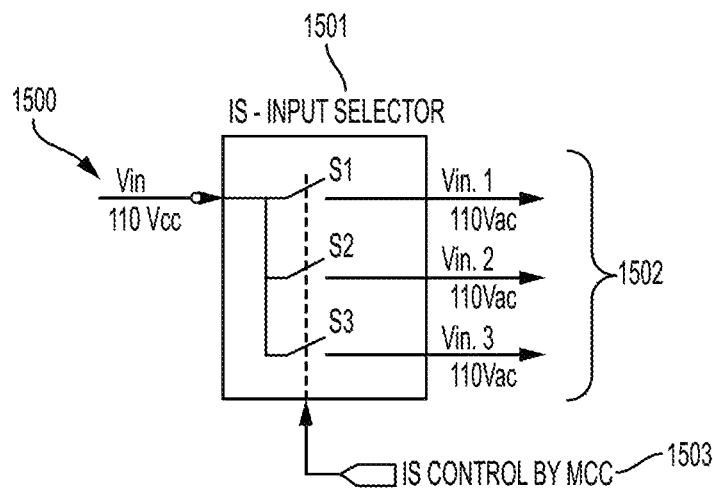
FIG. 33 shows an example input selector block according to an embodiment of the present invention.

FIG. 33 shows an example input selector system. For example, the voltage input 1500 passes through the input selector 1501 having switches S1, S2, S3, which output the voltage 1502. The input selector control is effected by the microcontroller 1503.

Figure 34:
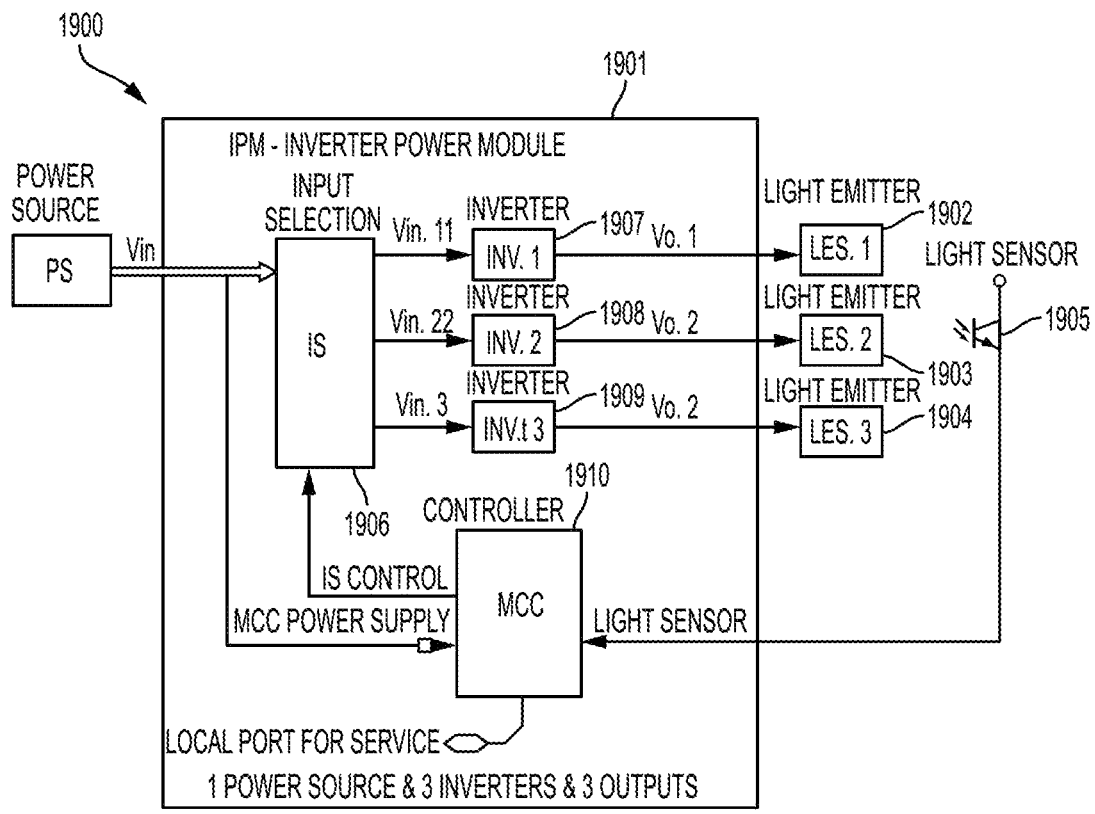
FIG. 34 shows an example LED lighting system according to an embodiment of the present invention.

FIG. 34 shows an example inverter power module system. For example, the power source 1900 sends a voltage signal through the inverter power module IPM 1901, and outputs to light emitters 1902, 1903, 1904, which then is read by a light sensor(s) 1905. The light sensor 1905 sends information to the microcontroller 1910 which is connected to the input selector 1906. In the IPM, inverters 1907, 1908, 1909 are set up in parallel from the input selector 1906. For example, the power source 1900 could also be a power network grid or other source of a voltage signal. For example the light emitters can be a neon tube. For example, the inverter(s) can be a neon tube inverter(s). The switching policies can be time-based switching between inverters, or LES switching based on the lighting level measured by the light sensor. The IPM can work independently, or one can associate a remote with the IPM to work it dependently. In FIG. 34, a service port is shows for updating the firmware or extracting data for analyzing the inverter power module status.

Figure 35:
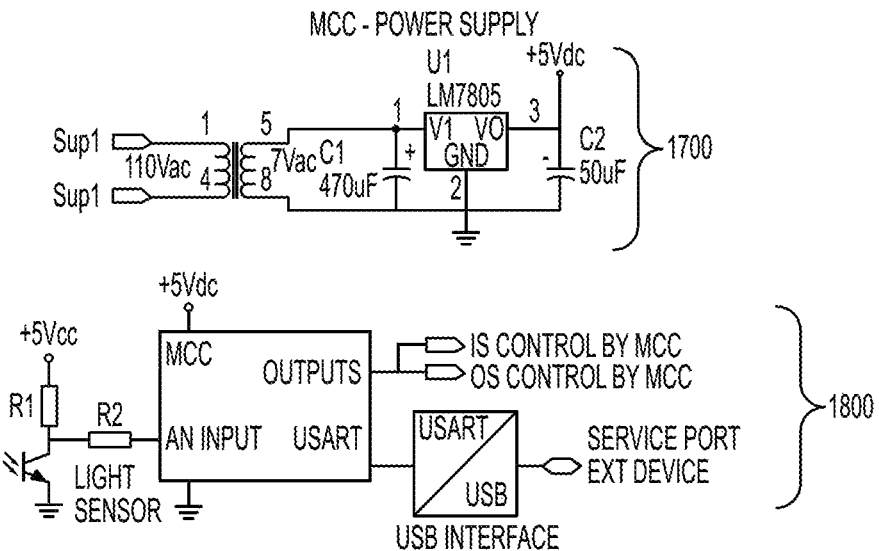
FIG. 35 shows an example microcontroller according to an embodiment of the present invention.

In FIG. 35, an example microcontroller is shown in block 1800 and circuit 1700 forms. In an embodiment, the role of the microcontroller can be to administrate the inverter power module. For example, the microcontroller can switch ON or OFF the LLS1 and LLS2 based on at least one of: time based (e.g., one unit period such as 1 day, to work first LLS and then the next unit period work the second LLS, and so on); and light level (e.g., the light sensor indicates via a signal to the microcontroller that the light level is a certain level and whether that is appropriate or not). The microcontroller can exchange data with remote external devices and/or with the service PC through the USB service port. The microcontroller can store time stamped events, can update the firmware through the service port, and/or can control the inverter output voltage or shut down the inverters.

Figure 36:
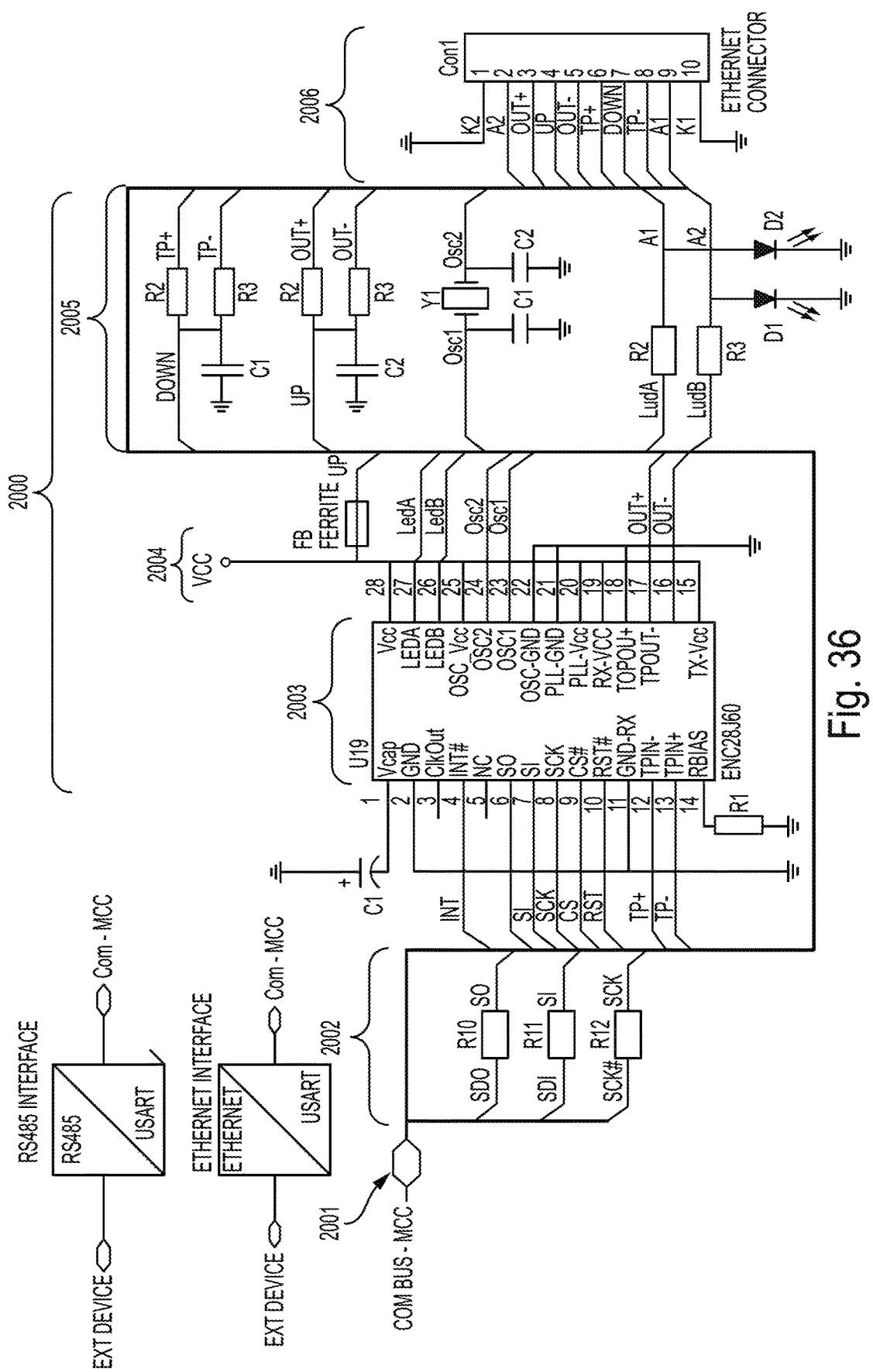
FIG. 36 shows an example digital data bus convertor according to an embodiment of the present invention.

In FIG. 36, an example digital data bus convertor diagram is shown. For example the COM bus from the microcontroller 2001 inputs to a resistor 2002, and then through a bus 2003 through 2005 to an Ethernet connection. For example, this can serve as an electrical interface from, e.g., RS485 to USART.

Note: more components can be duplicated as spare parts in composition of the LED lighting system. In this Description, drivers and LED light sources are shown in redundancy and how they work in the system The other system parts can be implemented similarly in their respective functions, and controlled by the microcontroller.

In embodiments, multiple LLS (minimum 1 and maximum N, where N is an integer greater than one) are connected to the IPM in such a way that only one LLS operates at one time, and regardless which LLS is used/ selected, the individual performance of any activated LLS will be of the same quality in terms of luminosity, intensity, and color and all other technical aspects.

In embodiments, the LLS can be switched via a MCC. The MCC is capable of switching the electric output OS from one LLS to the next one LLS or a different LLS connected to an OS. The command to switch to the next LLS can be accomplished automatically, when the LED lighting sensor LS indicated that the LLS in use is no longer functional/adequate, or it can be accomplished voluntarily, when a human operator notices a change in the quality of the light and wishes to switch to the next available LLS.

In embodiments, the microcontroller MCC can work independently, in accordance with the firmware, or it can execute orders received from a remote control, operated by a human operator wire or wirelessly, by using Wi-Fi signal, Bluetooth signal, Ethernet, or GSM or Internet, radio or other method.

In embodiments, the microcontroller MCC communicates with a wireless device to indicate whether the DRV needs to be replaced and switched to the next available DRV or respective whether the LLS needs to be replaced and switched to the next available LLS.

In embodiments, the microcontroller MCC declares the assembly status through a wireless device to indicate if there are defective components that need to be replaced. Moreover, it is able to find an alternative way to supply the lighting device only using the available resources.

In embodiments, the LED Lighting Device or LED lighting system provides components which can be used to develop the most advance intelligent lighting building management system, and can be the primary or fundamental cells to develop the most advance intelligent lighting city management system, and all the other smart lighting city applications, including traffic lights, and can be the basic cells to develop the most advance intelligent lighting of internet of thinks management system for different lighting applications and automatization, using dimming inverter/drivers and to reduce the cost or maintenance. Embodiments of the present invention provide for a remote switch of the DRV,IPMs or the LLSs of the LED lighting system, thus eliminating the cumbersome procedures for accessing remote places to change the lighting source. Additionally, the energy cost is much reduced due to the use of LLS. An advantage of this would be the decrease of cost and the continuous functionality and the decrease of cost of maintenance. Also, as the use of the spare LLSs and DRV causes the spare LLS and DRV to alternate, respectively, between spare parts, a better quality of light is maintained for a longer amount of time, which is an improvement of any LED lighting system in existence at this time. In some circumstances, the quality of the light diminishes 6% to 12% a year. The quality of lighting of the LED lighting system according to the present invention allows for a decrease of 50% to 90% less than all the other LED products existent at this time in market.

The modifications listed herein and other modifications can be made by those in the art without departing from the ambit of the invention. Although the invention has been described above with reference to specific embodiments, the invention is not limited to the above embodiments and the specific configurations shown in the drawings. For example, some components shown can be combined with each other as one embodiment, and/or a component can be divided into several subcomponents, and/or any other known or available component can be added. The operation processes are also not limited to those shown in the examples. Those skilled in the art will appreciate that the invention can be implemented in other ways without departing from the substantive features of the invention. For example, features and embodiments described above can be combined with and without each other. The present embodiments are therefore to be considered in all respects as illustrative and not restrictive. Other embodiments can be utilized and derived therefrom, such that structural and logical substitutions and changes can be made without departing from the scope of this disclosure. This Specification, therefore, is not to be taken in a limiting sense, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations and/or variations of various embodiments. Combinations of the above embodiments, and other embodiments not specifically described herein, will be apparent to those of ordinary skill in the art upon reviewing the above description.

What is claimed is:

1. A lighting system, comprising:
at least one power source;
at least one driver;
a plurality of light emitting diode light sources;
an output selector coupled between the at least one driver and the plurality of light emitting diode light sources;
at least one light sensor configured to measure a light intensity output of the plurality of light emitting diode light sources; and
a microcontroller configured to control the output selector to switch electrical connections between the at least one driver and each of the plurality of light emitting diode light sources based on the measured light intensity output of at least one of the plurality of light emitting diode light sources, such that power is transmitted from the at least one power source to a selected light emitting diode light source.

2. The lighting system according to claim 1, further comprising an input selector coupled between the at least one power source and respective inputs of the at least one driver.

3. The lighting system according to claim 2, wherein the microcontroller is further configured to control the input selector to switch electrical connections between the at least one power source and the respective inputs of the at least one driver, such that power is transmitted from the at least one power source to the selected light emitting diode light source.

4. The lighting system according to claim 2, wherein the microcontroller is configured to determine whether the selected light emitting diode light source is receiving power from the at least one power source via the at least one driver and control the input and output selectors to switch to a different driver when the microcontroller determines based on the measured light intensity output that the selected light emitting diode light sources is not receiving power from the at least one power source via the at least one driver.

5. The lighting system according to claim 2, wherein the at least one power source comprises a plurality of power sources and the microcontroller is configured to switch an input of the input selector from the at least one power source to a different power source of the plurality of power sources when the microcontroller determines that the at least one power source is not providing power to the at least one driver.

6. The lighting system of claim 2, wherein the microcontroller receives a feedback measurement as an input voltage provided by the at least one power source, and if the microcontroller determines that the feedback measurement of the input voltage is equal to a predetermined value or within a predetermined range, then the microcontroller communicates with the input selector to establish a power pathway via the input of the at least one driver, and if the microcontroller determines that the feedback measurement of the input voltage is not equal to the predetermined value and not within the predetermined range, then the microcontroller commands the input selector to select a different power source of the at least one power source or stops operation of the system.

7. The lighting system of claim 6, wherein the power pathway is established as current travels from the at least one power source to the input selector, from the input selector to a selected driver of the at least one driver, and from the selected driver to the output selector, and wherein the microcontroller measures an output voltage from the selected driver, and if the output voltage meets a predetermined value, the microcontroller commands the output selector to connect the respective output of the selected driver with the selected light emitting diode light source, effecting an established complete power pathway between the power source and the selected light emitting diode light source.

8. The lighting system according to claim 1, wherein the plurality of light emitting diode light sources are connected in parallel to each other and the microcontroller is configured to switch an output of the output selector from the selected light emitting diode light source to a different light emitting diode light source when the microcontroller determines based on the measured light intensity output that the selected light emitting diode light source is not operating correctly to emit light.

9. The lighting system of claim 1, wherein the microcontroller receives a measurement of an output voltage at an output of the at least one driver and, when the output voltage meets a predetermined value, the microprocessor commands the output selector to select one of the plurality of light emitting diode light sources.

10. The lighting system of claim 1, further comprising a remote controlling processor configured to control the microcontroller to establish a complete power pathway through the at least one driver to the selected light emitting diode light source.

11. The lighting system of claim 10, wherein the microcontroller is configured to communicate with the remote controlling processor by at least one of Bluetooth, Ethernet, GSM, radio RI, Internet, industrial buses, Modbus, Can Open, local display, local keypad, and local port of service, and
wherein the microcontroller is operated as at least one of: automatically, independently, following programmed logic written in the firmware, and automatically while following remote orders to switch the selected light emitting diode light source to another light emitting diode light source of the plurality of light emitting diode light sources.

12. A lighting method, comprising:
measuring by at least one light sensor a light intensity output of a plurality of light emitting diode light sources in a lighting arrangement; and
controlling, by a microcontroller, an output selector to switch electrical connections between at least one driver and each of the plurality of light emitting diode light sources based on the measured light intensity output of at least one of the plurality of light emitting diode light sources; and
controlling, by the microcontroller, power transmission from at least one power source to a selected light emitting diode light source.

13. The lighting method according to claim 12, controlling, by the microcontroller, an input selector between the at least one power source and respective inputs of the at least one driver to switch electrical connections between the at least one power source and the respective inputs of the at least one driver, such that power is transmitted from the at least one power source to the selected light emitting diode light source.

14. The lighting method according to claim 13, further comprising:

determining, by the microcontroller, whether the selected light emitting diode light source is receiving power from the at least one power source via the at least one driver; and controlling the input and output selectors to switch to a different driver when the microcontroller determines based on the measured light intensity output that the selected light emitting diode light sources is not receiving power from the at least one power source via the at least one driver.

15. The lighting method according to claim 13, wherein the at least one power source comprises a plurality of power sources and the method further comprises: switching, by the microcontroller, an input of the input selector from the at least one power source to a different power source of the plurality of power sources when the microcontroller determines that the at least one power source is not providing power to the at least one driver.

16. The lighting method of claim 13, further comprising:
receiving, by the microcontroller, a feedback measurement as an input voltage provided by the at least one power source;
if the microcontroller determines that the feedback measurement of the input voltage is equal to a predetermined value or within a predetermined range, communicating, by the microcontroller, with the input selector to establish a power pathway via the input of the at least one driver; and
if the microcontroller determines that the feedback measurement of the input voltage is not equal to the predetermined value and not within the predetermined range, commanding, by the microcontroller, the input selector to select a different power source of the at least one power source or stops operation of the system.

17. The lighting method of claim 16, further comprising:
establishing the power pathway as current travels from the at least one power source to the input selector, from the input selector to a selected driver of the at least one driver, and from the selected driver to the output selector; and
measuring, by the microcontroller, an output voltage from the selected driver, and if the output voltage meets a predetermined value, commanding, by the microcontroller, the output selector to connect the respective output of the selected driver with the selected light emitting diode light source, effecting an established complete power pathway between the power source and the selected light emitting diode light source.

18. The lighting method according to claim 12, wherein the plurality of light emitting diode light sources are connected in parallel to each other and the method further comprises:
switching, by the microcontroller, an output of the output selector from the selected light emitting diode light source to a different light emitting diode light source when the microcontroller determines based on the measured light intensity output that the selected light emitting diode light source is not operating correctly to emit light.

19. The lighting method of claim 12, further comprising:
receiving, by the microcontroller, a measurement of an output voltage at an output of the at least one driver; and
when the output voltage meets a predetermined value, commanding the output selector to select one of the plurality of light emitting diode light sources.

20. The lighting method of claim 12, further comprising controlling, by a remote controlling processor, the microcontroller to establish a complete power pathway through the at least one driver to the selected light emitting diode light source.

21. The lighting method of claim 20, further comprising:
communicating, by the microcontroller, with the remote controlling processor by at least one of Wi-Fi, Bluetooth, Ethernet, GSM, radio RI, Internet, industrial buses Modbus, Can Open, local display, local keypad, and local port of service; and
operating the microcontroller as at least one of: automatically, independently, following programmed logic written in the firmware, and automatically while following remote orders to switch the selected light emitting diode light source to another light emitting diode light source of the plurality of light emitting diode light sources.

* * * * *